US012566945B2

(12) United States Patent
Ruiz et al.

(10) Patent No.: US 12,566,945 B2
(45) Date of Patent: Mar. 3, 2026

(54) OPTIMISED APPROXIMATION ARCHITECTURES AND FORECASTING SYSTEMS

(71) Applicant: iRuiz Contracting Ltd, London (GB)

(72) Inventors: Ignacio Ruiz, London (GB); Mariano Zeron, London (GB)

(73) Assignee: iRuiz Contracting Ltd, London (GB)

( * ) Notice: Subject to any disclaimer, the term of this patent is extended or adjusted under 35 U.S.C. 154(b) by 830 days.

(21) Appl. No.: 17/910,760

(22) PCT Filed: Mar. 11, 2021

(86) PCT No.: PCT/GB2021/050618
§ 371 (c)(1),
(2) Date: Sep. 9, 2022

(87) PCT Pub. No.: WO2021/181107
PCT Pub. Date: Sep. 16, 2021

(65) Prior Publication Data
US 2023/0119221 A1 Apr. 20, 2023

(30) Foreign Application Priority Data

Mar. 11, 2020 (GB) ..................................... 2003523
Aug. 28, 2020 (GB) ..................................... 2013532

(51) Int. Cl.
*G06N 3/047* (2023.01)
*G06N 3/048* (2023.01)
*G06N 3/082* (2023.01)

(52) U.S. Cl.
CPC ............. *G06N 3/047* (2023.01); *G06N 3/048* (2023.01); *G06N 3/082* (2013.01)

(58) Field of Classification Search
CPC ........ G06N 3/047; G06N 3/048; G06N 3/082; G06N 5/01; G06N 20/10; G06N 3/084
See application file for complete search history.

(56) References Cited

PUBLICATIONS

Moon, Jihoon, "Forecasting power consumption for higher educational institutions based on machine learning", Mar. 29, 2017, Springer Science+Business Media, p. 1-23 (Year: 2017).*
(Continued)

*Primary Examiner* — Charles R Kasenge
(74) *Attorney, Agent, or Firm* — Fenwick & West LLP

(57) ABSTRACT

The invention provides a computer-implemented method of training an approximation architecture for a forecasting system including performing a pre-training stage comprising steps of: obtaining training samples each including an input value for a first plurality of input variables and corresponding parameter values of the functions; obtaining dependencies between different variables of the first plurality of input variables; determining, based on the obtained dependencies, dimensionality-reducing rules for determining a second plurality of input variables, wherein there are fewer degrees of freedom in the second plurality than in the first plurality; and, determining, by applying the dimensionality-reducing rules to the training samples, modified training samples including input values for at least some of the second plurality of variables and corresponding parameter values approximating the functions. The forecasting system is for determining a future behaviour forecast of a system based on determined approximated parameter values, from the trained approximation architecture, for the plurality of scenarios.

16 Claims, 27 Drawing Sheets

Parameter "w"

(56)            References Cited

PUBLICATIONS

Barron, A.R. "Approximation and Estimation Bounds for Artificial Neural Networks," *Machine learning*, vol. 14, Jan. 1994, pp. 115-133.

Moon, J. et al. "Forecasting Power Consumption for Higher Educational Institutions Based on Machine Learning," *The Journal of Supercomputing*, vol. 74, No. 8, Mar. 29, 2017, pp. 3778-3800.

Wu, C.L. et al. "Prediction of Rainfall Time Series Using Modular Artificial Neural Networks Coupled with Data-Preprocessing Techniques," *Journal of Hydrology*, vol. 389, No. 1-2, Jul. 28, 2010, pp. 146-167.

Hanjie, L. et al. "Power Load Forecasting Based on Data Analysis and Neural Networks," 2018 *Chinese Automation Congress*, Nov. 30-Dec. 2, 2018, pp. 744-748.

PCT International Search Report and Written Opinion, PCT Application No. PCT/GB2021/050618, Mar. 19, 2021, 14 pages.

* cited by examiner

Layer "k" forward propagation

Layer "k" backward propagation

Prior art generation of input data for the Training Set

Smart generation of input data for the Training Set $$x_2 \approx 3 - 2x_1 + x_1^2$$

$$x_2 = 3 - 2x_1 + x_1^2$$

6500

To / From
external

6102
Random
deviates
generation
module

6103
Historical
scenarios
database

6002
Input / Output
module

6007
Forecasting
module

6101
Scenario
generation
models
database

6001
Controller

6006
Metric
assessment
module

6003
Scenario generation
module

6005
Metric evaluation
module

6504
Parameter evaluation
module

Forecasting system

Appoximating system

Parameter function module
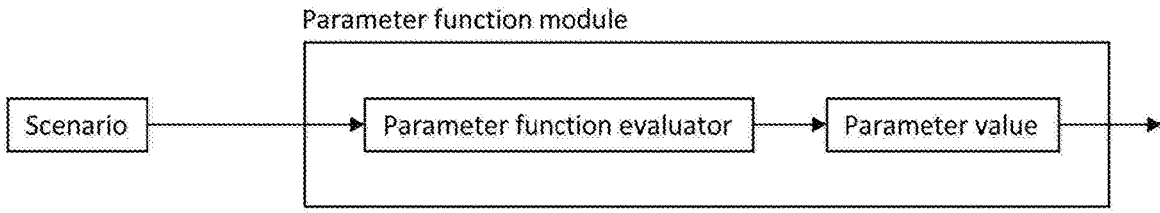
*FIG. 24(a)*
Approximation parameter function module
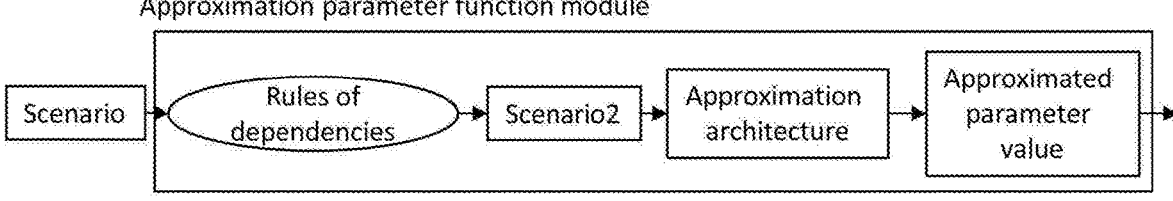
*FIG. 24(b)*
Approximation parameter function module
Scenario → Rules of dependencies → Scenario2 → Approximation architecture → Approximated parameter value →
*FIG. 24(c)*

OPTIMISED APPROXIMATION ARCHITECTURES AND FORECASTING SYSTEMS

FIELD OF THE INVENTION

The present invention relates to optimising approximation architectures, such as neural network architectures, and more particularly though not exclusively to an optimising pre-processing or pre-training step for machine learning approximation architectures for approximating one or more functions. The present invention relates particularly though not exclusively to performing such optimisation in the context of optimisation of forecasting systems.

BACKGROUND

In the field of Artificial Intelligence (AI) or Machine Learning (ML), Neural Networks (NN) play a particularly central role. These networks are computational frameworks that try to "learn" what should be the output of a given function, given a certain collection of inputs. Applications are vast, including pattern recognition (e.g. given a picture, recognise the person, the number plate, or other elements in it), function approximation (e.g. given a certain state of the financial markets, obtain the value of a portfolio in risk calculations; or predict future values of financial market parameters), voice recognition, medicine, robotics, advertising, etc. The applications are nearly endless.

In general, NNs are an example of approximation techniques, that are computational methods that approximate functions and deliver an approximation to the original function that is more efficient to compute. For example, a NN used for pattern recognition provides can provide a probability that a picture has a cat in it; this is itself an approximation of the computation that a human may do when looking at that picture.

Once the NN has learnt the function at stake, the computational effort that the NN requires to provide an output given an input tends to be relatively low; i.e. predictions can be done relatively quickly and cheaply.

One of the key challenges of NNs is that the effort (i.e. time it takes to run and/or its monetary cost of IT infrastructure) of the learning step of a NN can be big. The reason is twofold. On one hand, it may require the evaluation of the function it is trying to learn an outstanding number of times (e.g. millions of times), and each evaluation can be difficult to obtain. On the other hand, the learning process requires the repeated calibration of the NN parameters via many iterations (e.g. millions of iterations), which can be slow and costly too.

Another key challenge of a NN lies in its accuracy. The output it provides is an approximation to the real value, should it be calculated. Building accurate NNs can be costly or very difficult in many cases.

In the art, homogeneous NN architectures—or machine learning architectures—are used in which the NN architecture includes a number of layers each including a number of processing nodes, where the same or different type of nodes are replicated throughout the entire architecture, and where weights associated with each node are learnt during a training process.

Separately, there exists in several fields the computation of various types of forecasts. In many cases, the computations required to provide such forecasts involve repetitive evaluation of computationally expensive functions under several potential future scenarios. Such computations can be so slow or costly to perform that they can become impractical, because the speed of evaluating the computationally expensive functions many times (e.g. 1,000,000 times) can take too long. This can mean that when the computation is finished, the output is already obsolete. Also, the computational cost of performing such forecasts using, for example, farms of computers, can be prohibitive. Performing forecast computations in this way can be impractical because of a combination of both lack of speed and prohibitively high cost.

It is against this background to which the present invention is set.

SUMMARY OF THE INVENTION

According to an aspect of the invention there is provided a computer-implemented method of training an approximation architecture for a forecasting system. The method is implemented on a computer system including a computer processor. The forecasting system is for: generating a plurality of scenarios indicative of potential future states of a system, each scenario including a value for each of a plurality of variables; determining an approximated value of each of one or more parameters for each of the plurality of scenarios, wherein one or more functions relate variable values of scenarios to corresponding parameter values of the functions, and wherein the approximated values of the parameters are determined using a trained approximation architecture, which may be part of the forecasting system, that receives the values of each generated scenario and approximates the one or more functions; and, determining a future behaviour forecast of the system based on the determined approximated parameter values for the plurality of scenarios.

Training the approximation architecture comprises performing a pre-training stage comprising steps of: obtaining a plurality of training samples each including an input value for at least some of a first plurality of input variables and corresponding parameter values of the functions; obtaining one or more dependencies between different variables of the first plurality of input variables; determining, based on the obtained dependencies, one or more dimensionality-reducing rules for determining a second plurality of input variables for approximating the functions, wherein there are fewer degrees of freedom in the second plurality of input variables than in the first plurality of input variables; and, determining, by applying the dimensionality-reducing rules to the plurality of training samples, a plurality of modified training samples including input values, for at least some of the second plurality of variables, and corresponding parameter values approximating the functions. Training the approximation architecture comprises determining one or more training weights of the approximation architecture based on the plurality of modified training samples in order to train the approximation architecture to approximate the one or more functions.

The invention is beneficial in that it makes use of obtained relationships or dependencies that exist between different input variables of a function or functions to be approximated in a forecasting system to reduce the computational load of training an approximation architecture to approximate the function or functions. In particular, by identifying that a number of degrees of freedom of input data to a function or functions is actually less than a number of input variables to the function(s) (at least to within an acceptable level of accuracy), a number of degrees of freedom (or a dimensionality) of training data samples used to train the approximation architecture can be reduced to be less than the number of input variables while retaining an acceptable level of accuracy in the approximation. Obtaining modified training samples that are based on a plurality of variables that has fewer degrees of freedom (than the plurality of variables on which the training samples are based) means that a less complex approximation architecture is needed to accurately approximate the function(s), which in turn results in a lower level of computing resources being needed to train the approximation architecture to accurately approximate the function(s). A less complex approximation architecture may require fewer (modified) training samples to accurately train the architecture, and/or the (modified) training samples may be of lower dimension (at the input layer), either of which can contribute to lower computational cost at the training stage. Advantageously, a determination of a degree to which a dimensionality of the training samples is reduced can be made automatically with reference to the available computing resource (processing speed, memory, etc) provided by the processor(s) implementing the training method, optionally as a trade-off with a required or desired level of accuracy to be provided by the approximation architecture.

By 'obtaining' the dependencies is meant that the dependencies can be received—e.g. from the forecasting system— if they are known a priori, or that the dependencies can be computed, calculated, or otherwise determined. In a case where the dependencies are computed, data from which the dependencies are determined may be from a same source as the training samples for training the approximation architecture.

The one or more dependencies between different variables of the first plurality of input variables may be obtained based on one or more dependencies in the plurality of scenarios.

The plurality of scenarios may include endogenous scenarios. Obtaining the one or more dependencies of the endogenous scenarios may comprise obtaining the dependencies from a scenario generation module, of the forecasting system, that generates the scenarios.

The endogenous scenarios may be generated stochastically.

The plurality of scenarios may include exogenous scenarios Obtaining the one or more dependencies of the exogenous scenarios may comprise determining the dependencies based on data used to generate the plurality of scenarios.

Determining the dependencies may comprise: obtaining a plurality of pre-training samples, from the data used to generate the plurality of scenarios, each including an input value for at least some of the first plurality of input variables; and, identifying, based on the obtained pre-training samples, the one or more dependencies between different variables of the first plurality of input variables.

Obtaining the dependencies between variables may comprise applying a numerical dimensionality-reducing technique to the obtained plurality of pre-training samples.

The numerical dimensionality-reducing technique may include one or more of: linear regression; non-linear regression; multilinear subspace learning; principal components analysis (PCA); non-negative matrix factorisation; kernel PCA; graph-based kernel PCA; linear discrimination analysis; generalised discrimination analysis; autoencoders; t-distributed stochastic neighbour embedding; uniform manifold approximation and projection; k-nearest neighbours algorithm; canonical correlation analysis; low-dimensional embedding; and, local sensitive hashing and random projection.

Applying the numerical dimensionality-reducing technique may comprise determining a dimensionality-reducing transform, or an approximation thereof, that relates the sets of input values of the first plurality of input variables to corresponding sets of values of the second plurality of input variables as an output of the dimensionality-reducing transform.

The data used to generate the plurality of scenarios may be historical data related to the system.

The plurality of training samples may be a subset of, or the same as, the plurality of pre-training samples.

The pre-training stage may comprise: modifying the approximation architecture to reduce a dimensionality of an input layer of the approximation architecture from being configured to receive sets of input values of the training samples to being configured to receive sets of input values of the modified training samples. Determining the one or more training weights may comprise determining one or more training weights of the modified approximation architecture based on the plurality of modified training samples.

A dimensionality of each of the modified training samples may be less than a dimensionality of each of the training samples.

The plurality of modified training samples may include fewer samples than the plurality of obtained training samples.

The plurality of training samples may be a subset of the plurality of generated scenarios. The plurality of generated scenarios may be a subset of the plurality of training samples. The plurality of training samples may be equal to the plurality of generated scenarios.

The pre-training stage may comprise selecting how many modified training samples are to be determined. The selection may be based on at least one of: a required level of accuracy to be provided by the approximation architecture; and, processing capabilities of the computer processor.

The selection of how many modified training samples to be determined may be an iterative process to optimise a trade-off between the required level of accuracy and the processing capabilities of the computer processor.

The pre-training stage may comprise selecting a dimensionality-reducing technique from a plurality of stored dimensionality-reducing techniques, and may comprise obtaining the dependencies between variables using the selected dimensionality-reducing technique.

Selection of the dimensionality-reducing technique may be based on at least one of: a required level of accuracy to be provided by the approximation architecture; and, processing capabilities of the computer processor.

Selection of the dimensionality-reducing technique may be an iterative process to optimise a trade-off between the required level of accuracy and the processing capabilities of the computer processor.

A source used to obtain the training samples may be the same as a source used to generate the plurality of scenarios.

The source may be at least one of: a data store including historical data related to the system; and, a model describing the system, optionally wherein the model is a stochastic model or a deterministic model.

The second plurality of input variables may be a subset of the first plurality of input variables. One or more of the second plurality of input variables may be determined as a combination of two or more of the first plurality of variables The method may comprise selecting how many input variables are in the second plurality of input variables. The selection may be based on a time taken by the computer processor to evaluate the one or more functions in the approximation architecture.

The approximation architecture may be a neural network architecture.

The pre-training stage may comprise modifying the neural network architecture to reduce how many layers are in the neural network architecture and/or reduce how many neurons are in one or more layers of the neural network architecture.

The pre-training stage may comprise selecting how many layers are in the neural network architecture, and/or selecting how many neurons are in one or more layers of the neural network architecture, based on at least one of: how many samples are in the plurality of modified training samples; and, how many input variables are in the plurality of modified training samples.

Determining the training weights of the neural network architecture may comprise repeating the steps of: performing a forward propagation step in which each of the plurality of modified training samples are executed in the neural network architecture to obtain an approximated value of each of the one or more parameters of the function; applying a cost function based on a difference between the approximated values and the respective parameter values of the modified training samples to determine a distance metric value; and, performing a backward propagation step in which the training weights of the neural network architecture are updated in dependence on the determined distance metric value, until the determined distance metric value satisfies a predetermined condition or until the steps of forward propagation, applying the cost function and backward propagation have been performed a predefined plurality of times.

The approximation architecture may be based on at least one of the following approximation techniques: machine learning; interpolation; extrapolation; curve fitting; Taylor expansions; perturbation; variational; spectral decomposition; regression; rational approximation; Lagrange; Newton; Hermite; spline methods; polynomial; trigonometric; least-squares; stochastic; differential approximation; discrete; parametric; piecewise methods; tensor methods; finite elements; and, bilinear.

The plurality of modified training samples m may be selected to satisfy:

$$m < D \cdot M \cdot \left(1 - \frac{t}{T}\right)$$

wherein D is how many future behaviour forecasts are to be determined, M is how many scenarios are used, t is the time taken for the computer processor to evaluate the approximation to the one or more functions in the approximation architecture, and T is the time taken for the computer processor to evaluate the one or more functions.

According to another aspect of the invention there is provided a computer-implemented method of determining one or more future behaviour forecasts for a system. The method is implemented on a computer system including a computer processor. The method comprises executing the processing steps of the forecasting system described above to determine the future behaviour forecasts. The approximation architecture of the forecasting system is trained according to the method described above.

The processing steps may comprise determining one or more metrics based on the determined one or more approximated parameters. If the one or more metrics satisfy one or more conditions then the future behaviour forecast of the system may be determined. If the one or more metrics do not satisfy the one or more conditions a further plurality of scenarios may be generated on which to determine the future behaviour forecast.

The method may comprise determining whether a dimensionality of the generated plurality of scenarios is the same as the plurality of dimensions of an input layer of the trained approximation architecture. If not, then the method may comprise applying the dimensionality-reducing rules to the generated scenarios to obtain modified scenarios to which the trained approximation architecture is applied.

According to another aspect of the present invention there is provided a non-transitory, computer-readable medium storing instructions thereon that, when executed by a processor, causes the processor to perform the method described above.

According to another aspect of the present invention there is provided a computer system including a computer processor configured to perform the method described above.

According to another aspect of the present invention there is provided a control system for configuring a system to accommodate a future state of the system or further events related to the system. The control system comprises: a computer system including a computer processor for determining one or more future behaviour forecasts for the system in accordance with the method described above; and, a feedback controller for using the future behaviour forecasts determined by the computer system as feedback for the control system to configure the system.

BRIEF DESCRIPTION OF THE DRAWINGS

One or more embodiments of the invention will now be described, by way of example only, in which:

FIG. 23(*b*) schematically illustrates a forecasting system and training of an approximation architecture of the forecasting system according to an example of the invention; and, FIG. 24(*a*) schematically illustrates a configuration of a parameter function module of the prior art forecasting system of FIG. 23(*a*), and FIGS. 24(*b*) and 24(*c*) schematically illustrate respective approximation parameter function modules of the forecasting system of FIG. 23(*b*).

DETAILED DESCRIPTION

Figure 1:
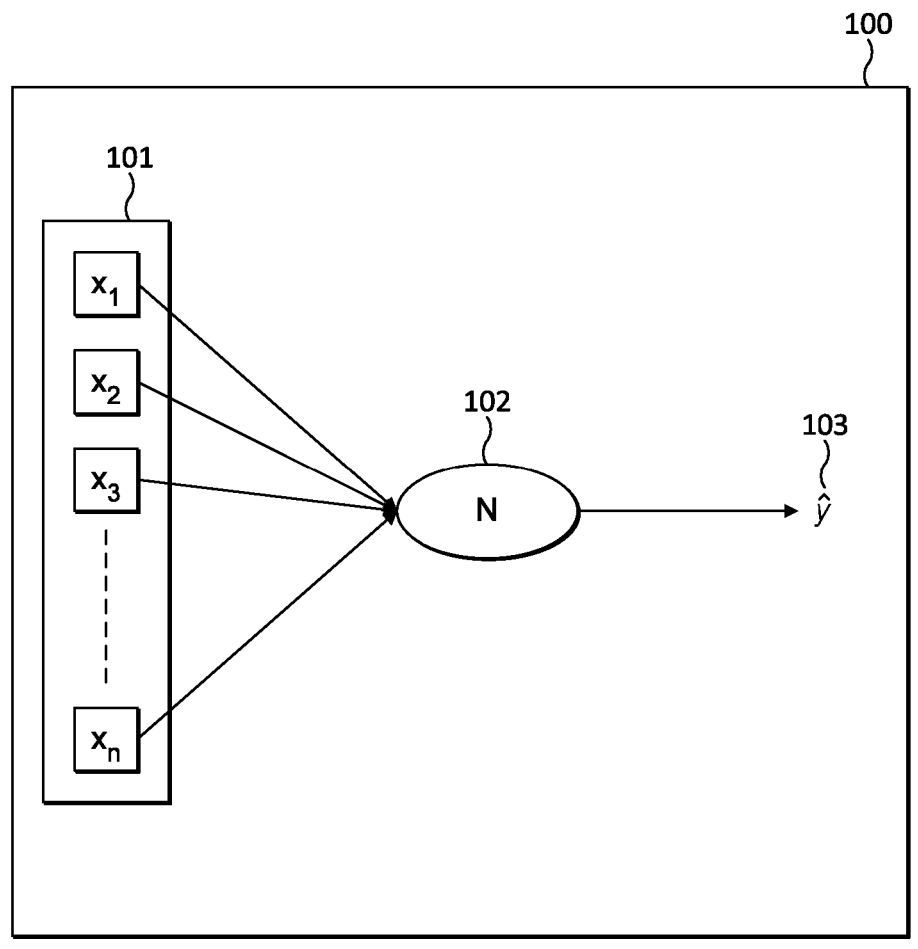
FIG. 1 illustrates a simple neural network (NN) architecture.

There are several techniques and methods that may be used to approximate functions to be evaluated by a computer. These include categories such as iterative methods, asymptotic methods, and weighted residual methods. Examples of methods that may be used include machine learning methods, interpolation, extrapolation, curve fitting, Taylor expansions, perturbation, variational, spectral decomposition, regression, rational approximation, Lagrange, Newton, Hermite, spline methods, polynomial, trigonometric, least-squares, stochastic, differential approximation, discrete, parametric, piecewise methods, tensor methods, finite elements, bilinear. It will be appreciated that many other approximation techniques are known. Furthermore, examples of machine learning methods that may be used include supervised learning, unsupervised learning, reinforcement learning, semi-supervised learning, topic modelling, dimensionality reduction and meta learning, deep learning, self-learning, feature learning, sparce dictionary learning, anomaly detection, robot learning, association rules, neural networks, deep neural networks, decision trees learning, support vector machines, regression analysis, Bayesian networks, genetic algorithms, federated learning. The following will focus on using Neural Networks—which is one type of machine learning method—as an approximation technique; however, it will be appreciated that the techniques described herein may be applicable to various other approximation methods.

Furthermore, an approximation technique may approximate one or several functions at the same time. The following describes a case in which a single function is approximated; however, it will be understood that the described techniques could be applied to functions that are, themselves, collections of other functions.

NEURAL NETWORKS

Given a function $$y=F(x_1,x_2,x_3, \ldots ,x_n)$$

that maps n input "x" values into an output "y" value, Neural Networks (NNs) are combinations of linear and non-linear functions, that can be represented as $$\hat{y}=\hat{F}(x_1,x_2,x_3, \ldots ,x_n)$$

that are calibrated to minimise the error between the function values provided by F and its Neural Network version F.

To enable an easier understanding of the present invention NNs for functions whose output "y" is a one-dimensional number are explained. However, it is to be appreciated that everything described in relation to a one-dimensional-output function can be easily extended to higher-dimensional-output functions with no loss of generality. Also, the process that the NN may attempt to replicate may provide a binary (logic) output (e.g. does this picture contain a cat Y/N?); for this type of function, its NN counterpart F provides a probability for each binary logic answer, to which a probability threshold is applied to compute the NNs answer (e.g. if $\hat{F}$>90%, then it is a cat); for these types of binary functions, everything explained here should be applied to the computation of the probability; i.e. F refers to the probability function.

Simple "Shallow" Neural Networks

FIG. 1 illustrates a simple NN 100, composed of one single neuron 102. All n inputs 101 are fed into the neuron 102 that provides an output $\hat{y}$ 103.

Figure 2:
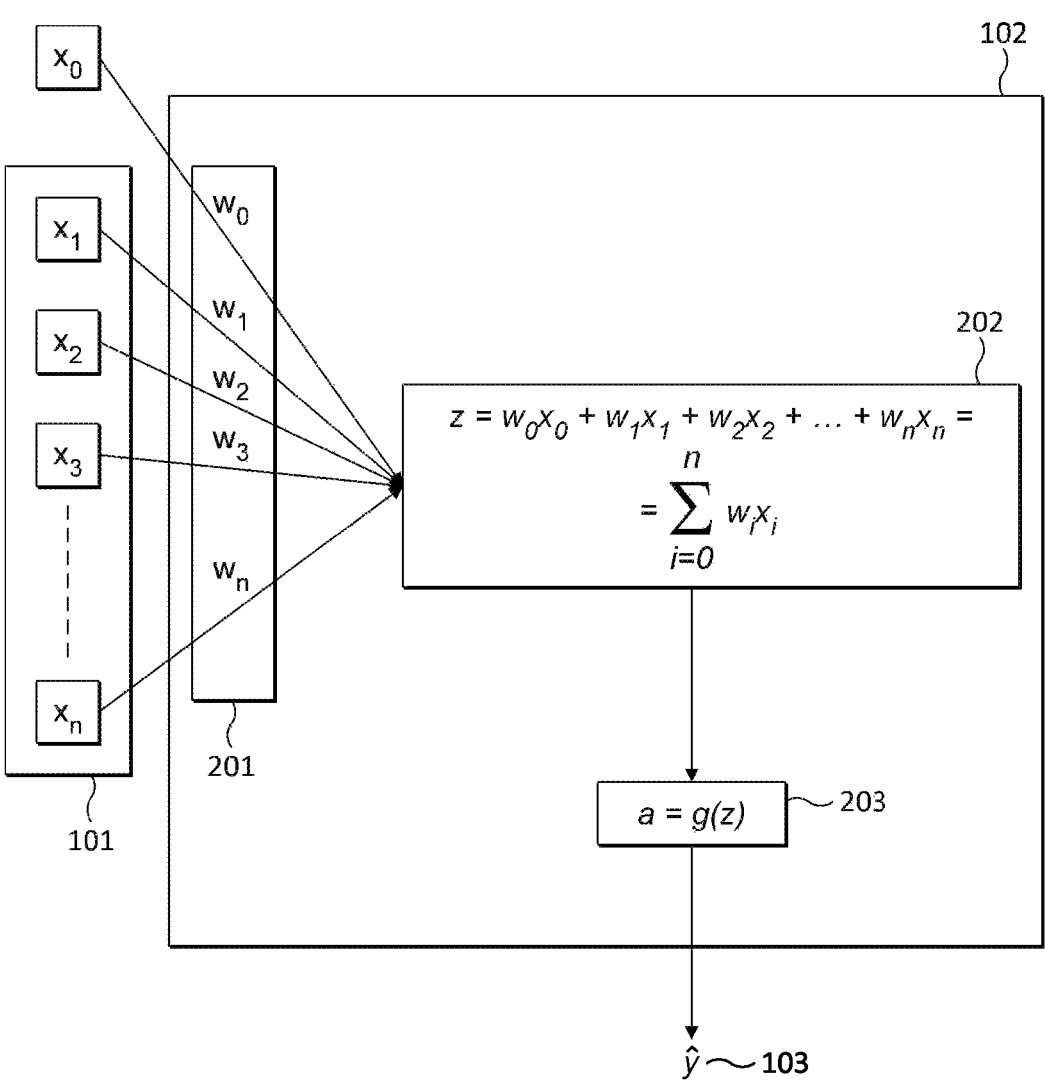
FIG. 2 illustrates a neuron or processing node of the NN architecture of FIG. 2.

The neuron is described in more detail in FIG. 2. Firstly, the n inputs 101 plus an independent value $x_0$=1 are multiplied by n+1 "w" values 201, which are then summed up, to compute a value "z" 202. Secondly, this value "z" is fed to an activation function g(·) to compute a value "a" 203. From the value a, the output $\hat{y}$ 103 is calculated as 9=a.

As a note, the addition of the independent value $x_0$=1 is somewhat optional, but it is most often used in the art as it adds the extra functionality of having a "shift" term in the computation of z, at hardly any extra computational cost. This can increase the predictive capability of the NN.

Typical activation functions g(·) are the Sigmoid function, Hyperbolic Tangent function, Rectifier function (aka ReLU), Softplus function (aka SmoothReLU), Leaky ReLU, Parametric ReLU, Exponential ReLu (aka ELU), Linear or Unitary function (g(z)=z). Further details of these functions will be known to the skilled person and can also be found at https://en.wikipedia.orc/wiki/Activation function.

Figure 3:
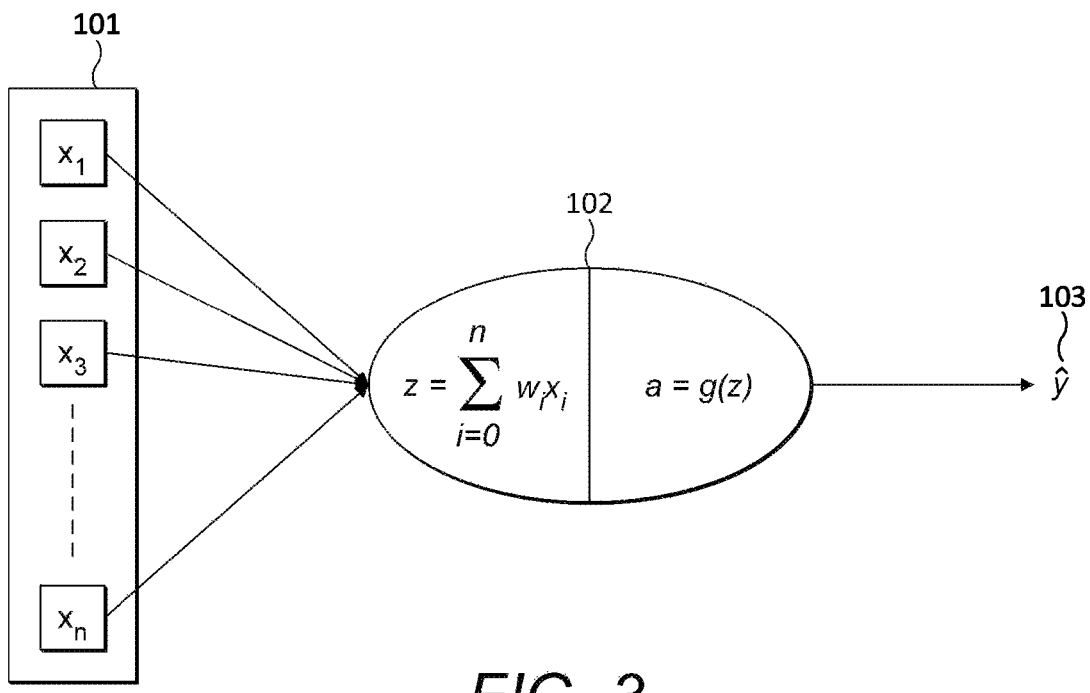
FIG. 3 illustrates an alternative depiction of the neuron of FIG. 2.

It is common in the art to represent a neuron as shown in FIG. 3. Sometimes, the activation function 203 is applied to the neuron inputs before the linear transformation 202.

Parameters and Hyper Parameters

The parameters that define the neuron are the n+1 "w" values 201.

The activation function used in 203 is typically considered a hyper parameter.

However, it is to be noted, that if the activation function depends on some parameters (e.g. g(z)=

$$ELU(z) = \begin{cases} b(e^z - 1); z \le 0 \\ z; z > 0 \end{cases},$$

that depends on a parameter "b"), then that parameter "b" is considered a parameter of the NN).

This parameter vs. hyper parameter definition is important and will be explained further later. From now on, all the parameters of the NN will be referred to as "w" unless stated otherwise.

Training

Training the NN is that act of calibrating its parameters so the result is optimal. This is done for a given set of hyper parameters (i.e. NN architecture or structure). This calculation is also known in the art as "learning".

For the NN to be trained, "m" collections of values $(x_1, x_2, x_3, \ldots, x_n)$ are provided with each collection having its corresponding y value. That is:

$$\begin{bmatrix} x_1^{(1)} \\ \ldots \\ x_n^{(1)} \end{bmatrix} \begin{bmatrix} x_1^{(2)} \\ \ldots \\ x_n^{(2)} \end{bmatrix} \ldots \begin{bmatrix} x_1^{(m)} \\ \ldots \\ x_n^{(m)} \end{bmatrix}, \begin{bmatrix} y^{(1)}, y^{(2)}, \ldots, y^{(m)} \end{bmatrix}$$

In the art, this is the so-called "training set". Each of the m training set's pairs $(\vec{x}^{(j)}, y^{(j)})$ will be referred to as an instance, an element or a sample of the training set.

For a given training set, the NN 100 provides m values for $\hat{y}$,

For each instance "j" of the training set, its loss function "$\mathcal{L}$" is defined, where $\mathcal{L}$ represents a measurement of the distance between $y^{(j)}$ and $\hat{y}^{(j)}$. Typical loss functions used in the art are the quadratic function:

$$\mathcal{L}(\hat{y}, y) = \frac{1}{2}(\hat{y} - y)^2$$

or the cross-entropy function:

$$\mathcal{L}(\hat{y}, y) = -(y \log \hat{y} + (1-y)\log(1-\hat{y}))$$

but other loss functions can be used.

Then, a Cost function is defined, that measures how far apart $[y^{(1)}, y^{(2)}, \ldots, y^{(m)}]$ is from $[\hat{y}^{(1)}, \hat{y}^{(2)}, \ldots, \hat{y}^{(m)}]$ as a whole. A commonly used Cost function is the average of the loss functions, $$C = \frac{1}{m}\sum_{j=1}^{m}\mathcal{L}(\hat{y}^{(j)}, y^{(j)})$$

In the art, this is the so-called 'mean square function'. Other Cost functions could be used too.

The goal of the training calculation is to answer the following question: which set of parameters (represented as w) can be found that minimise the Cost function C? This question translates into finding the set of n+1 "w" parameters 201 that minimise the Cost function C.

As said, answering this question is known as "training the Neural Network". When it is answered, it is said that the NN has learnt or has been trained.

A widely used method to train the NN is the so called Gradient Decent method, which is explained here. However, other methods could be used too without loss of generality.

Gradient Descent

The training process takes place through an iterative looping process, where, in each iteration, the parameters w are updated. This is done in a loop until some end condition (e.g. confidence level) is satisfied such that the Cost function 'C' has been minimised.

The training process starts by, at the beginning of loop 1, giving each of the NN parameters w certain starting values; they are typically picked randomly. In each iteration of the loop, each of the parameters $w_i$ is updated as follows:

$$w_i := w_i - a\, dw_i$$

where $$dw_i = \frac{\partial C}{\partial w_i}$$

Where a, the so called "learning rate", is a hyper parameter of the NN, $\sigma C$=change in the Cost function and $\sigma w_i$=change in parameter $w_i$.

Figure 4:
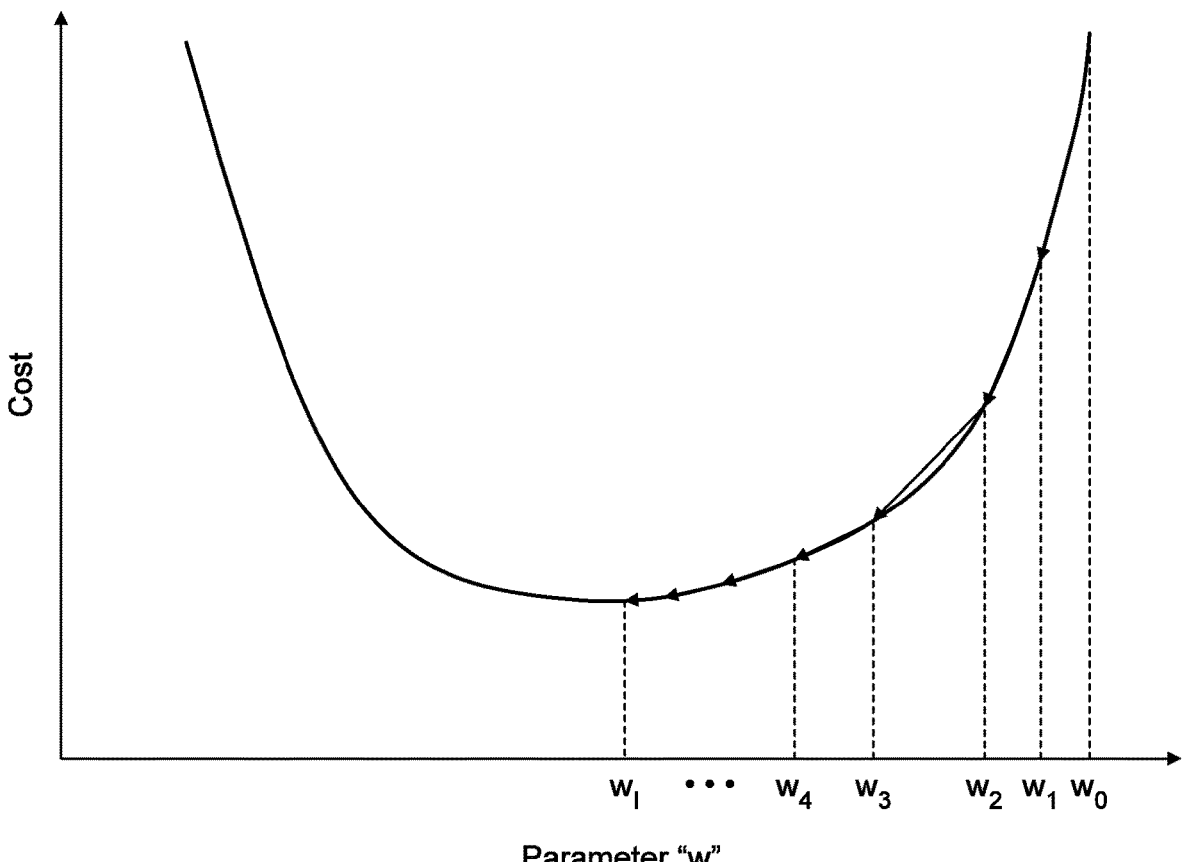
FIG. 4 illustrates a learning rate of a weight of the neuron of FIG. 2.

This process is graphically illustrated in FIG. 4. A given parameter $w_i$ starts at a given value ($w_0$). In an iterative process, with each iteration described by an index i, $dw_i$ is computed and $w_i$ is updated to a new value. The Cost function C should decrease with the new values of the parameter w. This process is repeated many times, in particular "I" times, so that the Cost function C reaches a minimum value, or a value very close to its minimum.

There are several ways to establish when this process stops; i.e. to set I. A simple one is by setting it to a fixed given number. Another method uses the fact that, as the point of minimum C is approached, it is known that:

$$\frac{\partial C}{\partial w_i} \approx 0$$

That also means that the parameters are hardly updated for subsequent loops (iterations). Hence, the computer calculation can be set so that when the parameters are updated by less than a certain value (e.g. 0.1% of their value), then the learning process stops. An alternative method comprises monitoring in each loop the value of C, so that when it is hardly changed by the iteration, it can be concluded that the Cost function C must have reached a minimum.

Figure 5:
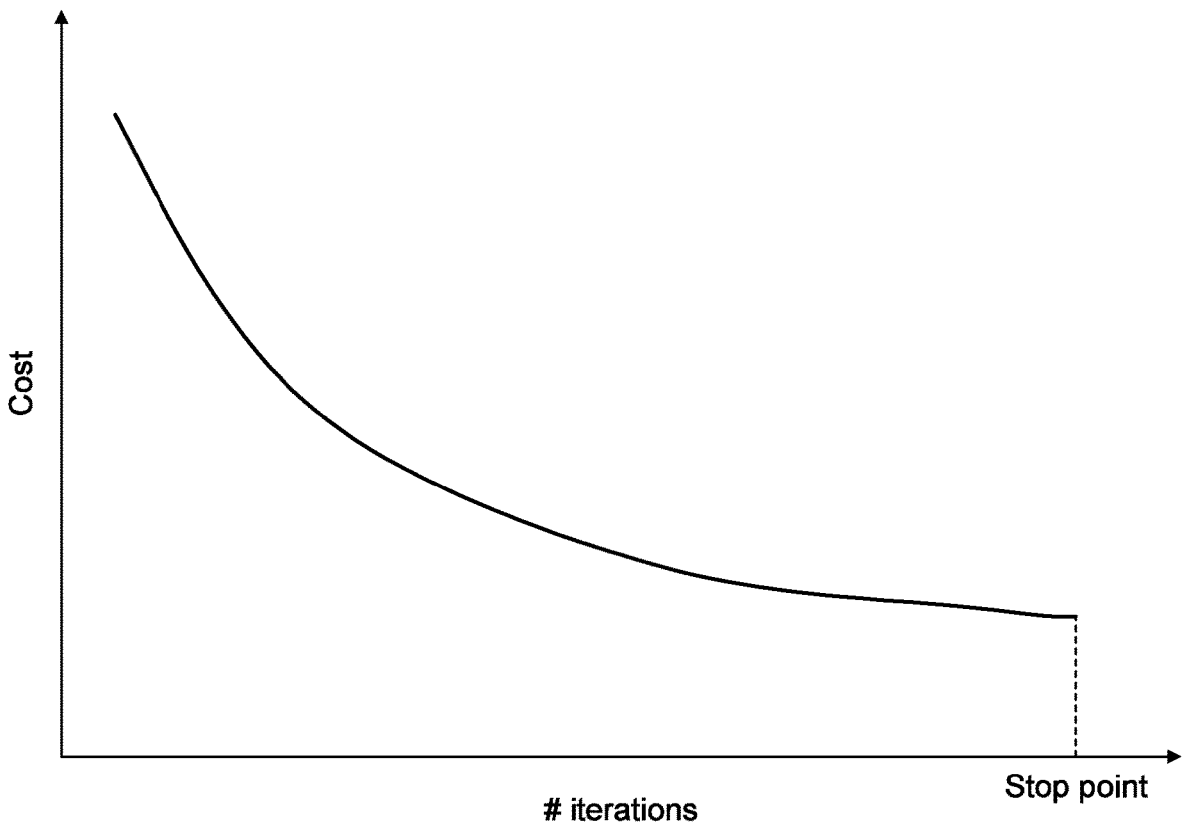
FIG. 5 illustrates a stopping point in terms of iterations when training the weight of FIG. 4.

This idea is depicted in FIG. 5.

In each loop of the training process, the derivative of the Cost function with respect to each of the parameters must be computed. In particular, in the example in which the Cost function is the average of the Loss function across the training set, and denoting $\mathcal{L}^{(j)} = \mathcal{L}(\hat{y}^{(j)}, y^{(j)})$, $$\frac{\partial C}{\partial w_i} = \frac{1}{m}\sum_{j=1}^{m}\frac{\partial \mathcal{L}^{(j)}}{\partial w_i}$$

where $$\frac{\partial \mathcal{L}^{(j)}}{\partial w_i} = \frac{\partial \mathcal{L}^{(j)}}{\partial a^{(j)}}\frac{\partial a^{(j)}}{\partial z^{(j)}}\frac{\partial z^{(j)}}{\partial w_i}$$

noting that a=ŷ, and that for each training sample "j" a$^{(j)}$=ŷ$^{(j)}$ is obtained.

Using as an illustrative example the case in which the Loss function is the cross-entropy function and the activation function is the Sigmoid function, then $$\frac{\partial \mathcal{L}^{(j)}}{\partial a^{(j)}} = -\frac{y^{(j)}}{a^{(j)}} + \frac{1 - y^{(j)}}{1 - a^{(j)}}$$

$$\frac{\partial a^{(j)}}{\partial z^{(j)}} = a^{(j)}\left(1 - a^{(j)}\right)$$

$$\frac{\partial a^{(j)}}{\partial w_i} = x_i$$

This computation can be done for each training sample "j", working backwards in the calculation. For each sample "j" of the training set, $$\frac{\partial \mathcal{L}^{(j)}}{\partial w_i}$$

can be computed and then averaged to obtain $$\frac{\partial C}{\partial w_i}.$$

With these values, the parameter values are updated as per $w_i := w_i - a \, dw_i$, and then the next iteration of the looping process commences with the new values of the "w" parameters. As said previously, the computation iterates through this loop until it is satisfied that it has reached a minimum value of the Cost function.

Forward and Backward Propagation of the NN

In the art, the computation to calculate ŷ is called "forward propagation" and the computation to calculate the collection of $dw_i$ is called "backward propagation".

Complex "Deep" Neural Networks

The NN explained above is the simplest NN; it contains only one layer and one neuron. More complex NNs can be created by concatenating them as shown and described in this section. As the NNs become more complex, it is said in the art that they become "deeper" NNs. Simple NNs are described as "shallow" and complex ones as "deep".

A deep NN consists of a plurality of neurons stacked on top of each other in what it is called a "layer", and then, often, multiple layers are concatenated, one after another. This is depicted schematically in FIG. 6.

Figure 6:
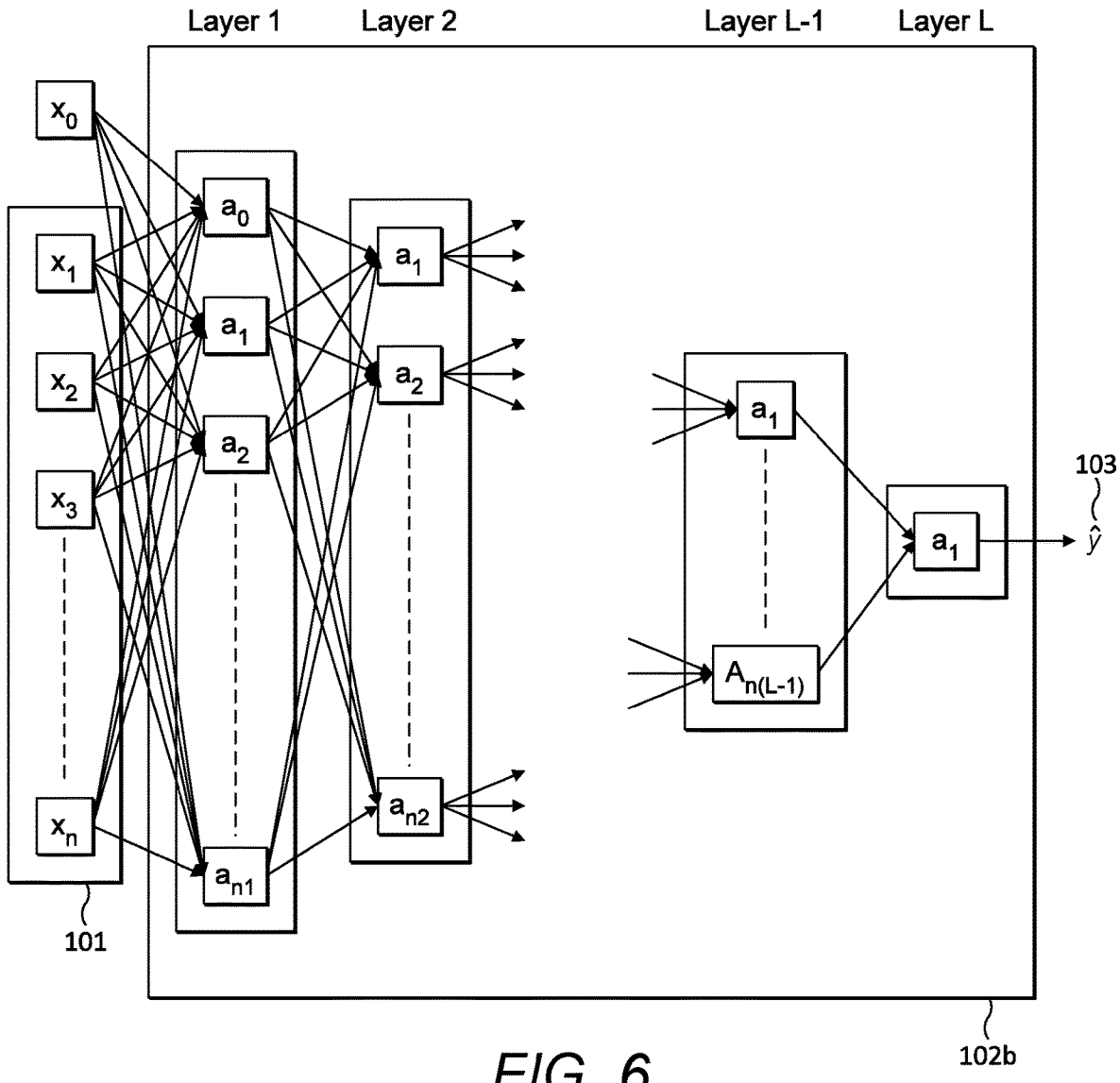
FIG. 6 illustrates a deep NN architecture.

The NN 102b represented in FIG. 6 has L layers, each of them with a plurality of neurons. The first layer has n$^{[1]}$ neurons, the second layer has n$^{[2]}$ neurons, etc. The number of layers L, and the number of neurons in each layer $\{n^{[1]}, n^{[2]}, \ldots, n^{[L]}\}$ are hyper parameters of the NN.

A note on notation: a number in a square bracket represents the layer number, in a circular bracket represents an instance of the training set, and a number without a bracket represents a neuron inside a layer. For example, $$\zeta_2^{(3)[6]}$$

represents the value of variable $\zeta$ in the 2$^{nd}$ neuron of the 6$^{th}$ layer, for the 3$^{rd}$ instance of the training set.

Each neuron has a structure as explained before. The inputs to a given neuron in layer "l" are the outputs of the n$^{[l-1]}$ neurons of the previous layer, $$\{a_i^{[l-1]}\}_{i=1}^{n^{[l-1]}}.$$

Those inputs are multiplied for a number of parameters $w_i^{[l]}$ and then summed up into a z variable. For example, for neuron j in layer l, $$z_j^{[l]} = \sum_{i=0}^{n^{[l-1]}} w_i^{[l]} a_i^{[l-1]}$$

Notes: For the first layer (i.e. [l=1]), the inputs to its neurons are the input data 101; hence, this notation also works for l=1 by making $a_i^{[0]} = x_i$. Also, note that i=0 represents an independent element; that is, $a_0 = 1$ always.

Once the variable $z_j^1$ has been computed, the activation function of that layer $g^{[l]}(\cdot)$ is applied to the z parameters, obtaining the output of the neuron j in layer l $$a_j^{[l]} = g^{[l]}\left(z_j^{[l]}\right)$$

To be noted that, as said, the activation function could be applied to the inputs before the computation of the z parameters is carried out; this case is less frequent in the art, but it could happen. Also, an activation function could be applied before z is computed as well as after.

The number of layers L, number of neurons in each layer $\{n^{[1]}, n^{[2]}, \ldots, n^{[L]}\}$ and the activation function in each layer $\{g^{[1]}, g^{[2]}, \ldots, g^{[L]}\}$ are hyper parameters of the NN. The collection of $w_l^{[k]}$, as well as any parameter that the activation functions may have or any parameter that is updated in each iteration of the learning loop, are considered parameters of the NN.

Typically, each layer has one single type of activation function. However, the NN could be also designed so that different neurons in a given layer have different activation functions.

Training

The training of deep NNs follows an equivalent procedure to the one explained above for a simple shallow NN.

In a forward propagation, the NN computes a value 9 for each of the m input samples in the training set:

$$\begin{bmatrix} x_1^{(1)} \\ \cdots \\ x_n^{(1)} \end{bmatrix} \begin{bmatrix} x_1^{(2)} \\ \cdots \\ x_n^{(2)} \end{bmatrix} \cdots \begin{bmatrix} x_1^{(m)} \\ \cdots \\ x_n^{(m)} \end{bmatrix}$$

Hence it computes $$[\hat{y}(1), \hat{y}(2), \ldots, \hat{y}(m)]$$

This is done computing, in each neuron $$z_j^{(k)[l]} = \sum_{i=0}^{n^{[l-1]}} w_i^{[l]} a_i^{(k)[l-1]}$$

and $$a_j^{(k)[l]} = g^{[l]}\left(z_j^{(k)[l]}\right)$$

This calculation is done layer by layer, and neuron by neuron, for each instance of input sample k.

It starts by initialising the parameters (w) of the NN to, typically, some random values. Then, it starts with layer 1, neuron 1 and instance 1, computing $z_1^{(1)[1]}$, followed by $a_1^{(1)[1]}$. Then the computation moves to the next neuron and computes $z_2^{(1)[1]}$ and $a_2^{(1)[1]}$, continuing in the first layer until $z_{n[1]}^{(1)[1]}$ and $a_{n[1]}^{(1)[1]}$ computed. Then it moves to the second layer and computes $z_1^{(1)[2]}$ and $a_1^{(1)[2]}$ followed by $z_2^{(1)[2]}$ and $$a_2^{(1)[2]},$$

continuing up to $$z_{n[2]}^{(1)[2]}$$

and $$a_{n[2]}^{(1)[2]}.$$

Then it moves to the next layer and does the same computation. This is done up to the last layer, that computes $$z_{n[L]}^{(1)[L]}$$

and $$a_{n[L]}^{(1)[L]}.$$

Then, $$\hat{y}^{(1)} = a_{n[L]}^{(1)[L]}.$$

Then, the computation moves to the second instance of the input sample, and computes $\hat{y}^{(2)}$ as explained in the previous paragraph.

This is repeated through all the instance of the input sample. The outcome of the forward propagation is, hence, the collection of values $$\hat{y}^{(1)}, \hat{y}^{(2)}, \dots, \hat{y}^{(m)}]$$

Next, similarly to the example of the simple NN, the loss value for each instance of the input sample is computed, followed by the cost value $$C = \frac{1}{m} \sum_{j=1}^{m} \mathcal{L}\left(\hat{y}^{(j)}, y^{(j)}\right)$$

Following the forward propagation, the backwards propagation is carried out. In it, the changes to each of the NN parameters are computed, so that at the end of it, they are updated $$w_i := w_i - a\ dw_i$$

where $$dw_i = \frac{\partial C}{\partial w_i}$$

so that the final parameters minimise the Cost function.

Similarly to the simple case shown above, the $$\frac{\partial C}{\partial w^i} = \frac{1}{m} \sum_{j=1}^{m} \frac{\partial \mathcal{L}^j}{\partial w^i}$$

and each term $$\frac{\partial \mathcal{L}^j}{\partial w^i}$$

is computed applying the chain rule layer by layer, and neuron by neuron.

This iterative process (forward propagation, backward propagation and parameters update) is repeated many times, until the end condition is satisfied, namely that a minimum of the Cost function has been approached. When so, the learning process has finished, the parameters found are the final parameters, and it is said that the NN has learnt or has been trained.

a Modular View of the Learning Computation

Figure 7:
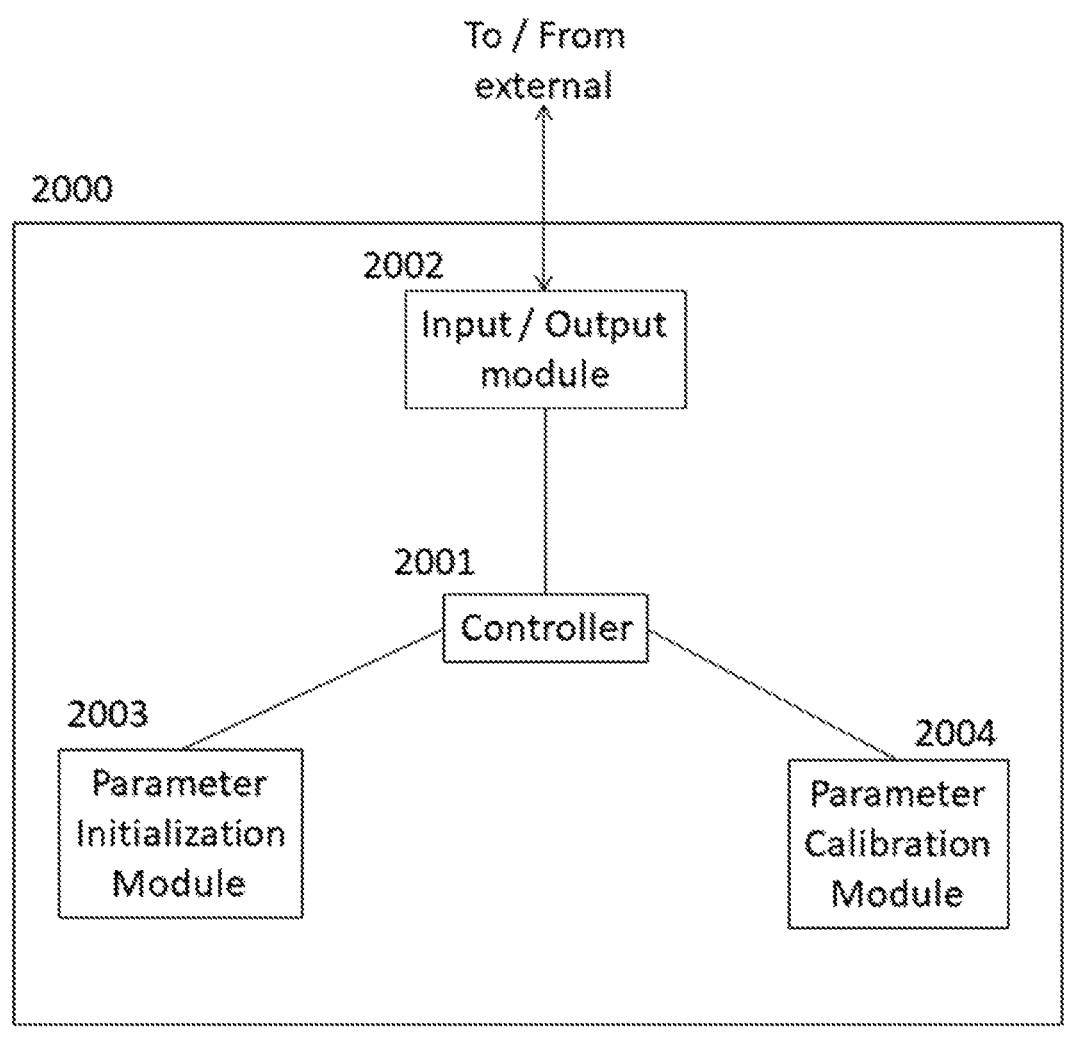
FIG. 7 illustrates different components of a training module for training the NN of FIG. 6.

A training module 2000 of a NN in a schematic view is shown in FIG. 7. The NN training module 2000 is comprised of a Controller 2001, an Input/Output module 2002, a Parameter Initialisation module 2003 and a Parameter Calibration module 2004. When the Training starts, the Input/Output module 2002 receives the hyper parameters of the Neural Network (i.e. the architecture of the NN; details of parameters vs hyper parameters are discussed later) as well as the "m" training samples described above. Module 2003 initialises the NN parameters to, typically, random values distributed according to a normal Gaussian distribution (however, it must be noted the initialisation may be done to other distributions or values that, driven by the know-how and experience of the skilled individual, may consider to work better for the NN hyper parameters and problem to be solved at hand; this learning process is typically done via an empirical trial-and-error process by the skilled individual. This degree of freedom does not have any relevant impact in the present invention as is explained later).

After the parameters have been initialised, module 2004 finds the optimal set of parameters for the NN. Once found, the controller 2001 passes them to the Input/Output module 2002 that passes them to the external environment (to configure the NN).

The Parameter Calibration module 2004 is now described in greater detail with reference to FIGS. 8, 9*a*, 9*b* and 9*c*.

Figure 8:
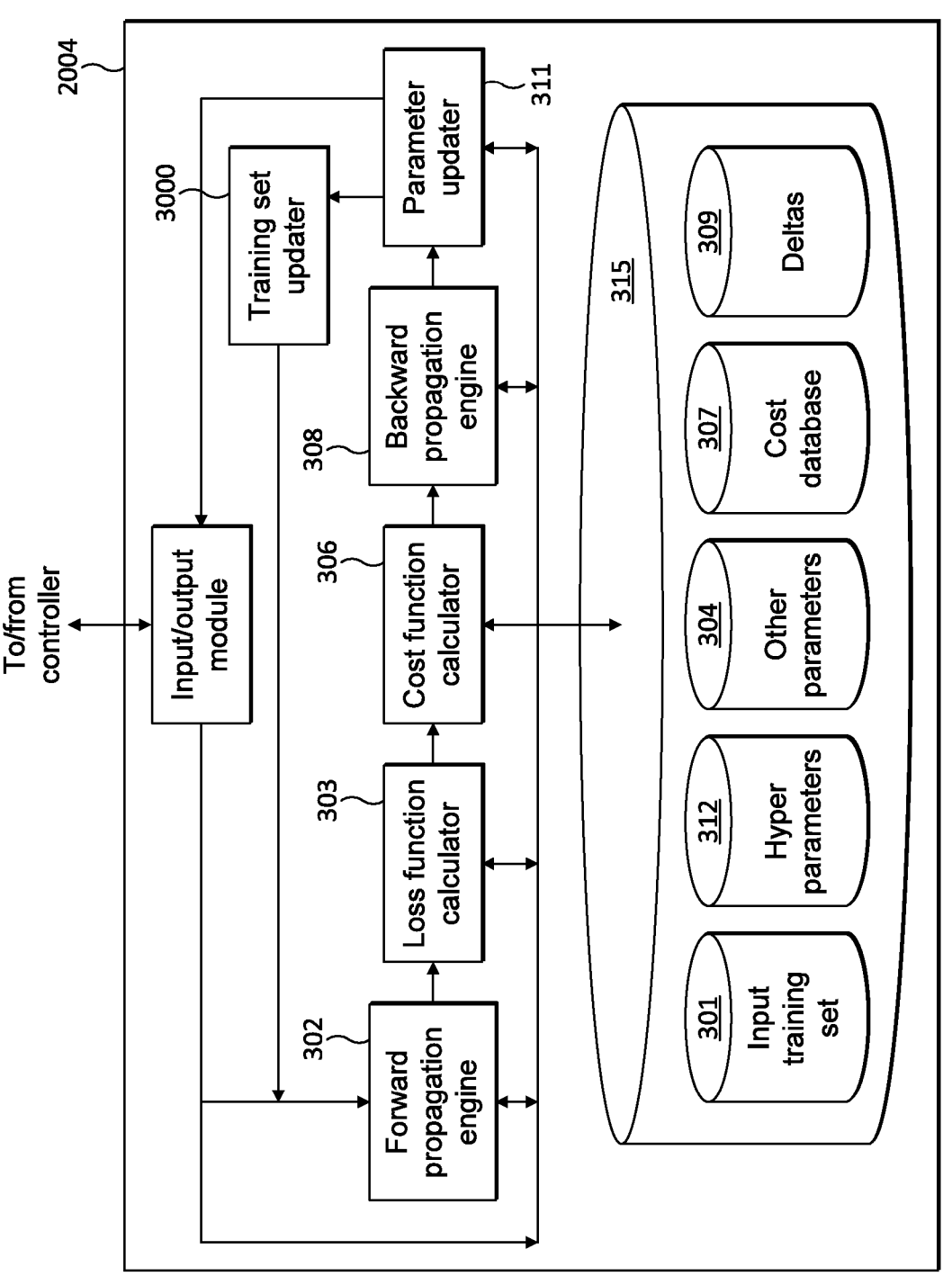
FIG. 8 illustrates different components of a parameter calibration module of the training module of FIG. 7.
Figure 9A:
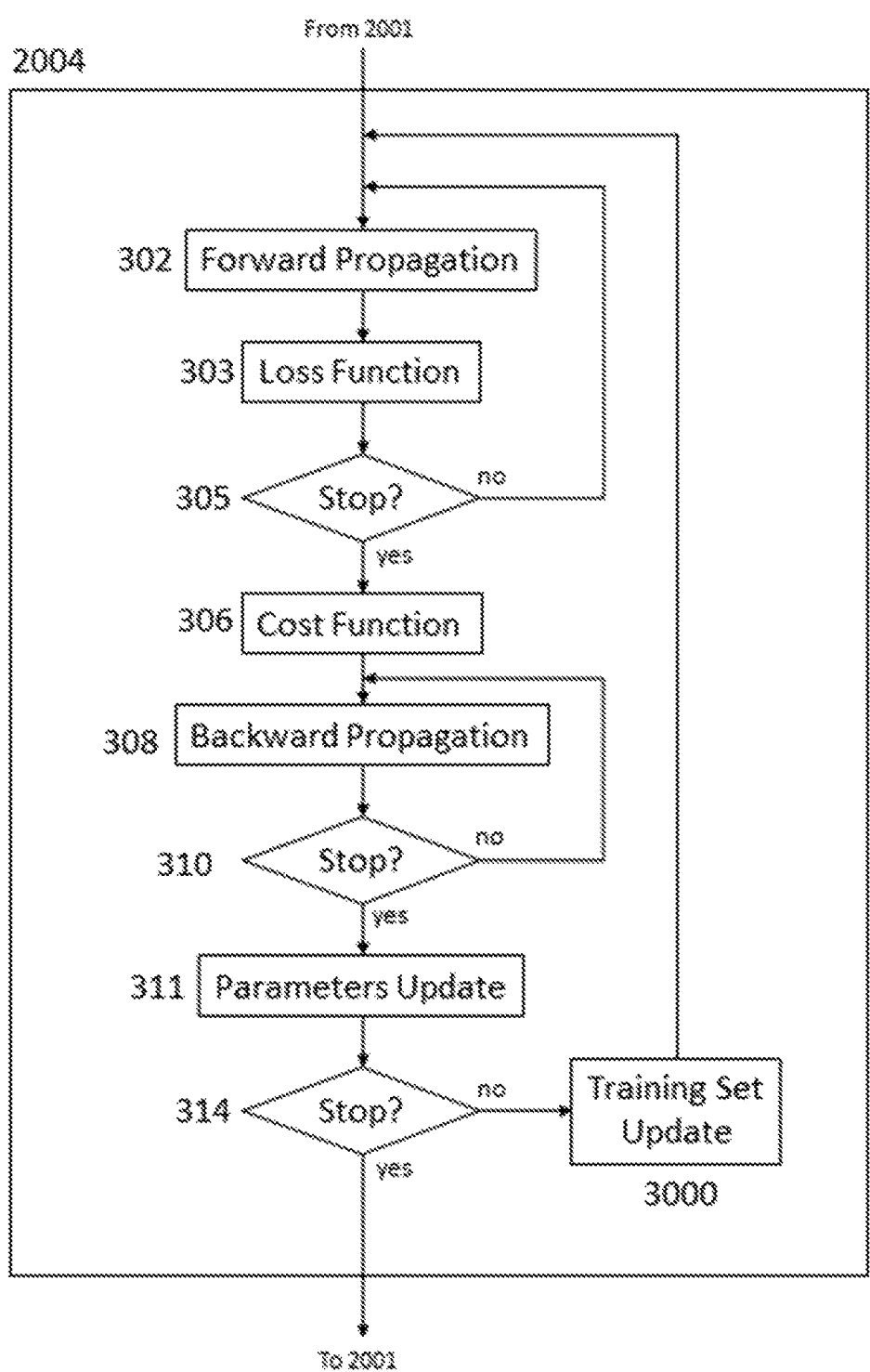
FIG. 9(a) illustrates the steps of a method performed by the parameter calibration module of FIG. 8.

FIG. 8 shows the structure of the Parameter Calibration module 2004 and FIG. 9*a* shows the method of operation of the Parameter Calibration module. Referring to these figures it can be seen that Module 2004 receives from the controller

2001 the NN hyper parameters (e.g. number of layers, number of neurons in each layer, activation function in each layer, etc.), the initialised parameters (e.g. $w_0, w_1, w_2, \ldots, w_n$) and the input training set.

$$\begin{bmatrix} x_1^{(1)} \\ \cdots \\ x_n^{(1)} \end{bmatrix} \begin{bmatrix} x_1^{(2)} \\ \cdots \\ x_n^{(2)} \end{bmatrix} \cdots \begin{bmatrix} x_1^{(m)} \\ \cdots \\ x_N^{(m)} \end{bmatrix}, \left[ y^{(1)}, y^{(2)}, \ldots, y^{(m)} \right]$$

The input training set is stored in a data store 315 and, more specifically, as an input training data set 301. The NN parameters w and the hyper parameters are also stored in the data store 315 and, more specifically, as a set of hyper parameters 312.

Then, the first instance of the input training set $(x_1^{(1)}, x_2^{(1)}, \ldots, x_n^{(1)}); y^{(1)})$, the parameters w and the hyper parameters are passed to module 302, where the forward propagation is carried out. In this forward propagation, for a given sample of inputs $(x_1, x_2, \ldots, x_n; y^{(1)})$, an output f is calculated; hence, module 302 computes $\hat{y}^1$ and outputs it. The values $\hat{y}^1$ and $\hat{y}^1$ are stored in the data store 315 as other parameters 304, as well as all the values of the intermediate steps in the forward propagation (the $z^{(1)}$ and the $a^{(1)}$ in each layer and neuron).

Next, the loss function calculator 303 computes the loss value $\mathcal{L}$ for that instance of the input training sample; for example, $$\mathcal{L}^{(1)} = \mathcal{L}\left(\hat{y}^{(1)}, y^{(1)}\right) = \frac{1}{2}\left(\hat{y}^{(1)} - y^{(1)}\right)^2$$

The $\mathcal{L}^{(1)}$ value is stored in the data store 315 as part of the other parameters 304.

Next, the Parameter Calculation module 2004 decides whether to compute another iteration of the loop or not. If all $\hat{y}$ values that correspond to all the m instances of the input training sample have been computed, the Parameter Calculation module 2004 stops the loop. Otherwise, it goes through another occurrence of the loop. In this new occurrence, the process as shown in FIG. 9a picks the next instance from the input training set 301 stored in the datastore 315, then the forward Propagation Engine 302 computes its $\hat{y}$, the Loss Function Calculator 303 computes its loss value, all the computed information is stored in the data store 315 with the other parameters 304. The Parameter Calculation module 2004 decides at Step 305 again if another recurrence of the loop is required or not. Once all the m instances of the input training sample have been processed in this looping process, the Parameter Calculation module 2004 stops the loop.

Next, the Cost Function module 306 computes the Cost function at Step 306 of the training sample for the parameters used in the Forward Propagation Engine 302 (e.g. $w_0$, $w_1$, $w_2$, $\ldots$, $w_n$). An example of Cost function commonly used is $$C = \frac{1}{m}\sum_{j=1}^{m}\mathcal{L}\left(\hat{y}^{(j)}, y^{(j)}\right)$$

The value of the Cost function is stored in the data store 315 within the Cost Database 307.

Next, the information stored in the input training set 301 and the other parameters 304 for the first instance of the training sample is selected. This information is passed to the Backward Propagation Engine 308, where the NN backwards propagation calculation is carried out. The Backward Propagation Engine 308 computes the "deltas" of the parameters for the first instance of the training set $(dw_0^{(1)}, dw_1^{(1)}, dw_2^{(1)}, \ldots, dw_n^{(1)}$. These deltas are then stored in the data store in a deltas data store 309. The Parameter Calculation Module 2004 then decides at step 310 if going through another concurrence of the loop is required. If the deltas of all m instances of the training set have been computed, the Parameter Calculation Module 2004 at Step 310 stops the loop; otherwise, the process loops back and continues with the next occurrence. In the next occurrence, the next instance of the training sample is selected and its respective deltas are computed by the Backward Propagation Engine 308. Once all instances of the training set have been used for a background calculation in the Backward Propagation Engine 308 and stored, the Parameter Calculation Module 2004 stops the looping at Step 310.

Next, the Parameter Updater 311 updates the NN parameters as follows:

$$w_i := w_i - a\, dw_i$$

The data store 309 contains a delta for each of the parameters i, and training set instances j, $dw_i^{(j)}$. With that information, module 311 computes the deltas for each parameter, $dw_i$ as, for example, the average across the m training samples. Then, the parameters $w_i$ are updated by module 311. Both the old and new parameters (i.e. before and after the update) are stored in the data store as hyper parameters 312.

Next, the Parameter Calculation Module 2004 decides at Step 314 whether to stop the training process or not. That decision can be based on several parameters. For example, the Parameter Calculation Module 2004 may decide at Step 314 to stop the training process after a given number of interactions through the learning loop (by learning loop it is meant the computation just described of forward propagation 302, loss function 303, Cost function 306, backwards propagation 308 and parameters update 311). Also, the Parameter Calculation Module 2004 may access at Step 314 the cost values stored in the cost database 307 and stop when the Cost function hardly changes (e.g. less than 0.01% of its value) in adjacent iterations. Also, it may decide to assess the changes of the parameters themselves and stop when they hardly change (e.g. when the parameter that changes most has a change of less than 0.01% of its value) in adjacent iterations. Also, this assessment could be carried out using the last two values of the cost value or NN parameters, or the last three, or four, etc. Each of these options is a hyper parameter of the NN.

The idea is that the Parameter Calculation Module 2004 uses at Step 314 a metric to assess if the parameters change any more in a significant manner by further iterations. When they do not change any more in a significant manner, it is said that the NN has learnt or has been trained.

When the Parameter Calculation Module 2004 determines at Step 314 that NN has learnt, the learning looping calculation stops. Otherwise, it continues again to another iteration of the learning loop (described above), but with the updated parameters this time.

Note: the training set updater 3000 is optional, and will be described later in the document.

The number of iterations in the learning loop is referred to as l.

Forward and Backward Propagation

Figure 9B:
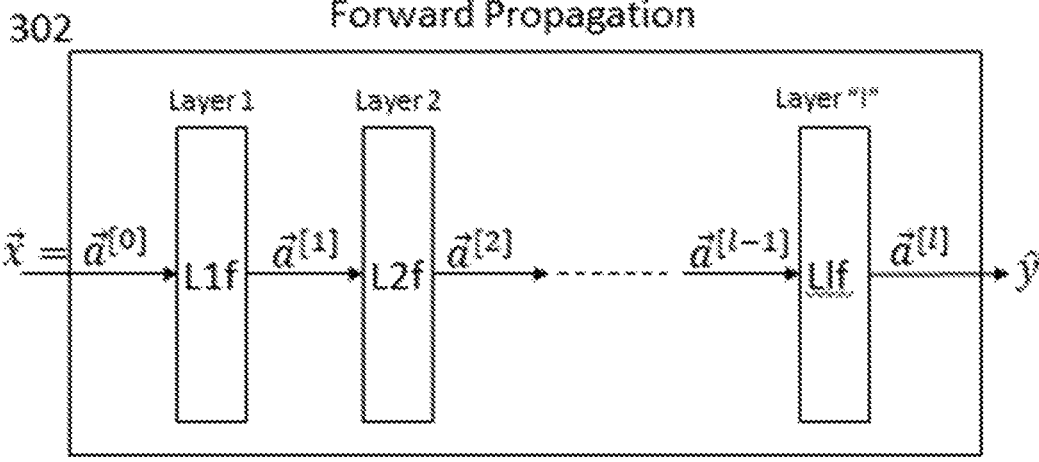
FIG. 9(b) further illustrates the forward and backward propagation engines of FIG. 8.
Figure 9B:
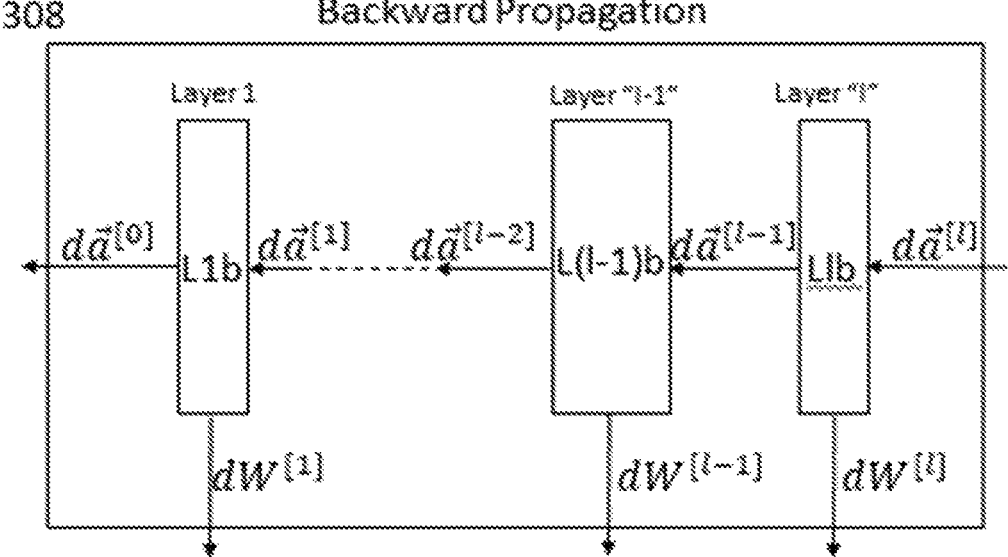

The Forward Propagation module 302 and Backward Propagation module 308 are further explained in FIG. 9*b*.

For ease of illustration, the following vectorised and matrix notation is used in an exemplary example which considers the first layer of a neural network. For easy of illustration, in this example it is assumed that the input space has six variables $(x_1, x_2, \ldots, x_6)$ (i.e. n=6) and the first layer has two neurons (i.e. $n^{[1]}=2$)). In this case, there are 6+1 w parameters for each neuron of the first layer and the matrix is built as follows:

$$W^{[1]} = \begin{bmatrix} w_{0,1}^{[1]} & w_{0,2}^{[1]} \\ w_{1,1}^{[1]} & w_{1,2}^{[1]} \\ w_{2,1}^{[1]} & w_{2,2}^{[1]} \\ w_{3,1}^{[1]} & w_{3,2}^{[1]} \\ w_{4,1}^{[1]} & w_{4,2}^{[1]} \\ w_{5,1}^{[1]} & w_{5,2}^{[1]} \\ w_{6,1}^{[1]} & w_{6,2}^{[1]} \end{bmatrix}$$

Generalizing this, $W^{[l]}$ refers to the w parameters in the l-th layer of the neural network, and $w_{i,j}^{[l]}$ refers to the calibrating parameter wthat is the connection from neuron "i" in layer "l-1" to neuron "j" in layer "l" (the input layer can be seen as a "layer 0"). Hence, "i" ranges from 0 to $n^{[l-1]}$ (note, it starts from 0 because the $w_0$ connects the independent term $a_0^{[1]}=1$), and "j" ranges from 1 to $n^{[1]}$.

It is to be appreciated that the term 'parameter' has been used in this document in a general sense to cover any variable. It is known that in the art of Neural Networks, the term 'parameter' is normally considered to only be referring to any Neural Network parameter which is updated during the learning loop or any hyper parameter of the neural network. Such parameters define the neural network. Under this construction the Neural Network parameters would be variable parameters of the NN and hyper parameters. This would exclude static parameters such as a and z for example. Having appreciated this, the following refers to all values as parameters.

Also, in the example used, we can vectorize the a parameters by defining the vector $$\vec{a}^{[1]} = \begin{bmatrix} a_0^{[1]} = 1 \\ a_1^{[1]} \\ a_2^{[1]} \end{bmatrix}$$

Generalizing, $a_i^{[l]}$ refers to the 'a' parameter computed by the i-th neuron in the l-th layer. Similarly to $\vec{a}^{[l]}$, we can define the vector $\vec{z}^{[l]}$ for the z parameters in layer "l".

Similar definitions can be done for their changes in each learning iteration, hence defining dW and $d\vec{a}$. For example:

$$dW^{[1]} = \begin{bmatrix} dw_{0,1}^{[1]} & dw_{0,2}^{[1]} \\ dw_{1,1}^{[1]} & dw_{1,2}^{[1]} \\ dw_{2,1}^{[1]} & dw_{2,2}^{[1]} \\ dw_{3,1}^{[1]} & dw_{3,2}^{[1]} \\ dw_{4,1}^{[1]} & dw_{4,2}^{[1]} \\ dw_{5,1}^{[1]} & dw_{5,2}^{[1]} \\ dw_{6,1}^{[1]} & dw_{6,2}^{[1]} \end{bmatrix}, \quad d\vec{a}^{[1]} = \begin{bmatrix} da_0^{[1]} = 0 \\ da_1^{[1]} \\ da_2^{[1]} \end{bmatrix}$$

With these definitions, and also defining the input vector as a natural extension of the above terminology, $$\vec{x} \to = \begin{bmatrix} x_0 = 1 \\ x_1 \\ x_2 \\ x_3 \\ x_4 \\ x_5 \\ x_6 \end{bmatrix}, \text{ or } \vec{a}^{[0]} = \begin{bmatrix} a_0^{[0]} = x_0 \\ a_1^{[0]} = x_1 \\ a_2^{[0]} = x_2 \\ a_3^{[0]} = x_3 \\ a_4^{[0]} = x_4 \\ a_5^{[0]} = x_5 \\ a_6^{[0]} = x_6 \end{bmatrix}$$

With this notation, the forward and backward propagation modules can be illustrated as shown in FIG. 9*b*.

The Forward Propagation module 302 starts with $\vec{x}$, or $\vec{a}^{[0]}$. In the layer 1 (module L1f), each neuron computes its z and a values, given $W^{[1]}$ and its activation function $g^{[1]}(\cdot)$, that are taken from the data store of hyper parameters 312, collectively referred to as $\vec{z}^{[1]}$ and $\vec{a}^{[1]}$, $z^{[1]}$ and $a^{[1]}$ are stored in the data store of other parameters 304. Then, similarly, the next layer 2 (module L2f) takes $\vec{a}^{[1]}$ and, given $W^{[2]}$ and its activation function $g[^2(\cdot)$, that are taken from data store of hyper parameters 312, computes $\vec{z}^{[2]}$ and $\vec{a}^{[2]}$, that are stored in the data store of other parameters 304. The calculation continues this process sequentially, layer by layer, until it gets to the last layer "l". $\vec{a}^{[1]}$, calculated by that layer, is ŷ.

The backward propagation module 308 starts computing $d\vec{a}^{[l]}$. Then, module Llb computes $dW^{[l]}$ for the first layer "l" (note, it is first layer in the backward propagation, but its counterpart in the forward propagation 302 was the last layer). $d\vec{a}^{[l]}$ and $dW^{[l]}$ are stored in the data store of deltas 309. $d\vec{a}^{[l]}$ is passed to the next layer (module "L(l−1)b"), that computes $d\vec{a}^{[l-1]}$ and $dW^{[l]}$, which are stored in the data store 315. $d\vec{a}^{[l-1]}$ is passed on to the next layer, and the calculation continues like this layer by layer, until the last layer (which is the counterpart of the first layer in the forward propagation) is reached, where $d\vec{a}^{[0]}$ and $dW^{[1]}$ are compute and stored.

Single Layer Forward and Backward Propagation

Figure 9C:
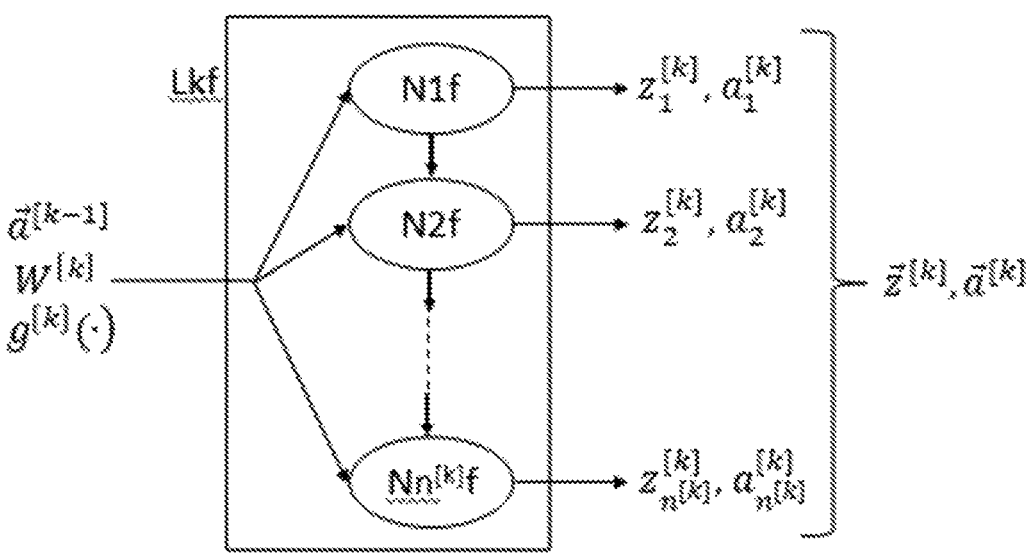
FIG. 9(c) further illustrates calculations performed in the forward and backward propagation engines of FIG. 8.
Figure 9C:
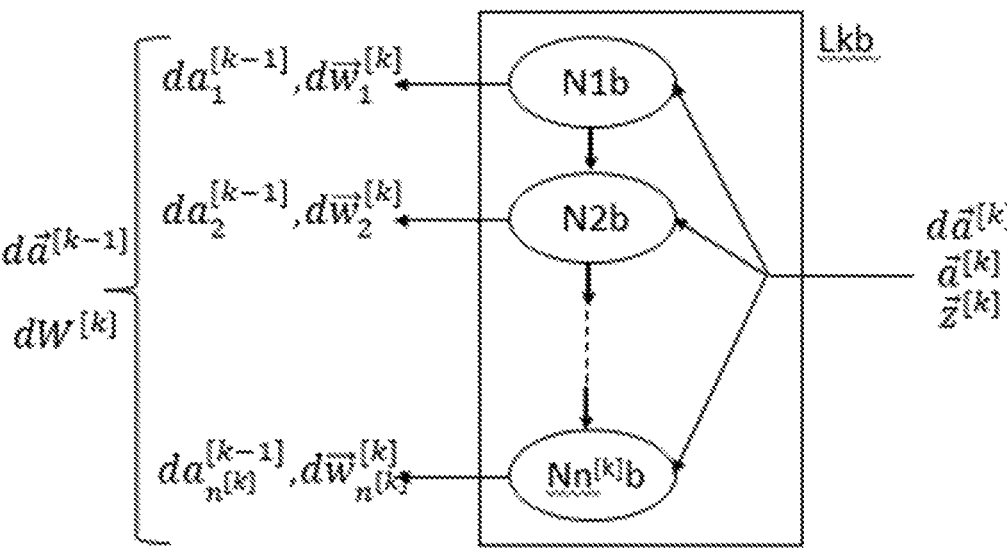

FIG. 9*c* shows in more detail the calculations performed by each layer in the forward and backward propagation, for a generic layer "k".

In the forward calculation for a, the k-th layer of the NN is shown in module Lkf. In it, the computation starts with the first neuron in module N1f, which computes $z_1^{[k]}$ and $a_1^{[k]}$, using $\vec{a}^{[k-1]}$, as well as the first row of the matrix $W^{[k]}$ and $g^{[k]}(\cdot)$. Then it moves to the second neuron in module N2f, which computes $z_2^{[k]}$ and $\vec{a}^{[k]}$, using $\vec{a}^{[k-1]}$, the second row of the matrix $W^{[k]}$ and $g^{[k]}(\cdot)$. Module Lkf continues sequentially up to the last neuron, $Ln^{[k]}f$, which computes $z_{n^{[k]}}^{[k]}$ and $a_{n^{[k]}}^{[k]}$, using $\vec{a}^{[k-1]}$, the last row of the matrix $W^{[k]}$ and $g^{[k]}(\cdot)$. The computed vectors $\vec{z}^{[k]}$ and $\vec{a}^{[k-1]}$ are passed to data store of other parameters 304 then stored.

The backward for layer "k" calculation is computed by module Lkb. The computation starts with the first neuron in module N1b, that calculates $da_1^{[k-1]}$ and $d\vec{w}_1^{[k]}$ taking as inputs $da_1^{[k]}$, $z_1^{[k]}$ and $\vec{a}^{[k]}$. Then, the second neuron in module N2b computes $da_2^{[k-1]}$ and $d\vec{w}_2^{[k]}$ taking as inputs $da_2^{[k]}$, $z_2^{[k]}$ and $a_2^{[k]}$. The calculation continues like this, sequentially, until the last module $Ln^{[k]}b$ computes $da_{n^{[k]}}^{[k-1]}$ and $d\vec{w}[_{n^{[k]}}^{[k]}$ taking as inputs $da_{n^{[k]}}^{[k]}$, $z_{n^{[k]}}^{[k]}$ and $a_{n^{[k]}}^{[k]}$. The computed vectors and matrix $d\vec{a}^{[k-1]}$ and $dW^{[k]}$ are then stored.

Dynamic Computation of the Training Set

In the NN explained above, it is assumed that the training set contains m instances, and that the same training sample is used in every iteration of the learning loop. However, in an alternative version of NN, the training set can be modified in each iteration. This is illustrated in FIGS. 8 and 9 with the training set updater 3000. In such a NN, when a new iteration is started, the training set updater 3000 generates new training instances to be added to the training set.

There are several ways these instances are used by the learning computation in the Parameter Calculation Module 2004. In each iteration of the learning loop, it may use only the newly generated instances at the end of the previous loop. Alternatively, it may use the union of the old plus the newly generated instances, or a subset of them. How the existing and newly generated instances are utilised is a hyper parameter of the NN.

The ways in which the new instances are generated by the training set updater 3000 can be very diverse. For example, if the input training set represents pictures, the training set updater 3000 can create variations of those pictures. If the input training set represents input-output values of the function F, the training set updater 3000 may generate new input-output values based on some information gathered during iterations of the learning loop.

Other Variations of NN

It must be understood that a typical NN has been described, but there are many modifications of this in the art. A good comprehensive list of variations can be found at https://towardsdatascience.com/the-mostly-complete-chart-of-neural-networks-explained-3fb6f2367464

It would be practically impossible to describe all of these variations in detail. Accordingly it is to be understood that, in the present specification, the term 'NN' refers to all and any type of NN known in the art.

It will be understood that a NN is one type of approximation framework. Some other types (e.g. interpolations) have only one layer, and so the concept of a 'layer' tends to be disregarded in them. It must be understood that 'input layer' can refer to the only layer that exists in some approximation frameworks.

Parameters Vs. Hyper Parameters

On one hand, the goal of the training computation of a NN is to find the optimal value for its parameters, which have been symbolised in general as the w parameters. As said, it must be noted that those parameters may include parameters embedded in the activation functions or other parameters. In general, by the term "NN parameter" it is meant any parameter that is updated in each iteration of the training loop.

On the other hand, the NN is defined by a number of hyper parameters. Those include the number of layers, number of neurons in each layer, activation functions in each layer and neuron, the loss function, the Cost function, the learning rate for the update of parameters, the stopping point for the learning 50 iterative loop, etc. Sometimes those hyper parameters are referred to in the art as the "architecture" or the "structure" of the NN.

The Goal of a NN Learning Calculation

When a NN has already learnt, it is said that it has found the function F that can be taken as a substitute for F; in other words, P has been calibrated. By "calibrated" it is meant that the parameters of the forward propagation in module 302 have been optimised. The function F is the forward propagation function in module 302.

The computational challenge:

As said, the goal of the learning or "training" calculation of the NN is to find an P so that $$\hat{F}(x_1,x_2,x_3, \ldots ,x_n) \approx F(x_1,x_2,x_3, \ldots ,x_n)$$

The following difficulties arise:

1. Precision—the calibrated NN function F is generally an approximation to F. Hence, when $\hat{F}(x_1,x_2,x_3, \ldots ,x_n)$ is computed, it will typically give an error compared to the true value $F(x_1,x_2,x_3, \ldots ,x_n)$. The smaller that error, the better and more useful the trained function F will be. This can be difficult to obtain to the extent that, in many cases, the P may not be of practical use for the application at hand if the accuracy is not good enough. As a result, the more accurate F is relative to F, the better the NN is. Consequently, changes to a NN that can increase the precision of F relative to F are beneficial.

2. Number of learning iterations—The training computation will carry out "I" iterations. This number tends to be a very large number, up to many thousands or millions. This creates a computational challenge, as the training computation could take so long, or could require so many computers in parallel (i.e. it could be so expensive), that it may become impractical: the benefits of calibrating P could be outweighed by the time and cost (i.e. time and monetary expense) of its calibration. Hence, changes to a NN that decrease the number/will create a benefit.

3. Size of the training set—the number of instances used in the training set could also be a limiting factor. In some cases, that number may be limited by practical reasons (e.g. there are a limited number of instances of images for training). In some other cases, it may be possible to obtain more instances, but they may be computationally or practically difficult or expensive to obtain (e.g. a NN that tries to calibrate a function that gives optimal set up for a power plant, given different input conditions like price of the electricity in the power markets, load of the national power network, time of the day, day of the week, week of the year, price of the fuel of that runs the plant, or level of the water in a dam, personnel availability, present weather conditions, weather forecasts, etc.). As a result, variations of NNs that can decrease the number of instances in the training set needed to obtain the same (or better) result constitute an improvement to them.

Training effort

The effort required to train a NN can be an important factor in its practical usability. If the effort is too high, the training effort may become prohibitively expensive or impractical. For example, it could take too long to build the training set, as the evaluation of the original function (F) m times may take too long, so that when the training set is ready it is too late to be useful, as the usability of the trained NN may have disappeared. Alternatively, it may be too expensive to build the training set, as computing the original function (F) m times may be accelerated via more powerful hardware, grid computing, etc., but this comes with increased hardware and operational costs.

Another important aspect that affects the training effort is the dimensionality of the input space. By this it is meant the number of single inputs that the input layer of the NN has. This has been denoted in the description so far as "n". In general, the greater the n, the more difficult it is to train a NN.

For example, A. R. Barron showed in "Approximation and Estimation Bounds for Artificial Neural Networks", Machine Learning journal, vol 14, 115-133 (1994), that the error bound for a typical setting of a NN goes as $$\text{error bound} \sim n \frac{\log(m)}{m}$$

That is, the higher the dimensionality of the inputs (n) the higher the error, and the higher the number of elements in the training set (m), the lower the error.

As a result, any manner that may exist to decrease the dimensionality of a NN, or increase the number of elements in the training set, leaving everything else constant, will decrease the error and/or the computational demand of the NN and, hence, improve the NN.

Evaluation Effort

The dimensionality of the input layer will also have an impact in the evaluation effort of the NN, that is, in the evaluating module 302 once the NN has been trained. The higher the dimensionality of the input to the NN, the more neurons and layers will generally be needed to approximate the original function F, and as a result the more computationally costly the evaluation of the NN will be. This higher computational cost means higher computational time, economic cost, or a combination of both.

The Hyper Parameter Challenge

An aspect of NNs is that, in theory, there always exists a NN deep enough to mimic any function F, as long as F has certain minimal properties that are often met in real-life situations. However, this is a theoretical result, and comes with the challenge of finding the correct NN architecture (i.e. hyper parameters) and the subsequent computational challenge of training a NN. That challenge can be so big that it may be impossible to train the NN in real-life situations (e.g. the "theoretical ideal" NN may need thousands of layers with millions of neurons each).

Hyper Parameter Optimisation

The process of finding the optimal hyper parameters is typically a highly empirical process. By this it is meant a "manual" trial-and-error process in which the skilled individual in the art tries different values of the hyper parameters until the obtained F is considered good enough.

Figure 10:
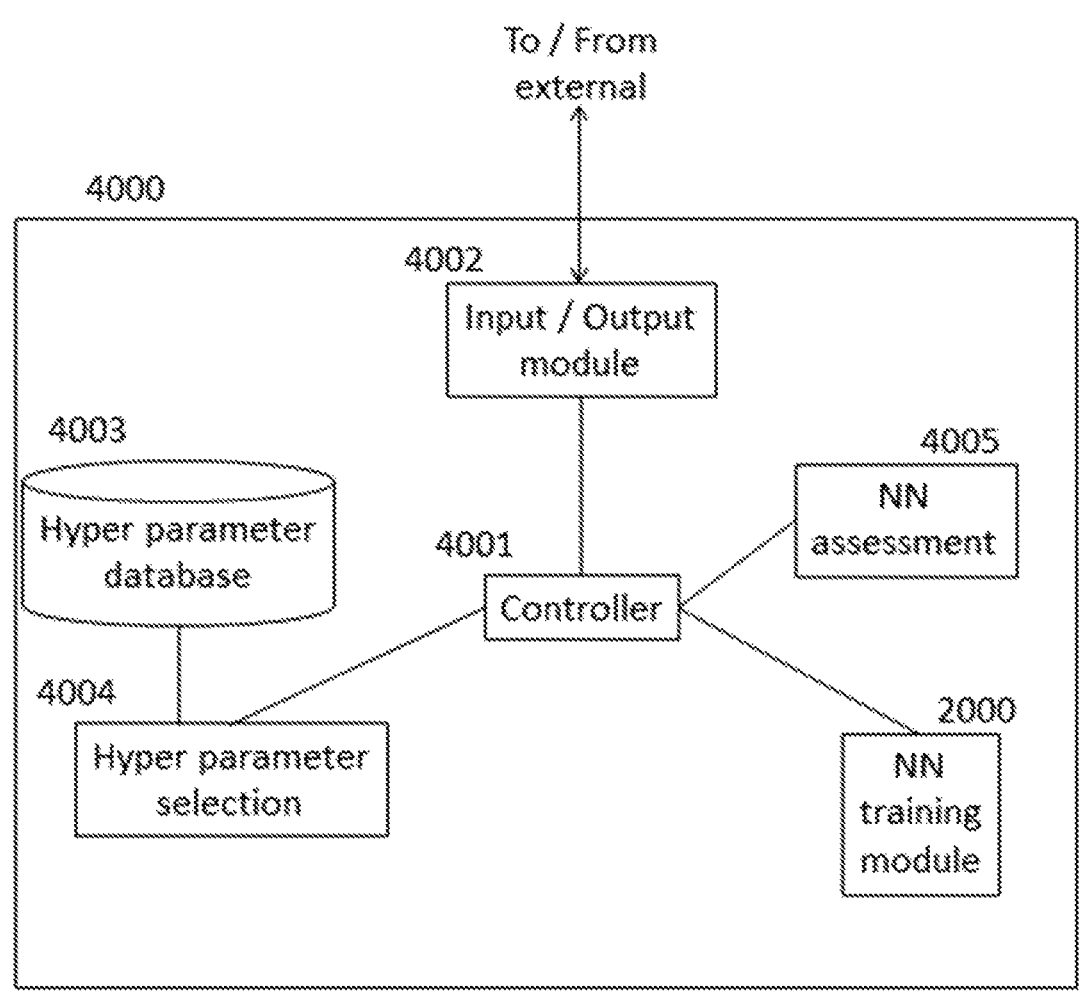
FIG. 10 illustrates different components of a supra-module for training hyper-parameters of the NN of FIG. 6.

As a result, the NN training module 2000 lives inside an overall training module 4000 that performs the task of finding the optimal hyper parameters, which constitutes the training step of the NN. This is illustrated in FIG. 10. This module 4000 comprises a controller module 4001, an Input/Output module 4002, a hyper parameter database 4003 that contains all possible hyper parameter configurations, a hyper parameter selection module 4004, the previously-described NN training module 2000 and a NN assessment module 4005.

Once a problem to be solved (e.g. finding the function that gives the optimal set up of a power plant) is passed to the controller 4001 via the Input/Output module 4002, the parameter selection module 4004 chooses a hyper parameter combination from database 4003. Subsequently, the controller 4001 passes those hyper parameters to the NN training module 2000, that returns the optimal values for the parameters for the architecture defined by the given hyper parameters. Then, module 4005 performs an assessment of whether the NN calibrated by module 2000 is good enough for its application.

For example, if the NN is intended to recognise vehicle number plates in pictures, module 4005 runs the NN through a testing set of vehicle pictures (that is typically different from the training set used inside module 2000) and assesses the percentage of accuracy in the results. If it is above a certain threshold (e.g. 99%), then the NN is deemed to be good enough. If module 4005 gives a positive verdict, the obtained combination of hyper parameters and parameters are passed out from module 4000 via the Input/Output module 4002. If the verdict is negative, the controller 4001 moves again to the hyper parameter selection module 4004, that selects a different combination of hyper parameters from database 4003 from the once used in previous attempts, then module 2000 calibrates the parameters of the new combination of hyper parameters, module 4005 assess the quality of the NN, etc.

This process continues in a supra-hyper calibration loop until module 4005 provides a positive assessment.

As said, this iterative supra-loop is often a highly empirical process, in which the individual, with the appropriate skill in the art, starts with a set of hyper parameters that are typically very simple (e.g. one layer and one neuron) and starts increasing its complexity sequentially until the computation of module 4005 gives a positive result. This iterative supra-loop may need lots of interactions before module 4005 gives the positive result.

As a result, the more computationally efficient the NN calibration module 2000 is, the more efficient the calibration of the hyper parameters carried out by module 4000 will be. Module 2000 can become more efficient by improving on any or a combination of the three challenges explained above: precision, number of learning iterations and total number of instances in the training set.

Hence, an improvement of any of those is for the benefit also of the supra-hyper calibration computation.

Training Set Generation

Figure 11:
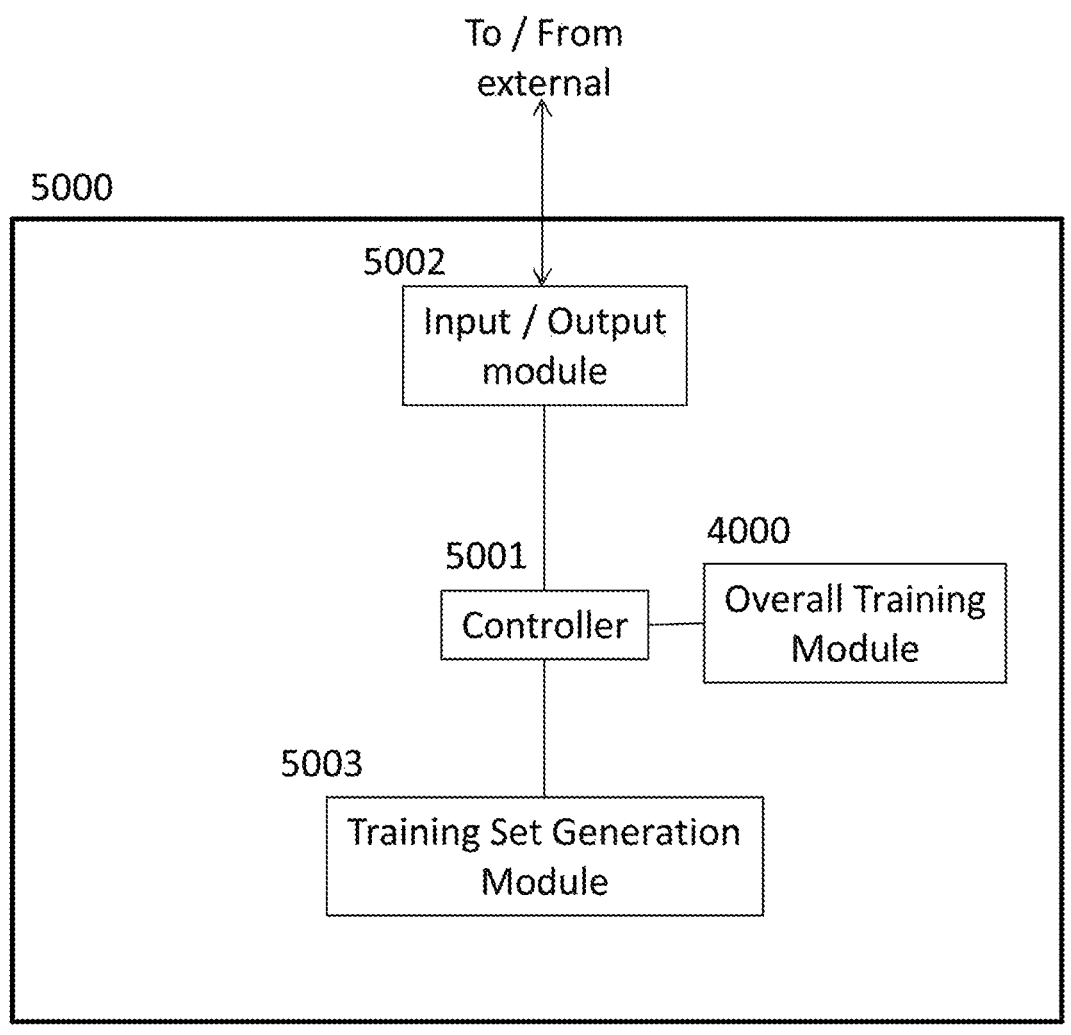
FIG. 11 is a schematic block diagram showing a module for generating a training set to train the NN.

The training of a NN needs a starting training set. The whole process is captured by module 5000, shown in FIG. 11. Module 5000 comprises a controller module 5001, an Input/Output module 5002, a training set generation module 5003 and the above-described overall training module 4000.

Once the details of the NN training problem to be solved are passed to the controller 5001 via the Input/Output module 5002, module 5003 generates the starting training set, which is then passed to module 4000 via the controller 5001 in order to perform the training of the NN.

Figure 12:
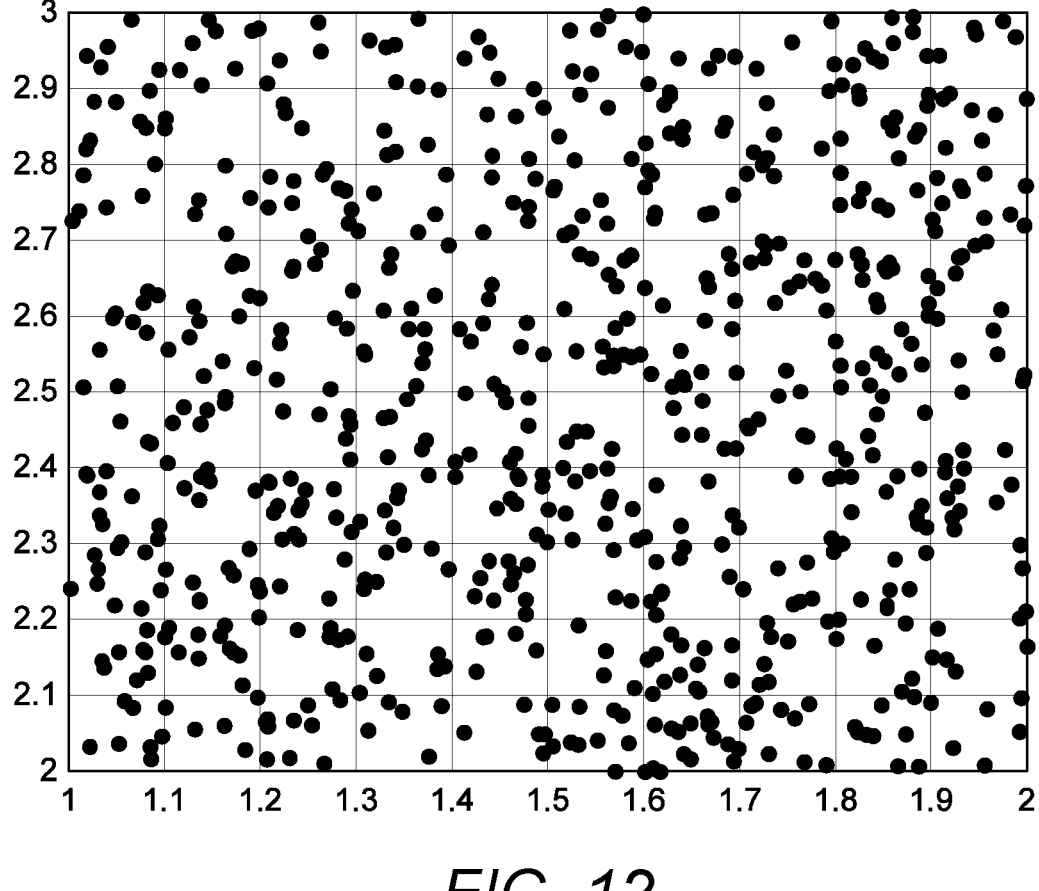
FIG. 12 is a plot of the random distribution of prior art of m random samples of the input data to the function to be approximated, F.

The training set is generated in module 5003 by creating m random samples of the input data to the function to be approximated, F. The random samples must typically fill up all the domain covered by the n-dimensional parameters that are the inputs to the function F. FIG. 12 shows an example of this random sampling, with n=2, in which the domain for the first parameter is (1,2) and for the second parameter (2,3).

Then, typically the function F is evaluated for each element of the random sampling, i.e. computing y for each of them, leading to the collection of m elements of $(x_1, x_2, x_3, \ldots, x_n; y)$. This is the training set.

It must be appreciated that, sometimes, the training set is given somehow to the whole process. Hence, in this context, module 5003 selects the relevant data from all the data given to module 5000 and generates the training set.

EXAMPLE

Assume there are m samples or instances of data, each having n single pieces of data (e.g. $x_1$, $x_2$, . . . , $x_n$). For example, the daily history over ten years of the average temperature at some 1,000 locations broadly distributed in a territory, then n=1,000 and m=365 days×10 years=3,650; as another example, it is possible to have 5,000 black and white images, each with 640×480=307,200 pixels then m=5,000, n=307,200.

In some cases, a collection of (n,m) data, such as the examples mentioned above, contain dependencies. In an example, the data can be the aforementioned temperature at some 1,000 locations broadly distributed in a territory. It is known that, even though the data has 1,000 elements, they are not fully independent; if the temperature in a given town is, say, +20 degrees Celsius, the temperature in its closest element from the 1000 locations is generally not going to be, say, −30 degrees Celsius. Also, if, for example, the territory is a state in the US, or a country in Europe, if the temperature in the furthest north location is +20 degrees Celsius, the temperature in the furthest south location is generally not going to differ by, say, −30 degrees Celsius. Also, if the temperature at the bottom of a mountain is, say, +5 degrees Celsius, then the temperature at the top of the mountain is not going to be, say, +35 degrees Celsius.

Furthermore, with some additional information such as the height difference between the two points and the humidity level at the bottom location, the temperature at the top of the mountain can be determined from the temperature at its bottom.

These examples illustrate the fact that, sometimes, there are collections of data with a high dimensionality n (e.g. n=1000), but the "degrees of freedom" of the data are lower than n. Continuing with the above example, it may be possible to describe the temperature of the 1000 locations, if it is known, for example, the temperature at 5 key locations, the humidity at these key locations, and the orography of the territory. In this example, the 1000 dimensional data has 10 degrees of freedom: 5 temperature values+5 humidity values.

In general, when there are collections of data with a given dimension n, but the data is not independent, there may be $n_{low}$ degrees of freedom, where $n_{low}$<n.

There are two fundamental ways to obtain those dependencies and degrees of freedom; ex-ante and ex-post.

Ex-ante

Using the same weather example above for ease of explanation, assume that the history of the multiple weather variables in the 1,000 locations for 10 years, is available. That is, roughly, 3,650 samples of them (i.e. 3,650 (days)× 1,000 (locations) elements of data). It is possible to determine which combinations of data best describe the temperature in the 1,000 locations. For example, it may be determined that there are 5 specific locations, whose temperature and humidity are sufficient to calculate the temperature of the 1,000 locations.

This dependency search process is called ex-ante because the low-dimensional data (the temperature and humidity of the 5 key locations) is already available; however, the skill consists in knowing and selecting which pieces of data to create the low-dimensional data from the vast amount of available data (e.g. air temperature, soil temperature, humidity, radiation, rainfall, etc.)

It must be understood that this illustrative example is quite simple to serve as an illustration. However, in many cases knowing the specifics of the low-dimensional data that best describes the high-dimensional data is far from simple to detect.

Ex-post

When it is difficult to detect or select suitable low-dimensional data, the nature of the dependency structure between the data of dimension n can be explored via specific numerical techniques. There exists a plurality of such techniques, ranging from fairly simple linear regressions to more sophisticated machine-learning based techniques. In general, these techniques can be linear or non-linear. Some techniques are linear regressions, non-linear regressions, multilinear subspace learning, principal components analysis (PCA), non-negative matrix factorisation, kernel PCA, graph-based kernel PCA, linear discrimination analysis, generalised discrimination analysis, autoencoders, t-distributed stochastic neighbour embedding, uniform manifold approximation and projection, k-nearest neighbours algorithm, canonical correlation analysis, low-dimensional embedding, local sensitive hashing and random projection.

As an illustration, the Principal Components Analysis (PCA) technique is described below, without loss of generality as to the many other techniques that there may be.

Principal Components Analysis is a technique to understand the dependency structure between collections of data. Assume that the data has n dimensions, and there are m samples of it. When the data shows some degree of non-zero correlation, an n x n correlation matrix can be built from the data. Then, it can be 'diagonalized', with this calculation yielding n eigenvalues with their corresponding eigenvectors. Those eigenvalues can be sorted in descending order. The higher the eigenvalue, the more relevant its corresponding eigenvector is in the input data. Then the $n_{low}$ highest eigenvalues ($n_{low}$<n) with their eigenvectors can be taken that take for example 99.99% of the information in the original data. The $n_{low}$ eigenvectors that correspond to the $n_{low}$ selected eigenvalues constitute an $n_{low}$ set of parameters that describe (or nearly describe with, say 99.99% precision) the values of any n-dimensional collection of data. Each eigenvector is a linear combination of the available data in the original n-dimensional space.

In other words, with this PCA technique it is possible to compute a set of $n_{low}$ pieces of data that describe the n-dimensional data, either exactly or with a desired level of accuracy (e.g. 99.99%).

The Principal Components Analysis technique is applied in many technical fields, ranging from neuroscience to quantitative finance. More information can be found in https://en.wikipedia.org/wiki/Principal_component_analysis.

These types of techniques are called ex-post because the low-dimensional data is not readily available; it must be investigated using numerical techniques. When applied, the skill consists in computing the pieces of data that constitute the low-dimensional data that describes the high-dimensional data.

Loss of Information in Dimensionality Reductions

It must be understood that, both in the ex-ante and ex-post cases, reducing the complexity of high-dimensional data to low-dimensional data can bring a loss of precision in the data set, because some information may be lost. For example, in the case of weather variables for 1,000 locations that are reduced to 5 key locations, that reduction in the data will lose the potential scenario of having an extremely high temperature in one location and an extremely low temperature in another location very close to the first one.

It may be acceptable to lose that possible scenario because it may be viewed as highly unlikely. However, going beyond this illustrative example, the point is to see that by reducing the dimensionality of the data, on one hand we are decreasing the complexity of the data, but on the other hand we may also be losing information (e.g. potential scenarios) that may be important for later use of the data, and hence limiting its usability.

This is a limitation that a reduction in the dimensionality of the data may bring with it. As a result, any dimensionality-reduction technique that ensures minimal loss of information for a given decrease of dimensionality, or that ensures maximum reduction in dimensionality for a given fixed amount of information, will generally be beneficial when the data is used in a computation.

Forecasting Systems

Several Forecasting Systems (FS) base their computation on the generation of a relatively high number of scenarios. Once those scenarios have been created, one or more functions are evaluated in each of those scenarios. Then a metric is applied to the value of the function(s) under each of the scenarios, from which the forecast is performed.

There are two fundamental ways to generate the scenarios in a FS. On one hand, they can be generated directly by the FS, in which case we have a Forecasting System with Endogenous Scenarios. On the other hand, they can be given to the FS from an external source. In that case, we have a Forecasting System with Exogenous Scenarios.

Example 1: Monte Carlo Simulations

This is an example of a Forecasting System with Endogenous Scenarios.

In this type of simulation, the potential future scenarios are created from a stochastic model. These simulations are often referred to as Monte Carlo (MC) simulations in the art.

For example, if it is known that today's temperature is $T_{today}=25$ Celsius, and if it is desired to draw scenarios for potential temperatures in, for example, 30 days, he following stochastic equation may be used to describe the changes in temperature:

$$T_{30days}=T_{today}+\mu \cdot 30+\sigma \cdot \varepsilon$$

where $\rho$ is the expected temperature change over the next 30 days (e.g. $\mu$ will typically be a positive number in Spring, or a negative number in Fall), $\sigma$ is the "volatility" of the temperature of that 30-day period (i.e. how much variability it can have over the average) and $\varepsilon$ is a random number (known in the art as a "deviate") that follows a given distribution (e.g. a gaussian normal distribution).

In a Monte Carlo (MC) simulation, a typically high number ($N_s$) of scenarios (e.g. $N_s=10,000$) are generated by drawing a number, $N_s$, of random numbers ($\varepsilon_1, \varepsilon_2, \ldots, \varepsilon_{N_s}$), from which $N_s$ potential future temperatures can be generated ($T_{30days_1}, T_{30days_2}, \ldots, T3_{0days_{N_s}}$).

Then, each scenario is the input to a given function (F)—or a number of given functions—to obtain a parameter value in each scenario. This function evaluates the value of a relevant parameter for each potential future scenario. For example, the function could be the daily energy consumption of a given city, given the temperature at noon. In this example, the MC simulation generates 10,000 potential energy consumptions.

Then, the FS computes a given metric from those 10,000 potential energy consumptions. For example, this metric could be the average of them, or the $90^{th}$ percentile.

Finally, the desired forecast can be formulated from the chosen metric (M). For example, the expected energy consumption in 30 days can be obtained from the "average" metric, or the highest energy consumption at a 90% confidence level can be obtained from the $90^{th}$ percentile metric.

It must be understood that this is a simplified example for illustrative purposes. The complexity of the fundamental models and of each scenario can be very high. The fundamental models can consist of highly complex and interlinked equations, and each generated scenario can consist of a vast number of data points (e.g. temperatures, humidity, level of sun radiation, level of contamination, etc., all in many cities, etc.).

Also, the computational complexity of evaluating the functions in the MC simulation (e.g. the function F that computes the energy consumption) can be very high.

This type of FS may suffer from an important computational problem: either computation of the forecast may take too long, to the extent that when it is finished, too much time has passed, and its applicability is subdued or completely lost; or it may be too costly to run with the required hardware infrastructure (e.g. a computer farm); or it may be both too slow and too costly.

Example 2: Historical Simulations

This is an example of a Forecasting System with Exogenous Scenarios.

This type of FS is fundamentally the same as a MC simulation, but generation of the scenarios is based on historical data instead of on stochastic deviates.

Leveraging from the same illustrative example just used, we may have access to historical data on temperatures at noon at a relevant city. The model used to generate the scenarios could take 10 years of such data (e.g. 365 days×10 years=3,650 data points) and compute the 30-day changes in each of them. In this way we obtain (around) 3,650 potential values for ($T_{30days}-T_{today}$). Given today's temperature, we can generate in this way 3,650 potential values for $T_{30days}$; i.e. 3,650 scenarios.

Once the scenarios have been generated, the FS can follow a similar calculation to that in the case of a MC simulation: the function F (or several of them) is computed in each scenario, then a metric (M) is computed, and then a forecast is made based on this.

It must be noted that, also, this example is quite simple and it must be taken as an illustrative example, but this type of simulation can easily be highly complex, with a vast amount of historical data and with highly complex ways to generate the scenarios from it.

Example 3: Optimisation Simulations

This is an example of a Forecasting System with Endogenous Scenarios

In this example of a FS, the skilled person is trying to predict what scenario provides a certain target effect. For example, what future weather scenario would create an energy consumption equal to or greater than the maximum capacity of a power plant.

Simplifying the example for illustrative purposes and considering that the weather scenario is determined by the temperature, the calculation can start at a given random scenario (e.g. a random level of temperature $T_1$). Then, the function F (e.g. the energy consumption) is calculated for that scenario, obtaining a value $F_1$. Then, a second scenario is generated based on the first one, applying a small change to it (e.g. $T_2 = T_1 + \Delta T$, where $\Delta T = 0.1$ Celsius) and the function F is now computed on the second scenario, providing an $F_2$. The simulation continues with the generation of a third scenario based on how the value of F changed in the previous two scenarios; e.g. if $F_2$ is closer to the target value than $F_1$, then $T_3 = T_2 + \Delta T$; if not, then $T_3 = T_1 - \Delta T$. Once the third scenario has been computed, a third value for the function at hand is evaluated, $F_3$. The process can continue like this, iteratively, $N_s$ times, until the computed value of F is close enough to the target value under a certain metric (M); e.g. until the metric $|F_{N_s} - F_{target}| < \delta$, is met, where $\delta$ is typically chosen to be a small number. At that point, the forecast can be made: the $N_s$-th scenario, that corresponds to $F_{N_s}$, is the scenario that provokes the target effect; that is, the temperature that will provoke an energy demand equal to the maximum capacity of the power plant.

It is noted that the process described here is has similarities to the Gradient Descent process, explained earlier in the context of training of NNs. It is a typical way (though not the only one) to perform a forecast based on an optimisation metric.

It must be understood that this example has been simplified for illustrative purposes. In many cases, the scenarios may consist of many data variables, making the Gradient Descent process more complex. Also, the metric M may have the output of many functions F as inputs; for example, M could be a maximum cost of running a power plant, given by the energy demand, the cost of the plant's fuel and many other parameters. Also, the metric M could be given by other expressions like, for example, $$(F_{N_s} - F_{target})^2 < \delta.$$

Similarly to the other examples of FS shown, this optimisation simulation can be challenging to perform if, for example, the time it takes to compute F is too high, or if it is too expensive to compute, or both. This can be the case because it must be evaluated a large number of times; e.g. $N_s = 100,000$.

Three examples of FS have been described; however, it will be understood that numerous different examples sharing common characteristics exist.

It must be understood that the illustrative examples use only one metric (M), one parameter function (F) and one dimension (T) to describe each scenario. However:

there could be a plurality of metrics that are relevant to the forecast;

there could be a plurality of parameters, and of functions F, that are relevant to the metrics; and, the dimensionality of each scenario is often greater than one; in fact, many times the dimensionality is very large (e.g. tens, hundreds, thousands or more dimensions).

a Modular View of Forecasting Systems

Figure 16:
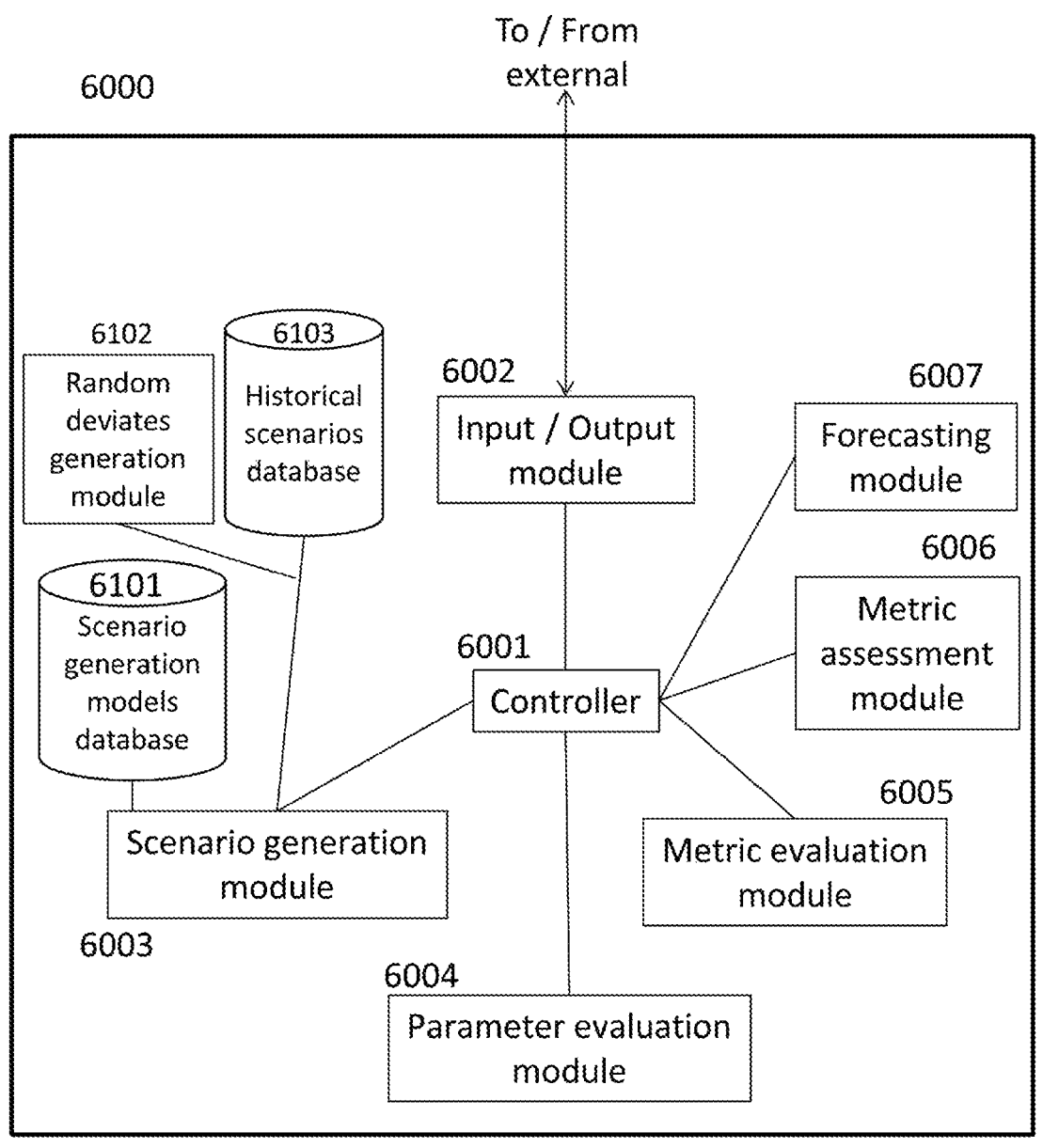
FIG. 16 is a schematic block diagram showing a forecasting system.

FS tend to follow the modular structure depicted in module 6000 in FIG. 16. Module 6000 comprises a controller module 6001, an input/output module 6002, a scenario generation module 6003, a scenario generation models database 6101, a random deviate generation module 6102, a historical scenarios database 6103, a parameter evaluation module 6004, a metric evaluation module 6005 and a metric assessment module 6006.

In module 6000, a forecast computation request is received and inputted into the controller module 6001 via the input/output module 6002. The system generates a number of scenarios via module 6003, which are returned to the controller 6001. Those scenarios are then passed to module 6004, where a number of parameters are evaluated in each of the scenarios. Those parameter values are passed to the controller, which passes them to the metric calculation module 6005 and a number of metrics are calculated with them. Those metrics are passed back to the controller, which passes them to the metric assessment module 6006.

If the conditions set in the metric assessment module 6006 are met, the controller 6001 passes the metrics to the forecasting module 6007, where the forecast is made, then it is passed to the controller 6001, and it is finally outputted via the input/output module 6001.

The conditions can vary for different examples of the present disclosure. Examples of such conditions include that the numerical noise of the statistical uncertainty of the metric computed by module 6005 is below a given threshold, or that the changes in the metric from one iteration of the metric calculation compared to the next or previous one is below a given threshold.

If the conditions set in the metric assessment module 6006 are not met, the controller 6001 generates new scenarios via the scenario generation module 6003. Those new scenarios are passed by the controller 6001 to the parameter evaluation module, where a number of parameters are evaluated for each of the scenarios. The values of those parameters are passed back to the controller 6001. The controller passes all the calculated parameter values to the metric evaluation module 6005, where a number of metrics are calculated. Then, they are passed to the metric assessment module 6006 via the controller 6001.

The controller 6001 repeats the cycle described until the conditions set in the metric assessment module 6006 are met. When that happens, the controller 6001 passes the metrics to the forecasting module 6007, where the forecast is made, then it is passed to the controller 6001, and it is finally outputted via the input/output module 6001. If the conditions set in the metric assessment module 6006 are not met, the controller 6001 starts a new cycle.

Module 6003 generates the scenarios via a scenario generation model that is selected from the scenario generation model database 6101. If the selected model needs random deviates, the random deviates are computed in the random deviates generation module 6102. If the selected module needs historical scenarios, those scenarios are selected from the historical scenarios database 6103.

Figure 17:
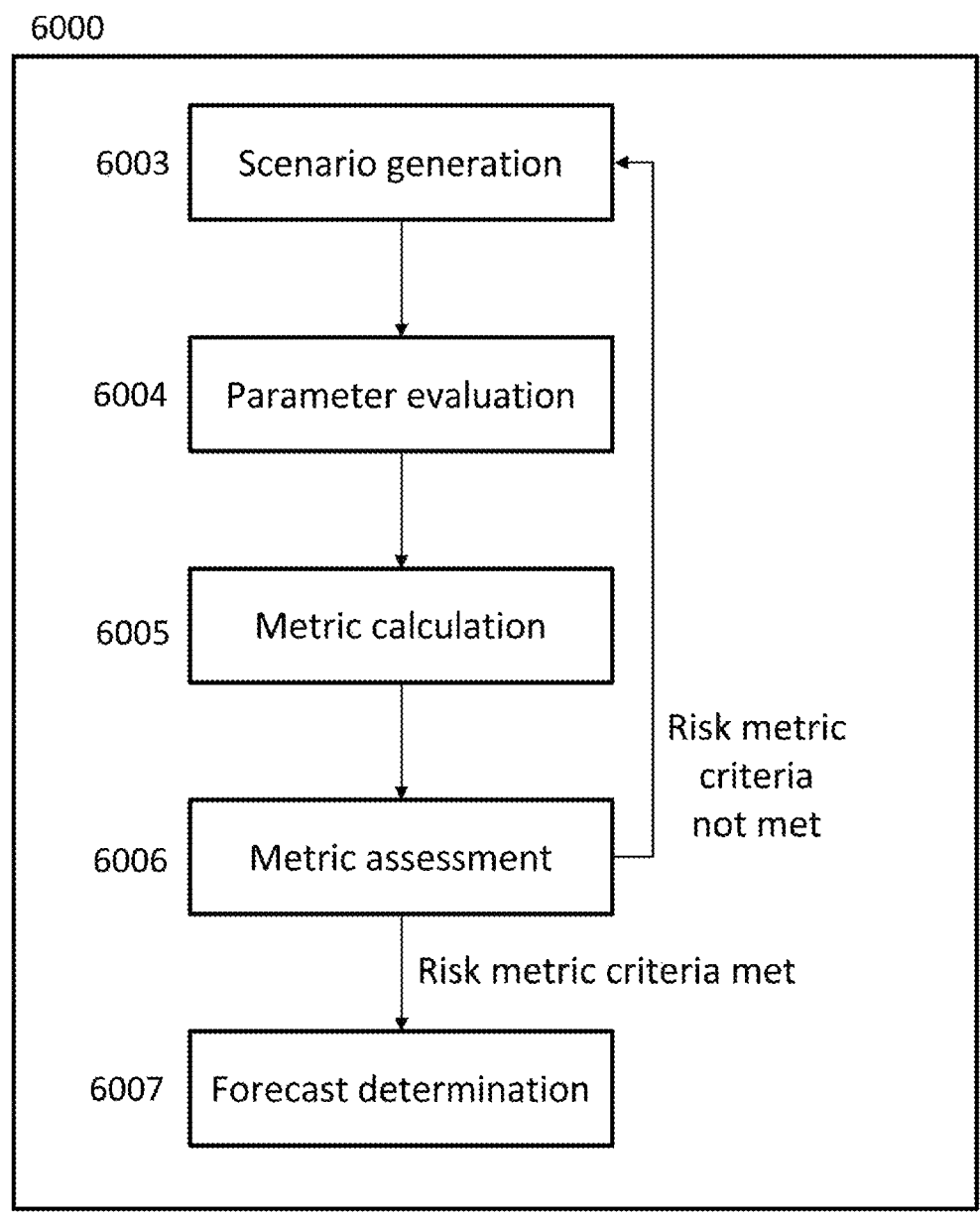
FIG. 17 is a schematic block diagram illustrating the flow of data between different modules of the forecasting system of FIG. 16.

FIG. 17 provides an alternative diagram illustrating the flow of data between the different modules of the FS 6000.

Figure 18:
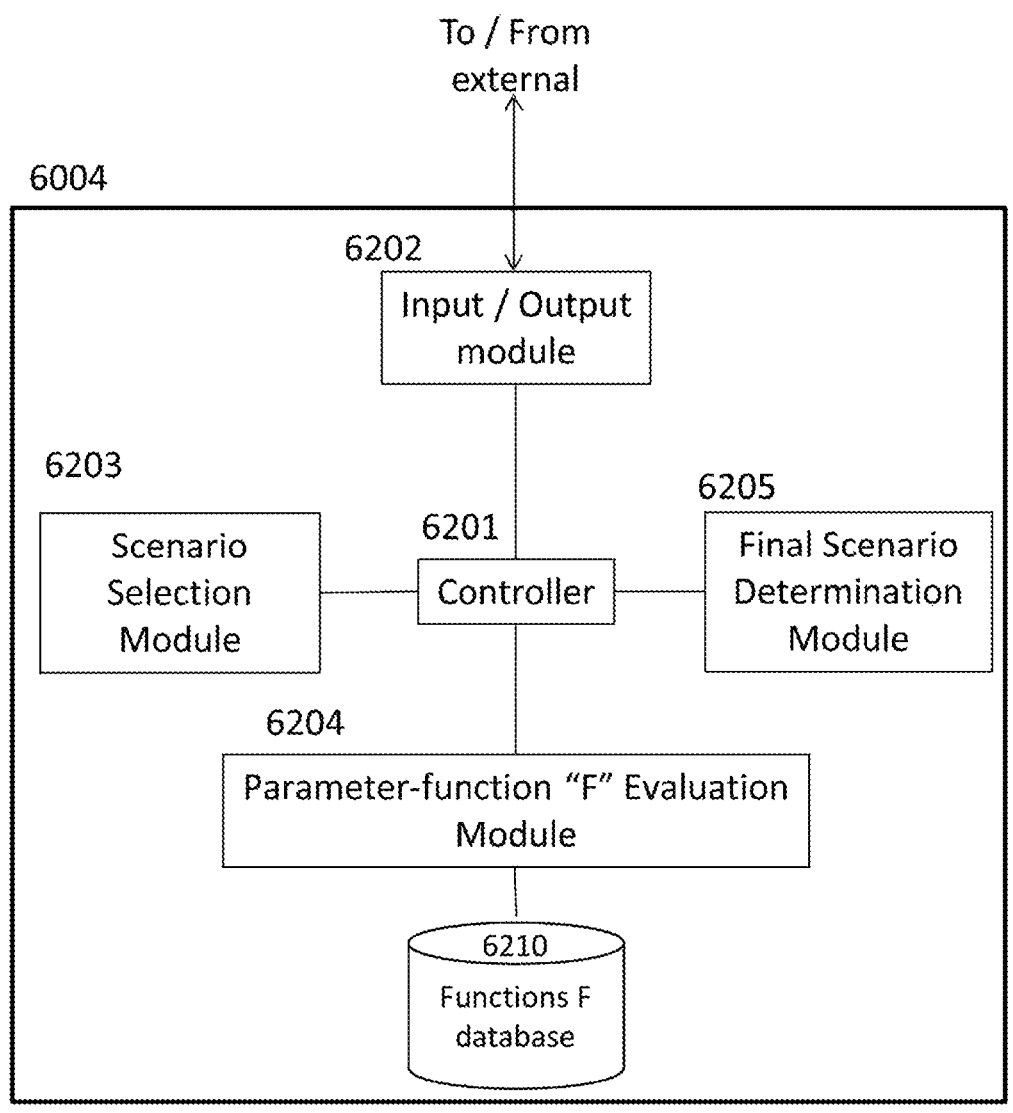
FIG. 18 is a schematic block diagram of a parameter evaluation module of the forecasting system of FIG. 16.

FIG. 18 provides a detailed illustration of the Parameters Evaluation Module 6004, which comprises a controller module 6201, an Input/Output module 6202, a Scenario Selection Module 6203, a Parameter-function ("F") evaluation module 6204, a Functions (F) Database 6210 and a Final Scenario Determination Module 6205.

When the Parameters Evaluation Module 6004 receives the instruction to evaluate the parameters of the scenarios determined by the Scenario Generation Module 6003, the instruction is passed to the Controller 6201 via the Input/Output module 6202. Then, the Scenario Selection Module 6203 selects the first scenario in which the parameters need to be evaluated. The controller passes this scenario to the Parameter-functions Evaluation Module 6204, where the module selects the appropriate functions "F" from the Functions ("F") Database 6210 and evaluates them in the selected scenario. These values are passed to the controller. Then, the Final Scenario Determination Module 6205 determines if the selected scenario is the last one. If so, the controller outputs all the parameter values via the Input/Output module 6202. Otherwise, the scenario selection module 6203 selects the next scenario that is to be used by the parameter function evaluation module 6204 to evaluate the parameters. The 50 calculation continues like this until the final scenario determination module 6205 determines that the selected scenario is the last scenario.

Examples of the Present Invention

Firstly, it has been shown that the computational effort and quality of the learning step in a NN is notably dependent on the dimensionality of the input data to it. It is dependent because there is generally a relationship that links the dimensionality, the accuracy and the size of the training set for a NN. More specifically, the higher the dimensionality (n) the larger that the size of the training set (m) needs to be to achieve a desired degree of accuracy; or, expressed the other way around, the higher the dimensionality (n) the higher the error of the NN proxy function ($\hat{F}$), for a given training set size (m).

Also, it has been shown that the evaluation effort of a NN tends to be greater the higher the dimensionality of the input layer, because in general the NN will need more layers and neurons to replicate the original function F.

Secondly, when there are collections of n-dimensional data that show some degree of dependency, that data effectively has $n_{low}$ degrees of freedom, where $n_{low} < n$. The $n_{low}$-dimensional data can serve to describe the original n-dimensional data via the $n_{low}$ degrees of freedom. The $n_{low}$-dimensional data can be either selected via an ex-ante process or computed via an ex-post technique.

Finally, it has been described above that Forecasting Systems often have to evaluate several scenarios of functions that are computationally expensive to evaluate (generally referred to as F functions the in the above description). This multiple computation of the function (or functions) F can become a computational bottleneck that can make the forecast computation too slow or too expensive, or both.

The present invention puts the strength of techniques that reduce the dimensionality of data into NNs so that the final outcome is a better NN, specifically with respect to the computational cost of the learning step, but also with respect to the evaluation computational effort of the NN. This new AI structure is hereinafter referred to as an optimised Neural Network (oNN). Furthermore, when a NN structure is used as a substitute for the computation of the functions (F) in the FS, when the NN is optimised with a reduction of the dimensionality of data so that an oNN replaces the functions F in the Forecasting System, and when the reduction of the dimensionality of data in the NN is taken from the Scenario Generation model used by (and hence intrinsic to) the Forecasting System, an optimisation on the computational effort of the FS is created. This new FS is hereinafter referred to as an optimised Forecasting System (oFS).

More specifically, the oNN comprises taking a standard NN and adding a pre-learning stage, previous to the training process of the NN, that utilises the dependency that may exist in the input data to the NN, particularly in order to reduce the NN's computational cost of the training step, and also of the evaluation step too. In particular, this pre-learning stage includes selecting or computing a low-dimensional data (relative to the original NN input dimensionality, n) that provides the desired effect of optimising the performance of the NN.

Furthermore, the oFS comprises using a NN as a substitute for each or some of the slow-to-compute functions F in the Forecasting System, so that the computation of the forecast in the oFS requires less time, or less computational effort, than its non-optimised equivalent. That will be the case when the computational time taken for the evaluation of the NN is lower than the computational time taken for the evaluation of the function F it replaces in the oFS. Moreover, the NN can be optimised via a dimensionality reduction technique, in which case the computational structure that substitutes the computation of a function F in the Forecasting System is an oNN. When this is the case, the evaluation effort of the oNN can be lower than its equivalent prior art NN; hence, when the NN that substitutes the computation of F in the Forecasting System is indeed an oNN, the computational effort can be further reduced.

Moreover, when the dimensionality reduction used in the oNN is the (or one of the) dimensionality reduction(s) given by a Scenario Generation model in the FS, or an approximation to it, then the potential loss of accuracy that dimensionality reductions may create in the NN is either minimised or reduced to zero and, as a result, the benefit of the oFS versus a standard FS can be particularly strong.

Figure 22:
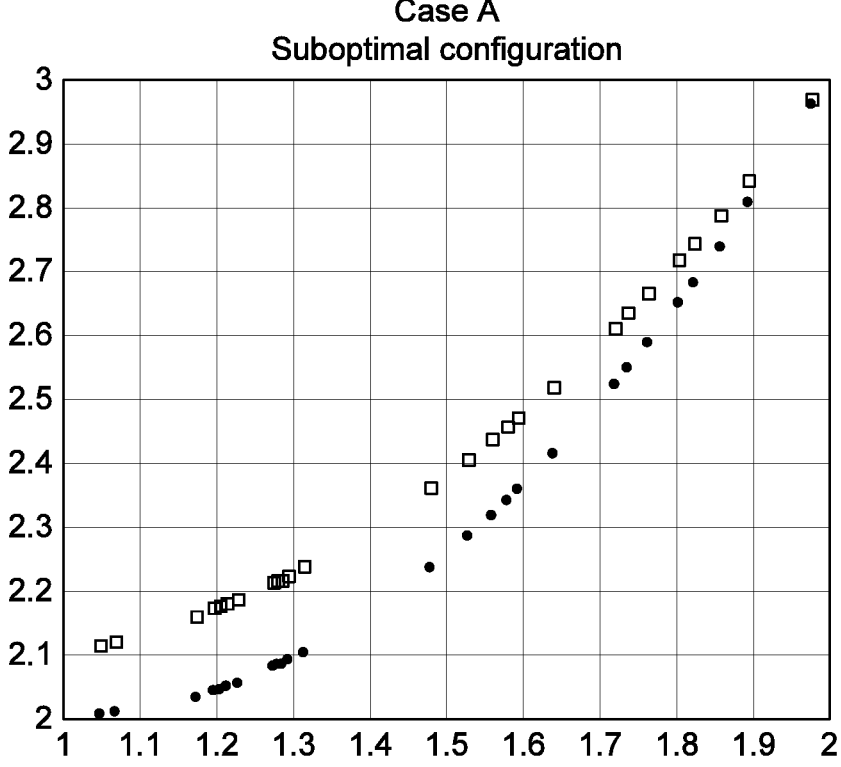
FIG. 22 shows plots illustrating an error in an approximation of an example two-dimensional function using the optimised forecasting system of FIG. 19 for two different dimensionality reduction techniques of the neural network.
Figure 22:
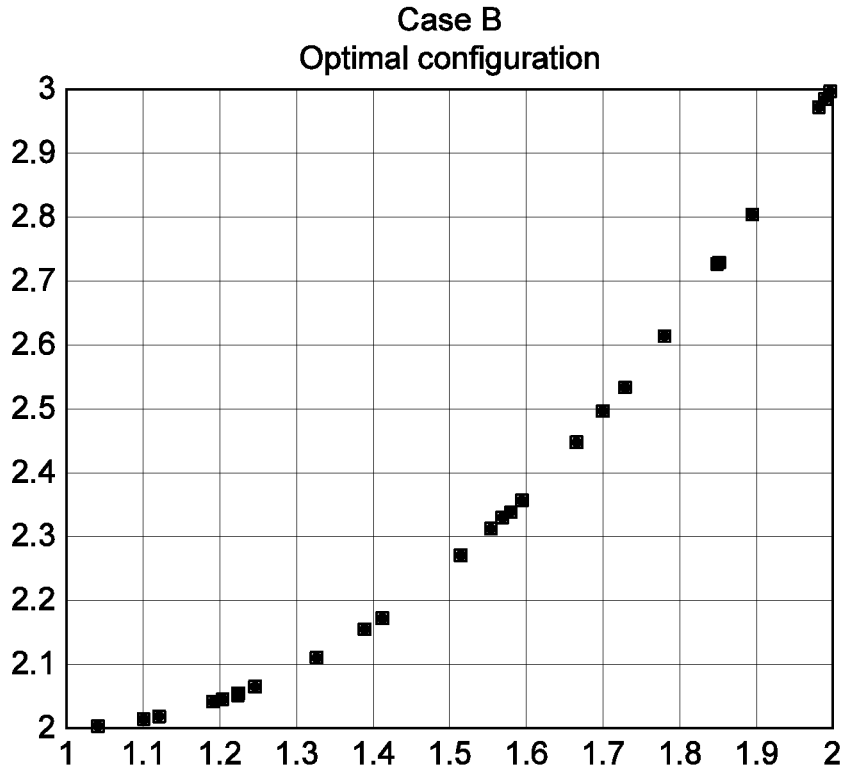

This is illustrated in FIG. 22 for the case of two dimensions for ease of illustration, but the results can be extended to any suitable number of dimensions. In FIG. 22, the solid dots represent the data points with the rules used in the Forecasting System that link the data in the X axis with the data in the Y axis, while the squares show the data points in the training set of the NN. The top pane (case A) shows a configuration of an oFS in which the dimensionality reduction used for the training of the NN is different to the rules of the data that exist in the Forecasting System. The bottom pane (case B) shows a configuration of an oFS in which the dimensionality reduction used for the training of the NN is the same as the rules of the data that exist in the Forecasting System. Under case A, the NN has been trained with a relationship between the data different to the relationship between the data when the NN is evaluated under the Forecasting System scenarios, while under case B the relationship is the same. As a result, the oNN trained under configuration A will introduce an error in the oFS that is not introduced by using configuration B in the training of the oNN. As a result, the oFS under configuration B will perform better than under configuration A because the Parameter evaluation module 6504 under configuration B will not have the error that the sub-optimal dimensionality reduction under configuration A intrinsically has; the extra error under configuration A (versus configuration B) is produced because the Dimensionality Reduction module 5507 uses a dimensionality reduction different to one used or given by the Forecasting System.

It will be understood that Neural Networks are one type of approximation method that can be used to evaluate a function in a computer, often in a more efficient manner than evaluating the function itself, while giving substantially the same result. However, NNs are not the only way to approximate a function for more efficient evaluation in general, and in particular in the context of a Forecasting System. It is noted that, in general, many or all approximation methods will benefit from a dimensionality reduction technique similarly to how Neural Networks can, and also in the same context and applications explained here; for example, in the context of Forecasting Systems.

a Modular View of the Present Invention

Optimised Neural Networks

Figure 13:
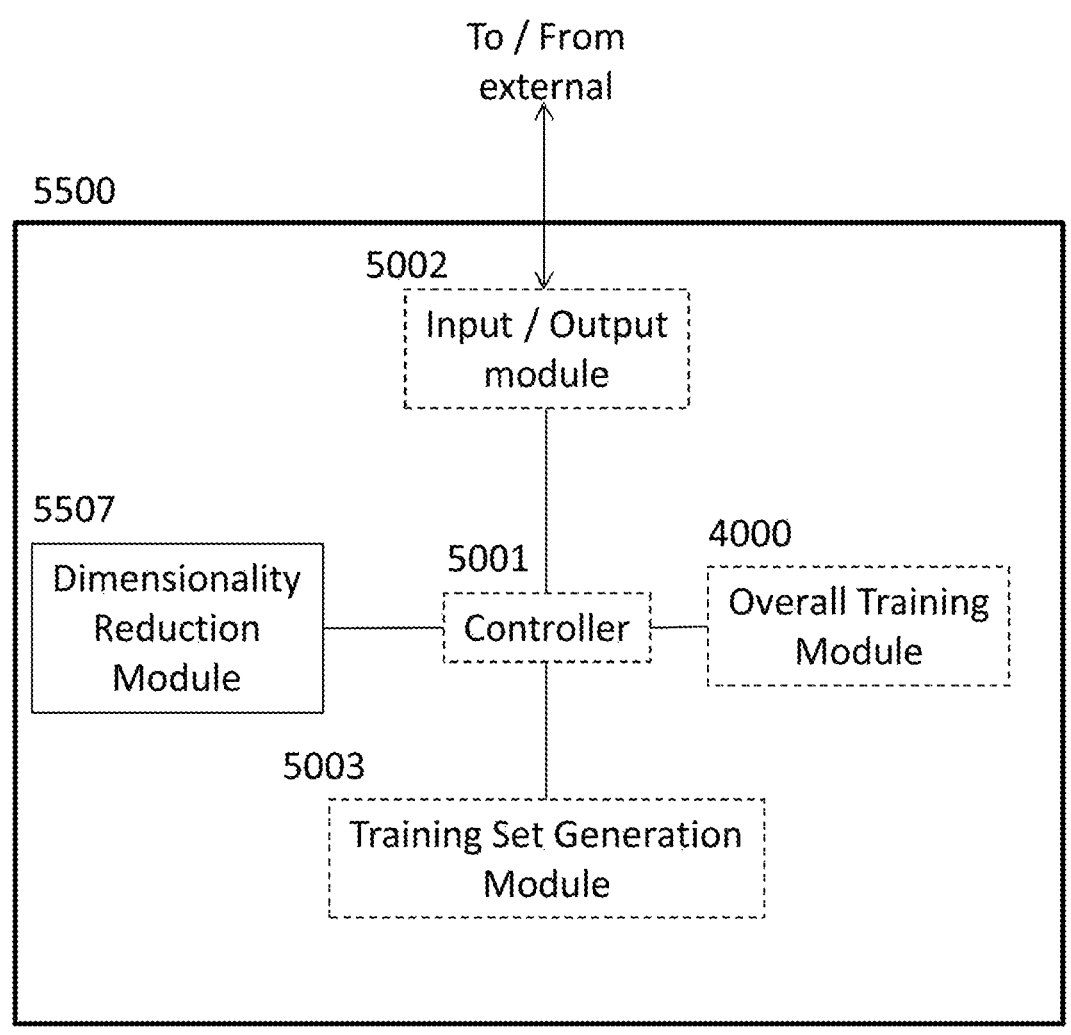
FIG. 13 is a schematic block diagram showing a module for generating a training set to train the NN in accordance with an embodiment of the present invention, the training module having a dimensionality reduction module.

FIG. 13 illustrates a modular view of an optimised Neural Network. A new overall training module 5500 comprises a controller module 5001, an Input/Output module 5002, a dimensionality reduction module 5501, a training set generation module 5003 and an overall training module 4000.

Dimensionality Reduction Module 5507 performs a dimensionality reduction technique with the effect that the computational effort of the supra-training module 4000 and the NN training module 2000 will decrease, compared to the prior-art configurations.

Figure 14:
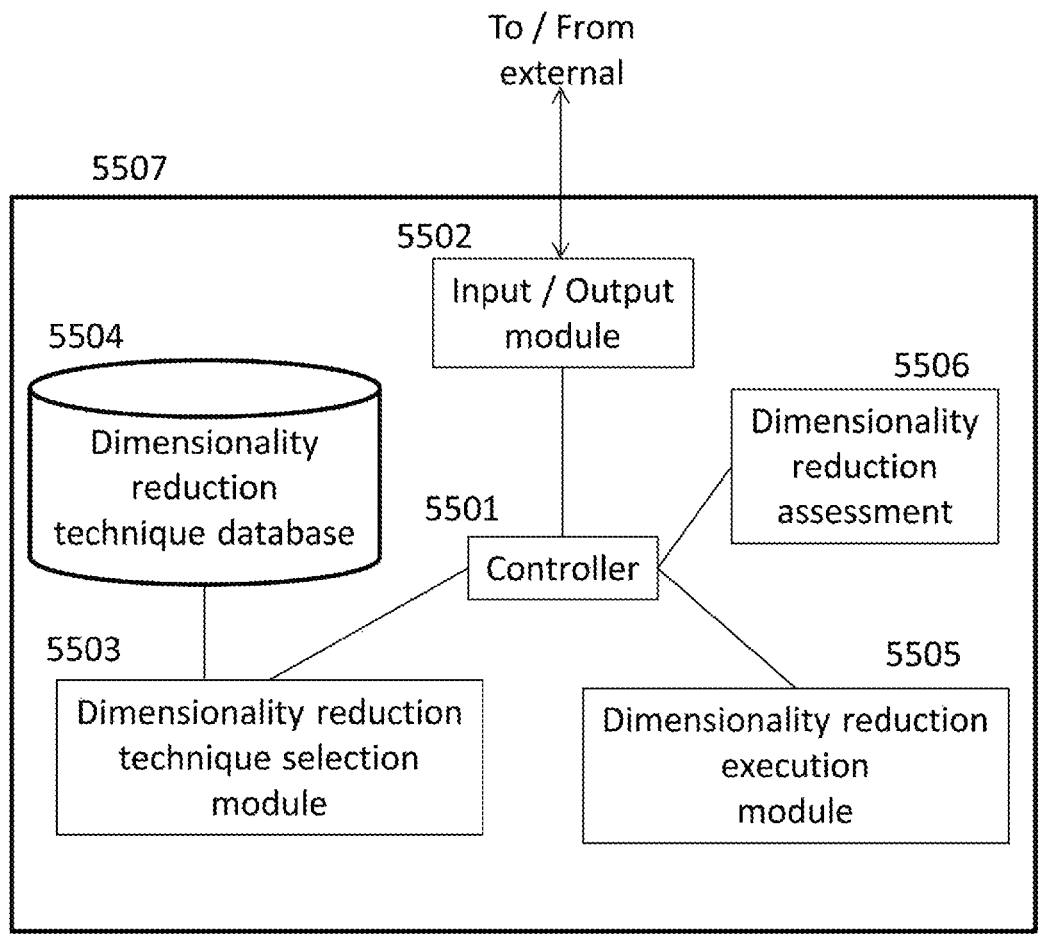
FIG. 14 is a schematic block diagram showing the dimensionality reduction module of FIG. 13 in greater detail.

Details of the pre-training Dimensionality Reduction Module 5507 are shown in FIG. 14. The training set data is passed into the controller 5501 via the input/data module 5502. Then, module 5503 selects a dimensionality reduction technique that is stored in the dimensionality reduction technique database 5504. This selection can be a manual process in which a skilled individual uses past experience to find which technique may work well (it will be assessed later), or in some embodiments it can be automated, or a combination of both in other embodiments. Subsequently, module 5505 performs the dimensionality reduction technique and returns the low-dimensional data to the controller 5501. Then, module 5506 assesses the adequacy of the dimensionality reduction technique; it assesses if there has been any loss of information from the original high-dimensional data to the low-dimensional data and, if so, how much, and then it assesses if the loss of information (if any) is permissible. If the module 5506 assesses that the effects on the data of the dimensionality reduction is not good enough for the later training of the NN, it returns such information to the controller 5501, which then goes to the dimensionality reduction technique selection module 5503 in order to select another dimensionality reduction technique. The process continues like this in a number of loops until the assessment by the module 5506 is positive, at which point the controller outputs via the input/output module 5502, the details of the low-dimensional data. These details are the low-dimensional data version of each of the m samples of high-dimensional data of the training set (i.e. m samples of low-dimensional data), and also the function (T) that can be evaluated by a computer and transforms a sample of high-dimensional data into its corresponding low-dimensional data (i.e. $(x_1,x_2, \ldots , x_{n_{low}})=T(x_1,x_2, \ldots , x_n)$) and its inverse function that can be evaluated by a computer and transforms a sample of low-dimensional data into its corresponding high-dimensional data (i.e. $(x_1,x_2, \ldots , x_n)=T^{-1}(x_1,x_2, x_{n_{low}})$).

Once the dimensionality reduction module 5507 has completed its task, the training set generation module 5003 creates a (modified) training set that benefits from the availability of the low-dimensional data. The (modified) training set contains m elements, each of them comprising a set of $n_{low}$ (Examples 1 and 2) or n (Example 3) NN input data and its corresponding value over the function F (i.e. m elements of $(x_1,x_2, \ldots , x_{n_{low}};y)$ or $(x_1,x_2, \ldots , x_n;y)))$, is passed on to the overall training module 4000, where the NN is trained as in the prior art systems.

In the above, training data or samples that are to be used subsequently to train the NN architecture is used to determine the low-dimensional data via a dimensionality-reduction technique. It should be understood, however, that data other than the input data from training samples may be used to determine the low-dimensional data. The input data used to determine the low-dimensional data may be referred to as pre-training data or samples, where the pre-training data may include input data from some or all of samples that are to be used to train the NN architecture, i.e. training samples.

It will also be understood that the dimensionality-reduction techniques may be used to identify dependencies between some or all of the input variables of the function(s) to be approximated.

Optimised Forecasting Systems

Figure 19:
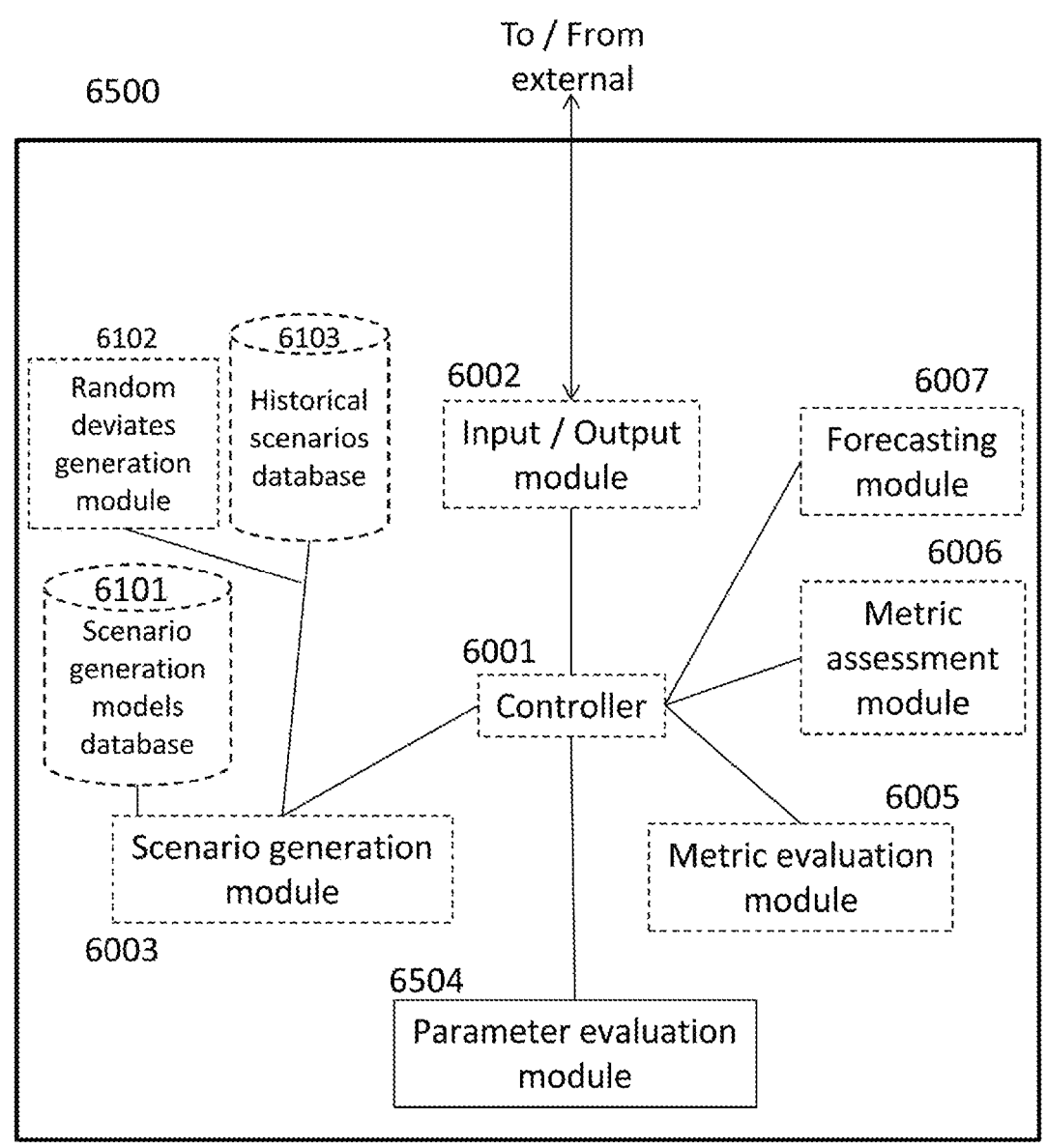
FIG. 19 is a schematic block diagram showing an optimised forecasting system according to an embodiment of the invention.
Figure 20:
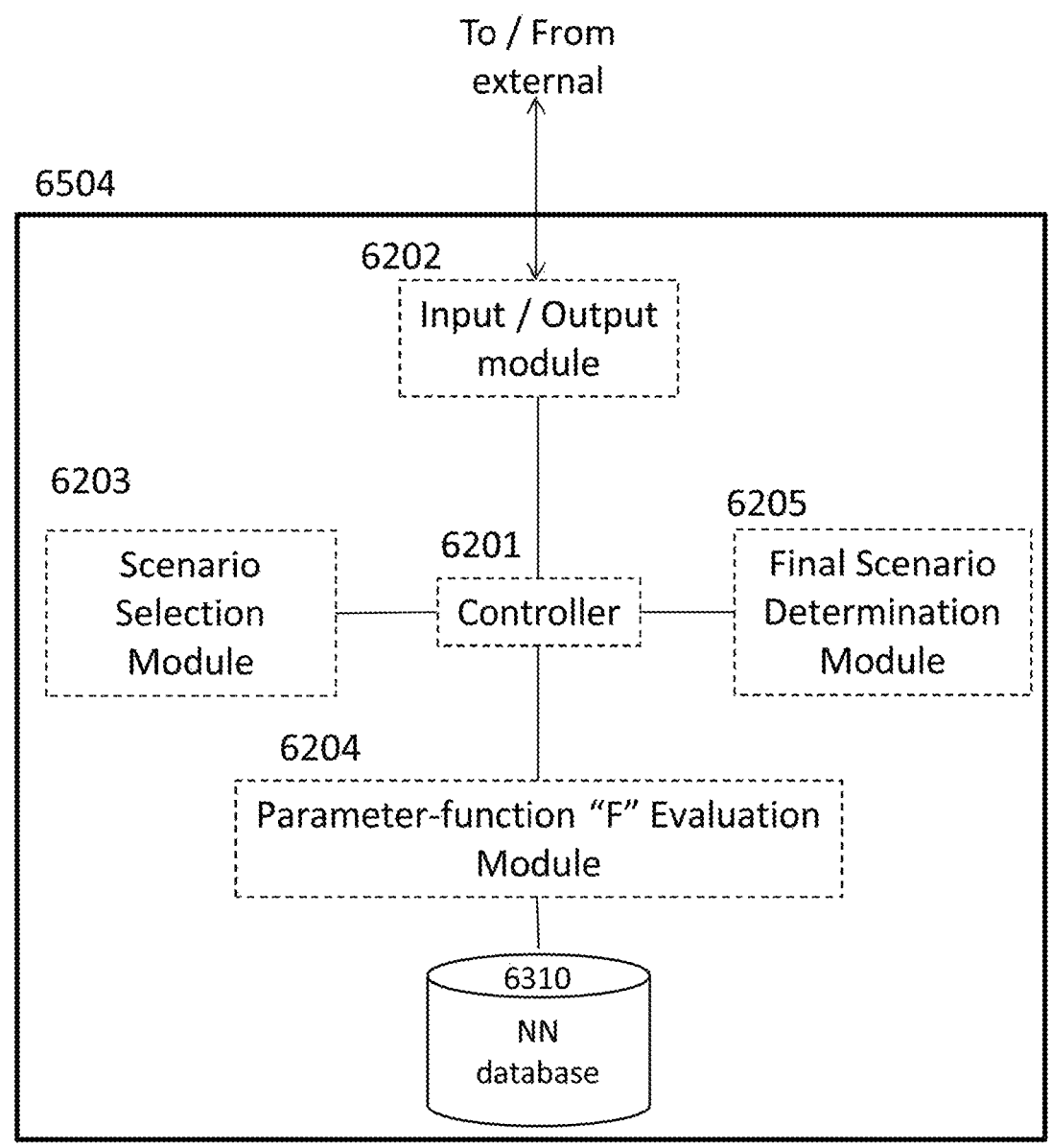
FIG. 20 is a schematic block diagram of a parameter evaluation module of the forecasting system of FIG. 19.

The optimised Forecasting System follows the modular structure depicted in module 6500 of FIG. 19. Taking the Forecasting System described in Module 6000 of FIG. 16 as the reference, the Parameter Evaluation Module 6004 (FIG. 16) is substituted by an Optimised Parameter Evaluation Module 6504, which is described in detail in FIG. 20.

The resultant Optimised Parameter Evaluation Module 6504 is a modified version of its prior art non-optimised equivalent, module 6004 in FIG. 18. In it, the Function F Database 6210 is replaced by the NN database 6310. By doing this, each evaluation of a function F in prior art systems is now replaced by the evaluation of the NN that has been trained to replace each function F as described in module 5000 of FIG. 11. In this way, as explained previously, when the computation of the NN is more efficient than the computation of its corresponding F function, the computation of the forecast via module 6504 will be more efficient than via module 6004 provided the number of elements of the NN's training set is sufficiently small.

For example, assume that a prior art Forecasting System evaluates a given function F in M scenarios, hence M times, in order to compute the forecast. Assume that the computational effort of the parameter function F is $T_F$ (measured in time to compute in, for example, one single computing machine). In this case, the computational effort taken by the Forecasting System to evaluate the parameter represented by the function F is given by $M \cdot T_F$. Assume that a particular number, D, forecasts are to be computed (for example, one weather forecast every hour for 30 days equates to D=30× 24=720 forecasts). The total computation effort of the function F is, thus, $T_{total}^{FS}=D \cdot M \cdot T_F$.

An Optimised Forecasting System substitutes a function F by a NN that has been trained to replicate F. Assume that the number of elements of the training set needed to train the NN to an adequate level of accuracy is m (by "adequate" it is meant that the accuracy of the NN is such that the oFS and the FS give substantially the same result). The computational effort of the generation of the training set is, thus, $m \cdot T_F$, Once the NN has been trained, if $T_{NN}$ is its evaluation effort, the computational effort of calculating the parameter F represents in all scenarios is given by $M \cdot t_{NN}$. To compute D forecasts, the total effort to compute the parameter F represents in all scenarios and in all forecasts is $D \cdot M \cdot t_{NN}$. If the NN training effort is aggregated with the effort to compute the parameter F represents in all scenarios and in all forecasts, the total computational effort is given by $T_{total}^{oFS}=m \cdot T_F+D \cdot M \cdot t_{NN}$.

As a result, an oFS offers a computational benefit provided $$m \cdot T_F + D \cdot M \cdot t_{NN} < D \cdot M \cdot T_F$$

or $$m < D \cdot M \cdot \left(1 - \frac{t_{NN}}{T_F}\right)$$

or $$t_{NN} < \left(1 - \frac{m}{D \cdot M}\right) T_F$$

It must be noted that the lower m is, or the lower $t_{NN}$ is, or the lower both of them are, the higher the computational benefit of the oFS compared to its prior art FS.

Also, it must be noted that it is assumed for these equations that substantially most of the computational effort in the Forecasting System is taken by the computation of the parameter that F. That is often the case in many FS and its corresponding oFS. If that is not the case, equivalent formulae can be easily obtained by adding the computational time that is not related to the evaluation of F. I this case, the benefits of the present invention also take place.

As a final note, the above-described system focusses on a single parameter and a single function F. However, it must be appreciated that the described approach can equally be applied to each parameter and function F if the computation of the forecast requires the repeated evaluation of a plurality of parameters and, consequently, a plurality of F functions.

Figure 21:
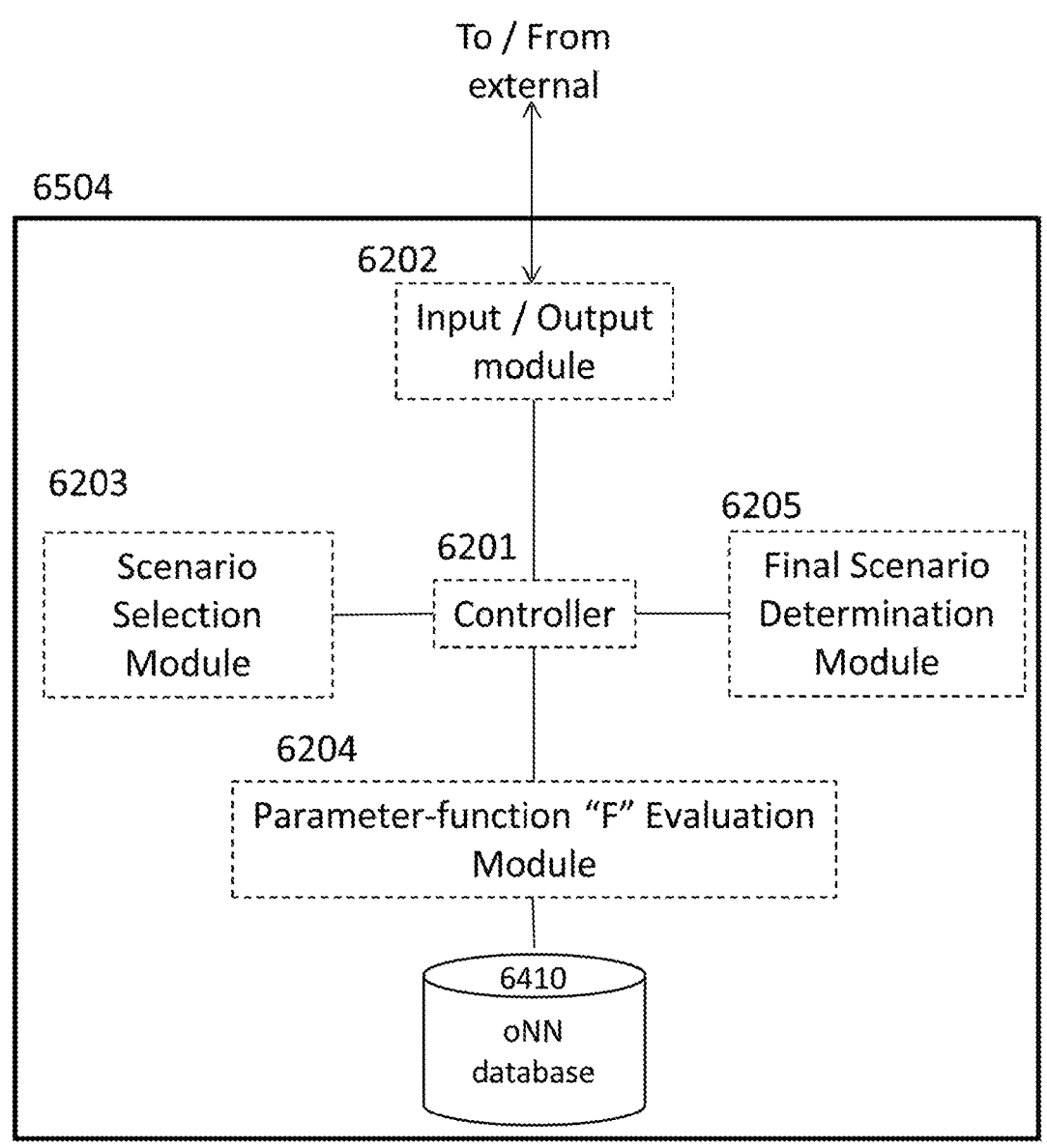
FIG. 21 shows the parameter evaluation module of FIG. 20 having an optimised neural network database module.

A further optimisation of a Forecasting System can be created if the NNs that substitute the functions F in the prior art Parameter Evaluation Module 6004 are themselves optimised Neural Networks as described previously, in which a dimensionality reduction is implemented so that the oNN is more efficient than the standard NN. This is depicted by the oNN Database 6410 in FIG. 21.

A particular optimisation can be achieved in the Forecasting Systems if the dimensionality reduction used in the oNN in module 5507 is taken from the Scenario Generation Module 6003 of the Forecasting System. When this is done, the optimisation of the Neural Network is itself optimised for the Forecasting System, which means that the number of elements of the training set, the computational time to evaluate the oNN, and the level of precision of the oNN, is further optimised for the Forecasting System.

Some examples of this are described below

Example 1—Monte Carlo Simulation

As an illustrative example, using the case of the 1,000 locations across a territory, assume that it is required to compute the power (e.g. electricity) consumption in the territory. For this example, it is assumed that there is a standard function F used to perform the calculation, that takes the temperature of those 1,000 locations and outputs the energy consumption.

$$\text{Energy} = F(x_1, x_2, \ldots x_n)$$

In this example, n=1000.

Also, in this case there is a requirement that F needs to be computed millions of times inside a Forecasting System that generates many (e.g. Number of scenarios=1 million) potential future temperature scenarios across all 1,000 locations (i.e. 1 million scenarios, each comprising 1,000 temperatures, module 6003), computes the energy consumption in each scenario (i.e. 1 million energy consumption numbers, module 6004), computes the highest 1 percentile case from all of them (module 6005) from which a forecast can be made (module 6007) should the number of scenarios be high enough for the purposes of the risk metric (module 6006). This can be useful, for example, to ensure that the capacity of energy generation in the territory is able to cope with at least 99% of the potential future scenarios.

If the computation of function F is costly, it is possible to make a NN to learn the function F, i.e. to replicate it, and use the NN version of the function F to compute the 1 million values of energy consumption.

In prior art applications of NNs in this context, a skilled individual would generate the m elements of the training set based on many possible combinations of the 1,000 temperatures, pass them to the learning process of the NN, and hence have a NN that has been trained. The training set is obtained by performing a random generation of combinations of 1,000 parameters (the temperatures at the 1000 locations), inside the domains that are relevant (e.g. each temperature domain ranges from −50 degrees Celsius to +50 degrees Celsius).

In this embodiment of the invention, an oNN will first select key parameters that exist in the simulation in order to optimise the learning step.

More specifically, it is to be noted that the 1 million scenarios, each containing a collection of 1,000 temperatures, are being generating in a Monte Carlo simulation. These simulations typically generate in module 6003 a vast amount of parameters that are used for the generation of the 1 million scenarios of temperatures and, perhaps, several other purposes; these parameters may include many different variables, like temperatures in key locations across the territory, humidity levels, atmospheric pressure parameters, sun radiation levels, cloud formation, etc.

In this embodiment of the invention, the oNN selects some of the parameters being generated in the simulation that are sufficient to determine the temperature at the 1,000 locations needed as input for F, either exactly or with high enough accuracy. If the dimensionality ($n_{low}$) of those selected parameters (e.g. the temperature and humidity in 5 key locations) is lower than the dimensionality of the input to the function that gives the energy consumption (n=1000, in this example), then the NN can be trained based on those low-dimensional parameters, and then this oNN can be used instead of the prior art NN.

Furthermore, in some examples the generation of the scenarios is done via a low-dimensional stochastic model (module 6102) that generates a few parameters (e.g. the temperature and humidity in 5 key locations) stochastically, from which, then, the temperature in all 1000 locations can be extrapolated (in module 6003).

In this example of the invention, the training set of the oNN is obtained by a random generation of combinations of 10 parameters (the temperature and humidity values at the 5 key locations), inside the domains that are relevant (e.g. each temperature domain ranges from −50 degrees Celsius to +50 degrees Celsius, and each humidity domain ranges from 0% to 100%). In this way, a relatively low number m of scenarios of the low-dimensional parameters are created ($x_1$, $x_2$, ... $x_{n_{low}}$) for the training of the oNN. Then, by computing the function T on them (recalling that the function T is part of the Scenario Generation module 6003, and that it computes the temperature at the required 1000 locations from the temperature values and humidity values at the 5 key locations), m scenarios of the high-dimensional parameters are created, $(x_1, x_2, \ldots x_{n_{low}})=T(x_1, x_2, \ldots x_n))$. These m scenarios constitute the training set for the oNN.

In this example of the invention, by adding the pre-training stage of selecting the low-dimensional data, the training, as well as potentially the evaluation, of the NN is optimised. Additionally, by selecting appropriately the low-dimensional data from the plurality of data generated by the Scenario Generation module 6003, the NN will be trained to cover optimally all the possible scenarios existing in the Forecasting System. This is because no scenario that is not relevant to the Forecasting System will be used for the training of the NN, and each of the scenarios used for the training of the NN will be relevant to the Forecasting system; i.e. it is a realistic scenario for the Forecasting System. As a result of this, the number of elements of the training set in the NN will be optimal for the Forecasting System, given a level of desired accuracy in the NN.

This example of the invention utilises the ex-ante dimensionality reduction technique, as the data that constitutes the low-dimensional data already exists, the challenge being determining which data to select, and determine how to create and compute the T function, that will lead to an oNN configuration.

Example 2—Historical Simulation

Another example can be illustrated using the illustrative example used for Example 1 and using the same context, but instead of a Monte Carlo simulation, a Historical simulation is performed.

In this example, instead of 1 million scenarios generated by a Monte Carlo engine via stochastic random deviates in module 6102, 10 years of historical data of the temperature of the 1,000 locations is provided from the Historical Scenarios database 6103. In this example, from the plurality of historical data in 6103, the Forecasting System selects 365×10=3,650 particular elements of data that are relevant to the forecast.

It is noted that, in contrast to example 1, in this example of the invention, there is no a-priori information as to where the data comes from or how it has been generated. That is, in Example 1 the data for each scenario is generated via stochastic models; in example 2, that data is taken from the history of data instead of being generated.

In this example, the dependencies between the temperature of the 1,000 locations can be explored as described previously, and a PCA technique can be applied, or any other ex-post dimensionality reduction technique (as described above), to compute low-dimensional data that can lead to an oNN. In the case of PCA, each element of the low-dimensional data is going to be a linear combination of the 1,000 historical temperatures (the selected eigenvalues of the correlation matrix) and, as mentioned, the dimensionality of the low-dimensional data is lower than, in this case, 1,000 (i.e. $n_{low} < n(=1000)$). This process gives both the low-dimensional data, as well as the function T.

Then the training set similar to Example 1 can be generated, but with the difference that in Example 1 the low-dimensional data is selected from the available data in the Monte Carlo simulation, while in this embodiment the data is computed via an ex-post dimensionality reduction technique. Once that pre-training step has been completed, the training set is created doing a random generation of combinations of the $n_{low}$ parameters. In this way, $n_{low}$ scenarios of the low-dimensional parameters are created $(x_1, x_2, \ldots x_{n_{low}})$. Then, by computing the function T on them, $m_{low}$ scenarios of the high-dimensional parameters are created, $(x_1, x_2, \ldots x_{n_{low}})=T(x_1, x_2, \ldots x_n)$. These $m_{low}$ scenarios constitute the training set for the oNN. It must be noted that, in general, the number of elements of the training set in the oNN will be lower than in the prior art NN (i.e. $m_{low} < m$) to obtain the same final result for the function approximation that the neural network provides, because the oNN's input layer has lower dimensions than the prior art NN.

In other words, a NN can then be trained with the $m_{low}$ elements of low-dimensional data. Given that the input layer of this oNN has dimensionality $n_{low}$, it is more efficient to train, and possibly to evaluate, than the prior art NN, that had a dimensionality n in the input layer.

Furthermore, given that the computation of the low-dimensional data for the training of the oNN is taken from the particular historical scenarios selected by the Scenario Generation module 6003, the dimensionality reduction technique used in the oNN is optimised for the Forecasting System as, similarly to Example 1, no scenario that is not relevant to the Forecasting System will be used for the training of the NN, and each of the scenarios used for the training of the NN will be relevant to the Forecasting system.

Once the oNN has been trained, if any computation requires to evaluate the energy consumption from a scenario of the 1,000 temperatures across the territory, the equivalent version of that scenario in the low-dimensional domain is computed via the $T^{-1}$ function, and then those $n_{low}$ pieces of data are input into the already trained oNN to obtain the energy consumption under that scenario.

It must be noted that the computation of the low-dimensional data involves two steps. First, the function T needs to be found. As mentioned, this can be done via a number of computational techniques, for example PCA or autoencoders. The phrase: "The technique has been found" means that the computational version of the function T has been obtained. Generally, in parallel, the inverse of the function $T^{-1}$, that provides an element of high-dimensional data from low-dimensional data, can also found $((x_1, x_2, \ldots x_n)=T^{-1}(x_1, x_2, \ldots X_{n_{low}}))$. Once both T and $T^{-1}$ have been found, they can be evaluated when needed in order to compute the low-dimensional equivalent of a high-dimensional element of data, or vice-versa.

Similarly to the Example 1, in this example, by adding the pre-training stage of computing the low-dimensional data, the training, as well as potentially the evaluation, of the NN is optimised. If the pre-training stage is done using the specific historical data used in the Forecasting Systems, the oNN is particularly optimised.

As indicated, this example utilises the ex-post dimensionality reduction technique, as the data that constitutes the low-dimensional data does not exist, and the challenge is computing such data and the transformation that computes the low-dimensional data from a given sample of high-dimensional data, and vice-versa, and using this low-dimensional data to configure an oNN.

Example 3—'Smart' Generation of High-Dimensional Training Sets

In this embodiment, the generation of this data in the training set is optimised from the dimensionality reduction technique.

In prior art NNs, in order to generate the m elements of the training set, the domain generated by the n-dimensional parameters that are the input to the function F is sampled randomly so that it covers all the possible combinations of input data, as explained before.

However, it is possible to use the dependency in the input data to optimise that process. Again using the example of the temperatures in 1,000 locations, if the domain of 1,000 temperatures is sampled randomly, there will likely be scenarios in the training set with, say, +30 degrees Celsius in one location and −40 degrees Celsius in the location next to it, which is known to be practically impossible.

In this example, the dependency in the input data is used to generate "Smartly" the elements of the training set (avoiding, for example, the +30 degrees Celsius/−40 degrees Celsius impossible scenario just described). In this example, the rules of the dependency in the high-dimensional data are determined, either via a selection or a computation by module 5507, and are then used in the generation of the data that constitutes the training set in module 5003, so that such training set data generation is optimised, and hence the new oNN is performs better than the prior art NN.

Furthermore, equivalent to Examples 1 and 2, if the rules of dependency of the data are taken from the Scenario Generation module 6003 of the Forecasting System, then the optimisation is particularly strong for the Forecasting System.

Figure 15:
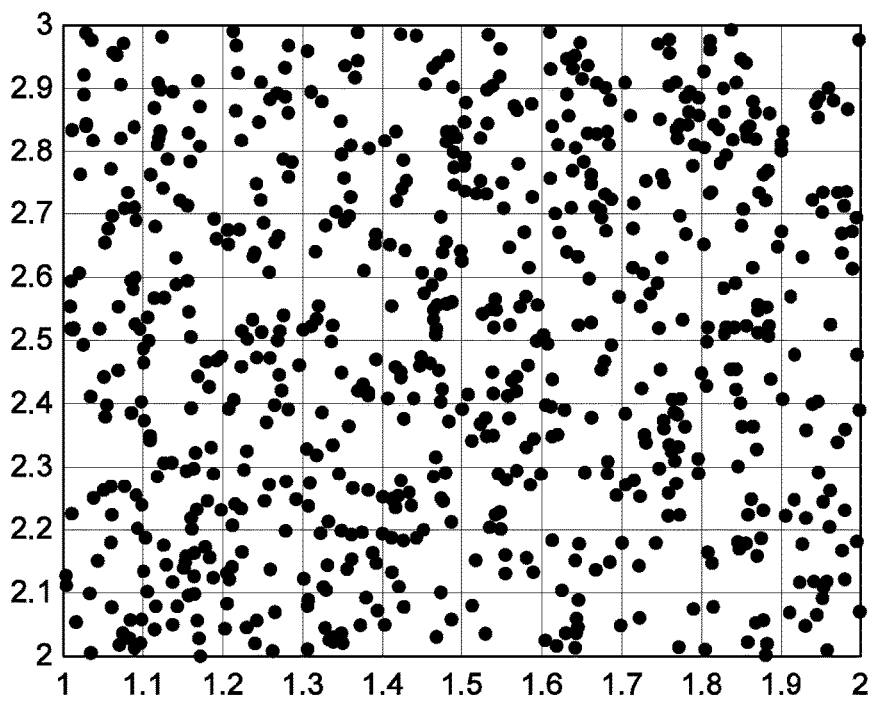
FIG. 15 is a series of plots of the distribution of the distribution of m samples of the input data to the function to be approximated, F firstly randomly (as per FIG. 12) for the case n=2, and then in a smart generation in accordance with the present embodiments first with an approximate function and second with a precisely determined function.
Figure 15:
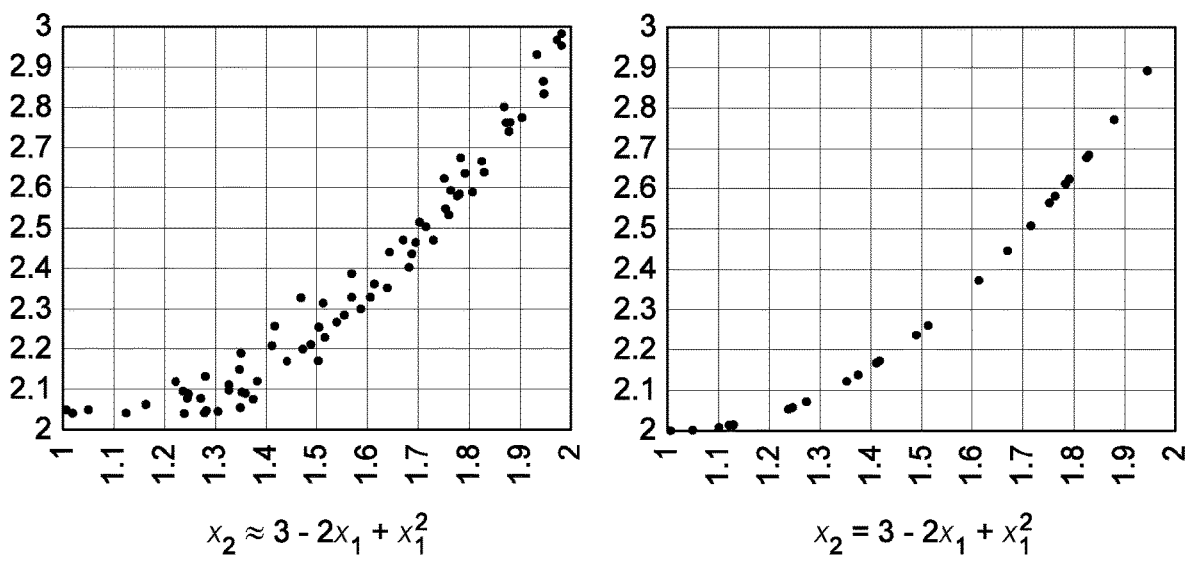

An example is illustrated in FIG. 15, for the case of n=2 dimensions, as an improvement on the prior art example shown in FIG. 12. In FIG. 15, the top pane shows a typical prior art random generation of the parameters $(x_1, x_2)$ for the training set, while the bottom pane shows its equivalent "Smart" random generation in two cases. On the left, it is supposed, for illustrative purposes, that $x_2 \approx 3-2x_1+x_1^2$, or $x_2=3-2x_1+x_1^2+E$, where E can be a random variable, normally distributed with a certain standard deviation, for example. It can be seen clearly that, by using the known rules of the dependency between $x_1$ and $x_2$, the area of the 2-dimensional domain that is useful to sample for the NN is reduced compared to the prior art case, and so the number of samples needed to give a similar density of sampling is reduced with the "Smart" generation of the training set data. On the right-hand plot of FIG. 15, it is supposed that $x_2=3-2x_1+x_1^2$, in which case the number of samples needed is further reduced. If the rules of dependency between the data (e.g. $x_2=3-2x_1+x_1^2$) are taken to be the same rules of dependency that exist in the scenarios generated by the Forecasting System in module 6003, the training step of the NN is particularly optimised for the Forecasting System.

This has been illustrated for the simplest case of n=2 for ease of illustration, but it must be understood that the same concept can be generalised to any generic n. When there is some dependency between the n parameters that constitutes the high-dimensional data, the rules that govern the dependency can be used to sample the n-dimensional input domain of the NN more efficiently compared to prior art. When those rules are generated and/or used by a Forecasting System, the oNN is then particularly optimised for that Forecasting System. Again using the example of the temperatures in a territory, the domain created by the 1000-dimensional temperatures can be sampled. "Smartly", which means that, compared to the random sampling that covers all of the domain in prior art configurations of the NN (that include impossible or quasi-impossible possibilities), a lower number of elements in the training set (i.e. a lower m) will be needed to achieve the same effective training in the NN, hence the NN training is improved.

In this way, once the "Smart" sampling has been done, a NN can be trained with the Smart training set more effectively than with the prior art training set.

In this example, the dimensionality of the input of the NN is still n (i.e. the high-dimension), but the training step is optimised because the aggregated computational cost of evaluating the function F for all elements of the training set is lower than in prior art, because m is lower, because the dependency between the input-data is being used in order to generate "Smart" elements of the training set. That is, if $m_{low}$ is the number of samples of the training set ("Smartly" generated) needed to train a oNN that provides substantially the same result as a prior art NN (that was trained with m samples in the training set), then $m_{low}$<m in general, hence the generation of the oNN training set is more efficient than the generation of the training set of the NN. If the dimensionality reduction used for the training of the oNN is taken from the Forecasting System, the number of samples of the training set, and the precision of the NN, is particularly optimised for the Forecasting System.

It has been previously discussed that generation of the training sets for a NN can be a problem as the function F that is to be approximated by a NN-based function is typically costly, or difficult, or both, to compute. In this example, even though the dimensionality of the input layer of the NN remains the same as in the prior art (i.e. n), the number of times that the function F needs to be evaluated for the generation of the training set decreases from m to $m_{low}$, and as a result the execution of module 5500 (FIG. 13) will be less costly (both in time and computational cost) than the execution of module 5000 (FIG. 11), because the training set generation module 5003 needs to evaluate the original function F fewer times than its prior art equivalent. Also, the overall training module 4000 will be less costly to perform by a machine under this embodiment of the present invention because, $m_{low}$ being smaller than m, the overall training module 4000 has less data to store, manage and operate with than its prior art equivalent.

CONCLUSIONS

It has been shown, with three examples, how the present invention can optimise prior art computational approximation methods and, in particular, NNs, as well as Forecasting Systems. NNs have been used as an example to illustrate the optimisation. Both Examples 1 and 2 provide a reduction of the number of elements in the training set (i.e. m is reduced), a reduction in the dimensionality of the input layer of the NN (i.e. n is reduced), or both. Example 3 provides a reduction in the number of elements in the training set. When a NN is used in a forecasting system as a replacement in the evaluation step of a given function F, that needs to be computed many times under many scenarios, the computational efficiency of the Forecasting System can be improved as long as the number of elements in the NN training set is lower than the number of scenarios in which the function F needs to be evaluated. When the dimensionality reduction technique used in any of these examples is given by the rules in the scenario data used in a Forecasting System, then the Forecasting System is particularly optimised because the number of the elements of the NN is reduced in a manner that is specific for the scenarios used in the Forecasting System. As a result, the potential lack of precision (i.e. loss of information) that a dimensionality reduction technique may incorporate to the NN (lack of precision versus the function F it replicates) is minimised for the Forecasting system, or reduced to zero.

This is beneficial for the computation of a forecast because, in NNs, there is generally an inverse relationship between the number of elements in the training set and the error the evaluation of the NN has compared to its equivalent function F. That is, the larger the number of elements in the training set, the smaller the error, and vice-versa.

When we replace a function F by a NN in a forecasting system, this is generally done because the evaluation of the function F is costly to compute. The function F needs to be evaluated for many scenarios in the Forecasting System, and so if the evaluation of the NN is more efficient than that of the function F, then replacing the function F by its NN version in the Forecasting System will improve the computational efficiency of the Forecasting System. This is an optimised Forecasting System (oFS).

This improvement is achieved when the number of elements in the training set is lower than the number of scenarios in which the function F needs to be evaluated in the Forecasting System. That is the case because each element of the training set requires the evaluation of the function F one time. As a result, the lower the number of elements in the training set of the NN (for a constant level of accuracy in the NN versus the function F), the more computationally efficient the oFS.

There are a plurality of dimensionality reduction techniques that could be applied to a NN. However, when the oNN is applied to a Forecasting System to construct an oFS, and the dimensionality reduction technique used in the oNN is given by the rules in the data of the Forecasting System, then both the NN and the FS work together so that the oNN is particularly optimised for the Forecasting System. This is because the loss of information—in the dimensionality reduction technique applied to the NN to create the oNN—is precisely taken from the FS so that the loss of information in the NN in the context of the FS is minimal or zero. This is illustrated in FIG. 22 for the case of two dimensions for ease of illustration, but the results can be extended to any suitable number of dimensions.

There is an inverse relationship between the error that a NN has and the number of elements needed in the training set. As a result, the oFS under configuration B will be more efficient than under configuration A because: the error in the oFS will be lower; its computational cost will be lower; or, both. In particular, reducing the number of elements in the training set of the NN implies that (i) the cost of generating the training set is reduced and (ii) the computational effort of the overall training module is reduced too. By using the dependencies in the input data, this reduction in the number of elements in the training set can be achieved without any negative effect in the error of the approximation function that the oNN creates because the density of information (i.e. the density of points in the input domain) is the same, or improved, compared with prior art NNs. This is because the location of the data that forms the training set is concentrated around the areas that are relevant. A reduction in the dimensionality in the input layer of a NN means that, everything else being equal, the oNN can be trained with a lower error than its prior art NN equivalent.

Both of these advantageous effects can occur at the same time: by using a "Smart" sampling of the input domain, a more effective generation of the training set can be achieved (m is reduced) and a decrease in the dimensionality of the NN's input layer can be achieved too (n is reduced).

Furthermore, when the NN is applied to substitute a function F in a Forecasting System, the computational cost of the Forecasting System can be reduced without any significant error in the forecast provided the NN's error is low enough. The NN can be optimised via a dimensionality reduction into an oNN structure. When the dimensionality reduction of the oNN is given by the Forecasting System where it is applied in order to construct an oFS, the improvement achieved by the oFS is particularly strong because the error produced by the NN is minimised for the FS, for a constant number of elements in the training set, and the number of elements in the training set is also minimised for a constant level of error for the FS.

Note 1 It must be noted that it was said before that the error of a NN tends to increase if the number of elements of the training set decreases. That is a generic result, that does not take into account the dependencies in the input data of the NN. That result is typically stabilised in the context illustrated in FIG. 12: the lower the number of points, the lower the density of information that the training set provides as to how the function F behaves (i.e. less granular the information on F) and, as a result, as a general rule, the NN tends to have a higher error.

However, the "Smart" generation of the elements of the training set under the present invention maintains, or even improves, the density of information on how the function F behaves, despite having reduced the number of elements in it (m) relative to prior art, because the sampling of the input domain $(x_1, x_2, \ldots x_n)$ concentrates on the areas of the input domain that are relevant to F.

Note 2

For illustrative reasons, the explanations about the reduction in the number of elements of the training set have been concentrated around the training set generation module 5003. However, it must be understood that the same positive effects that the dimensionality reduction module 5507 has on module 5003, can be extended to the training set update module 3000.

This module 3000 generates samples for the training set in a dynamic manner, as explained above. As a result, all the benefits that the availability of a computational version of the functions T and $T^{-1}$ provide in the generations of samples for the training set, affect both when the samples are created in its static mode (module 5003) or its dynamic mode (module 3000).

Benefits

It will be appreciated that, given that the computational effort to train the NN is smaller the lower the dimensionality of the input data and the lower the number of samples in the training set (m), the training effort of an oNN under the present invention will be lower than that of the prior art NN configuration.

This effect is produced because the complexity of the oNN—compared to the prior art NN—is lower because the dimensionality of the input data is lower, because the number of elements in the training set (m) is be lower, or a combination of both. This effect is produced achieving the same level of accuracy in the NN compared to the oNN.

More specifically, training an oNN is faster than training a prior art NN because:

i. If there is a way to obtain elements of the training set by computing F, its computation (i.e. the computation of the output (y) for each training set element input $(x_1, x_2, \ldots x_n)$) can be costly, either in time, or in monetary terms via the cost of computing hardware needed and its operational cost, or both (time and cost). Indeed, often, if the computation of the function F is easy and cheap, there is generally no reason to go through the effort of training a NN to proxy it. So, in the context of NNs, the cost of computing F is typically significant. As a result, the lower the number of elements in the training set needed to achieve the same level of accuracy in the NN, the lower the overall effort of NN training.

ii. It may simply not be possible to compute more elements of the training set. That is, they are simply provided to the system, and there is no way to compute function F, which means that there is only a limited amount of information in the training set. This means that the present invention has to reduce the error of the NN as much as possible without changing the number of elements of the training set. It has been shown previously that, for the same number of elements in the training set, the lower the dimensionality of the data, the lower the error of the NN. Hence, the lower the dimensionality of the NN input data, the better the NN will be.

Also, as shown in the examples of the present invention, when the oNN version of the function F needs to be evaluated, outside of the training process, once the oNN has been trained, module 302 must be computed with the trained parameters and hyper-parameters. When the dimensionality of the input layer to module 302 is lower than the original dimensionality under prior art, under this example, there are a two possibilities. If the input data to evaluate F is an instance of the low-dimensional data (i.e. $x_1, x_2, \ldots n_{n_{low}}$), such data is passed to module 302 to obtain its corresponding f value. If the data is an instance of the high-dimensional (i.e. $x_1, x_2, \ldots x_n$) data, this data needs to be transformed into its low-dimensional version via the dimensionality reduction function T (i.e. $(x_1, x_2, \ldots x_{n_{low}}) = T(x_1, x_2, \ldots x_n)$, and subsequently this low-dimensional data is passed on to module 302 of the NN in order to evaluate its corresponding $\hat{y}$ value.

It can be appreciated that, given that, when the input data to module 302 under this invention has lower dimension that in its prior art equivalent, it will generally require fewer layers and neurons in its optimal configuration compared to prior art and, as a result, the evaluation of the NN via module 302 will be less costly (in time and monetary cost) compared to its equivalent prior art module 302.

Furthermore, when a NN is applied to a FS, the new oFS structure is generally less costly to compute than its FS counterpart because, generally, the evaluation of the NN that substitutes a function F in the Forecasting System is less costly to compute than the function F.

Moreover, when the dimensionality reduction used in the oNN is given by or taken from the FS, the oFS is particularly beneficial versus its FS equivalent because: for a given number of elements in the training set of the oNN, the error it has in its evaluation is minimised for the Forecasting System; or, for a given error, the number of elements of the oNN training set is optimised for the Forecasting System. Hence, the computational cost of the oFS is optimised.

It will be appreciated that similar results and benefits may be obtained with various other approximation methods, of which a NN is one example.

Figure 23A:
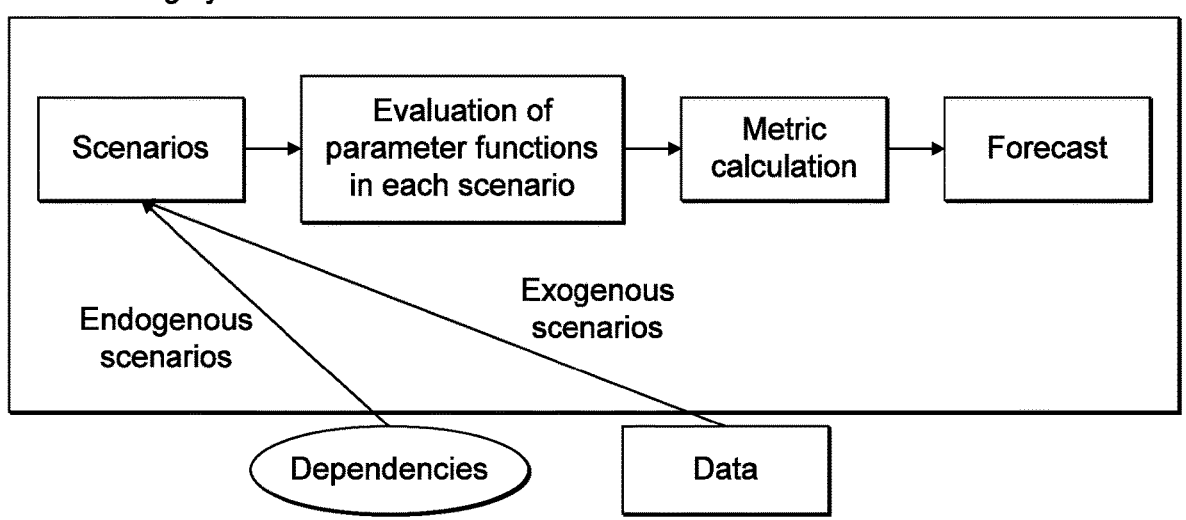
FIG. 23(*a*) schematically illustrates a prior art forecasting system and a prior art approximation system.
Figure 23A:
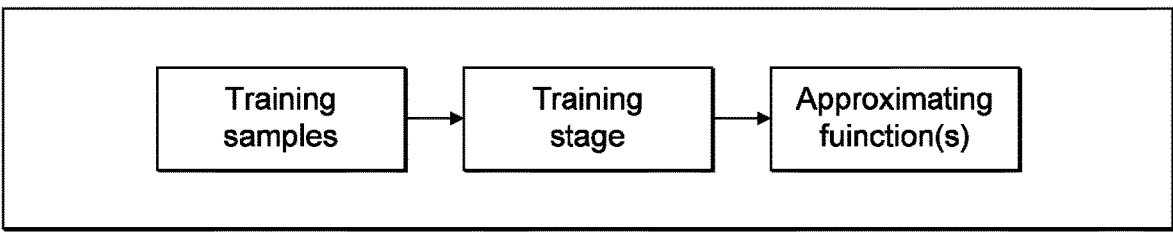
Figure 23B:
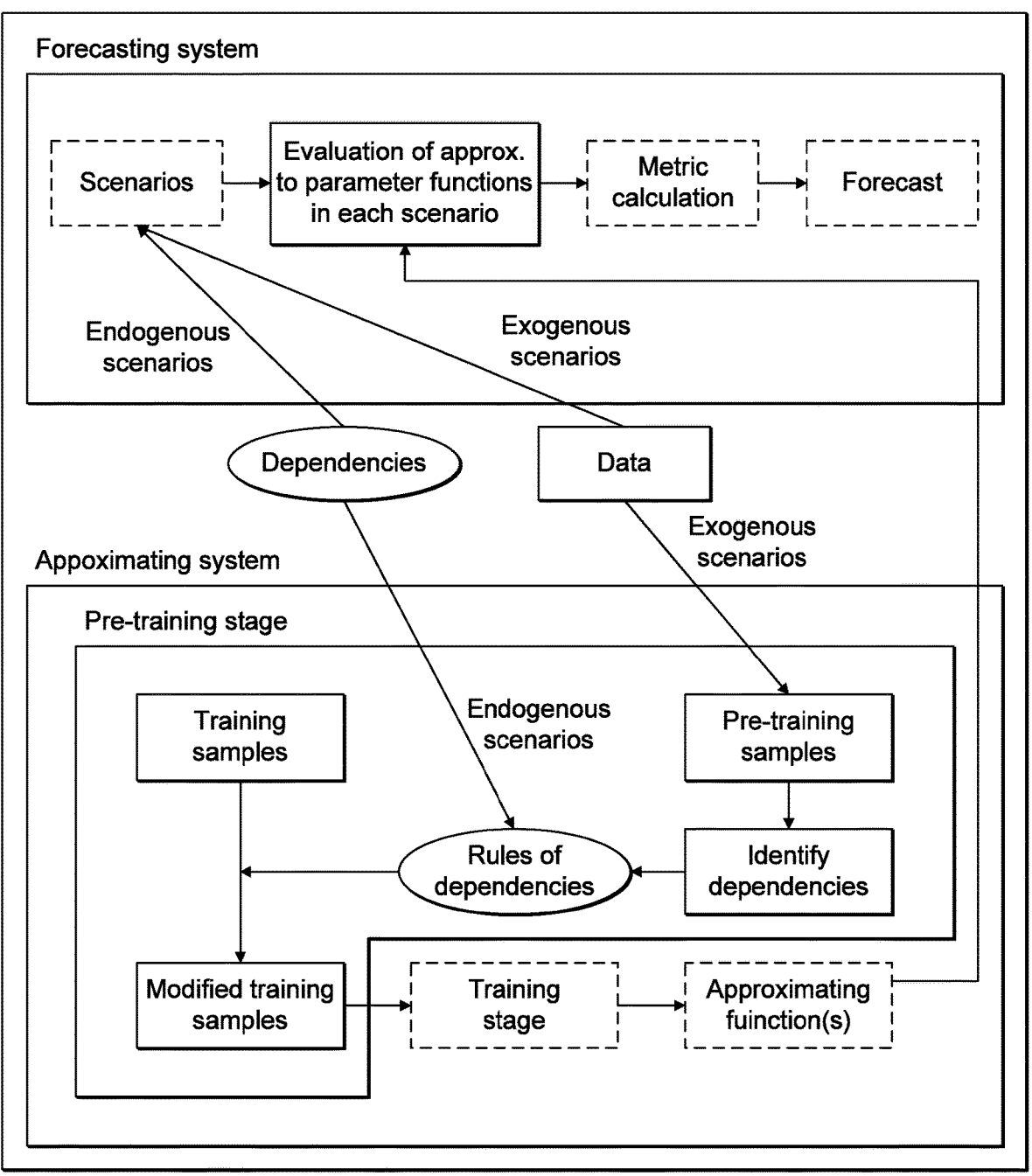

FIG. 23(*a*) schematically illustrates a prior art forecasting system. In particular, the forecasting system includes a scenarios module for generating a plurality of scenarios (of a system or device) which are to be evaluated by a parameter function module to obtain corresponding parameter values of one or more functions. The forecasting system also includes a metric calculation module for calculating one or more metrics based on the parameter values, and these metrics are then used to determine a forecast of future behaviour of the system or device in a forecast module of the forecasting system. As discussed above, the scenarios may be endogenous scenarios—such as in an example in which the scenarios are generated by a Monte Carlo model/method—or the scenarios may be exogenous scenarios— such as in an example in which the scenarios are generated based on data, e.g. historical data related to the system or device.

FIG. 23(*a*) also schematically illustrates a prior art approximation system or architecture for approximating one or more functions. The approximation system is provided with a number of training samples including values of a first plurality of input variables of the functions and corresponding output/parameter values. During a training stage, a number of training weights or parameters of the approximation architecture are tuned using the training samples to obtain an approximated function (or functions) so that the trained approximation architecture can approximate output/parameter values of the functions (given input variable data) to a desired level of accuracy.

FIG. 23(*b*) schematically illustrates a forecasting system according to an example of the invention. Like in FIG. 23(*a*), the forecasting system includes a scenarios module, a metric calculation module, and a forecast module. Unlike in FIG. 23(*a*), the forecasting system includes an approximation parameter function module—instead of the parameter function module—for approximating parameter values of the one or more functions based on the generated scenarios. This includes an approximation architecture, e.g. a neural network architecture, which is trained using an approximating system (described below).

FIG. 23(*b*) also schematically illustrates an approximation system or architecture for approximating one or more functions according to an example of the invention. Like FIG. 23(*a*), the approximation system includes a training stage module and an approximating function(s) module. Unlike in FIG. 23(*a*), the approximating system includes a pre-training stage module for obtaining modified training samples based on the training samples, where the modified training samples (rather than the training samples) are used by the training stage module to train the approximation architecture (to approximate the parameter functions in the forecasting system).

The modified training samples are obtained using rules of one or more dependencies that exist between the input variables of the training samples (which may be the same as the input variables of the scenarios). In particular, the rules of the dependencies provide a transform from the first plurality of variables to a second plurality of variables, where the second plurality has fewer degrees of freedom than the first plurality. This second plurality of variables is then used to obtain the modified training samples. Note that the dimensionality of each modified training sample—i.e. the number of variables in the second plurality of variables—is not necessarily equal to the dimensionality of each training sample i.e. the number of variables in the first plurality of variables (although it can be in some examples). Although the dimensionality of the modified training samples may in some examples be the same as that of the training samples, the degrees of freedom of the second plurality of variables used to generate the modified training samples will still be lower than the first plurality of variables used to generate the training samples. The second plurality of variables could in some examples be a subset of the first plurality of variables; however, in different examples the second plurality of variables can include variables that are not present in the first plurality. Also, the number of modified training samples used in the training stage may be less than or equal to the number of training samples that would be used in a prior art process. This may depend on a required accuracy of the approximation and/or on available computing resources to train the approximation architecture: indeed the approximating system may determine how many modified training samples to obtain/use in the training process based on one or more of these factors.

The configuration of the approximation parameter function module in FIG. 23(*b*) is shown in FIGS. 24(*b*) and 24(*c*) compared to that of the parameter function module of FIG. 23(*a*), which is shown in FIG. 24(*a*). In FIG. 24(*a*), a scenario is passed to the parameter function evaluator, which outputs the parameter value for the corresponding scenario, and this is then passed on to subsequent processes in the forecasting system. According to examples of the present invention, there are different possibilities. Referring to FIG. 24(*b*), if the plurality of variables that constitutes the input layer approximation architecture is the same as the plurality of variables that constitutes each scenario, then the approximation architecture takes the values corresponding to each scenario, evaluates the approximated parameter value, and this is then passed onto subsequent processes in the forecasting system. Referring to FIG. 24(*c*), if the plurality of variables that constitutes the input layer approximation architecture has a different dimensionality than the plurality of variables that constitutes each scenario, then the rules of dependency from the pre-training stage of the approximating system are applied to each scenario. This step outputs an expression of the scenario (Scenario2) in the plurality of variables that coincides with the input layer of the approximation architecture. Then, the approximation architecture evaluates the approximated parameter value, and this is then passed onto subsequent processes in the forecasting system Returning to FIG. 23(*b*), the dependencies in the input variables may be obtained in a number of different ways. In one example, the dependencies are known a priori, and the dependencies are simply received by the pre-training stage module from an external source. For instance, in a case in which the scenarios module of the forecasting system uses endogenous scenarios, the dependencies between input variables will be known from the technique/model that is used to generate the scenarios, e.g. stochastically using a Monte Carlo method. The dependencies in this case may be received by the pre-training stage module from the module for generating the scenarios, and the rules to be applied to the training samples may then be determined based on the received dependencies.

In another example, the dependencies may not be known a priori, and the dependencies may need to be determined by the pre-training stage module. For instance, in a case in which the scenarios module of the forecasting system uses exogenous scenarios, the dependencies between input variables will not be known from the data used to generate the scenarios, e.g. historical data related to the system/device for which a future behaviour simulation is to be determined by the forecasting system. In such a case, the pre-training stage module may receive a plurality of pre-training samples based on the data used to generate the scenarios in the forecasting system. The pre-training samples and the training samples may be the same as each other, one may be a subset of the other, or they may be different from each other (although obtained from the same source, e.g. the historical data source). The pre-training stage module may then identify one or more dependencies in the pre-training samples, e.g. by using one of the numerical techniques described earlier. The rules to be applied to the training samples may then be determined based on the received dependencies.

As the second plurality of variables has fewer degrees of freedom than the first plurality, then a less complex approximation architecture may be needed to approximate the functions to the required accuracy, and so training the approximation architecture using the modified training samples may require less computational resource than training an architecture to approximate the functions using the training samples. For instance, when the approximation architecture is a neural network architecture then fewer layers, and/or fewer neurons per layer may be needed to approximate the functions to the desired accuracy.

The invention claimed is:

1. A computer-implemented method of training an approximation architecture for a forecasting system, the method being implemented on a computer system including a computer processor, the forecasting system being for:

generating a plurality of scenarios indicative of potential future states of a system, each scenario including a value for each of a plurality of variables;

determining an approximated value of each of one or more parameters for each of the plurality of scenarios, wherein one or more functions relate variable values of scenarios to corresponding parameter values of the functions, and wherein the approximated values of the parameters are determined using a trained approximation architecture that receives the values of each generated scenario and approximates the one or more functions; and, determining a future behaviour forecast of the system based on the determined approximated parameter values for the plurality of scenarios, wherein training the approximation architecture comprises performing a pre-training stage comprising steps of:

obtaining a plurality of training samples each including an input value for at least some of a first plurality of input variables and corresponding parameter values of the functions;

obtaining one or more dependencies between different variables of the first plurality of input variables, wherein the one or more dependencies between different variables of the first plurality of input variables are obtained based on one or more dependencies in the plurality of scenarios, and wherein the plurality of scenarios includes one of (a) endogenous scenarios and wherein obtaining the one or more dependencies of the endogenous scenarios comprises obtaining the dependencies from a scenario generation module, of the forecasting system, that generates the scenarios, or (b) exogenous scenarios and wherein obtaining the one or more dependencies of the exogenous scenarios comprises determining the dependencies based on data used to generate the plurality of scenarios;

determining, based on the obtained dependencies, one or more dimensionality-reducing rules for determining a second plurality of input variables, wherein there are fewer degrees of freedom in the second plurality of input variables than in the first plurality of input variables; and, determining, by applying the dimensionality-reducing rules to the plurality of training samples, a plurality of modified training samples including input values for at least some of the second plurality of variables and corresponding parameter values approximating the functions; and, determining one or more training weights of the approximation architecture based on the plurality of modified training samples in order to train the approximation architecture to approximate the one or more functions.

2. A method according to claim 1, wherein the endogenous scenarios are generated stochastically.

3. A method according to claim 1, wherein determining the dependencies comprises:

obtaining a plurality of pre-training samples, from the data used to generate the plurality of scenarios, each including an input value for at least some of the first plurality of input variables; and, identifying, based on the obtained pre-training samples, the one or more dependencies between different variables of the first plurality of input variables.

4. A method according to claim 3, wherein obtaining the dependencies between variables comprises applying a numerical dimensionality-reducing technique to the obtained plurality of pre-training samples.

5. A method according to claim 1, wherein the plurality of modified training samples includes fewer samples than the plurality of obtained training samples.

6. A method according to claim 1, wherein the pre-training stage comprises selecting how many modified training samples are to be determined, and wherein the selection is based on at least one of: a required level of accuracy to be provided by the approximation architecture; and, processing capabilities of the computer processor.

7. A method according to claim 6, wherein the selection of how many modified training samples to be determined is an iterative process to optimise a trade-off between the required level of accuracy and the processing capabilities of the computer processor.

8. A method according to claim 1, wherein the pre-training stage comprises selecting a dimensionality-reducing technique from a plurality of stored dimensionality-reducing techniques, and obtaining the dependencies between variables using the selected dimensionality-reducing technique.

9. A method according to claim 8, wherein selection of the dimensionality-reducing technique is based on at least one of: a required level of accuracy to be provided by the approximation architecture; and, processing capabilities of the computer processor.

10. A method according to claim 8, wherein selection of the dimensionality-reducing technique is an iterative process to optimise a trade-off between a required level of accuracy and processing capabilities of the computer processor.

11. A method according to claim 1, the method comprising selecting how many input variables are in the second plurality of input variables, wherein the selection is based on a time taken by the computer processor to evaluate the one or more functions in the approximation architecture.

12. A method according to claim 1, wherein a plurality of modified training samples m is selected to satisfy:

$$m < D \cdot M \cdot \left(1 - \frac{t}{T}\right)$$

wherein D is how many future behaviour forecasts are to be determined, M is how many scenarios are used, t is a time taken for the computer processor to evaluate the approximation to the one or more functions in the approximation architecture, and T is the time taken for the computer processor to evaluate the one or more functions.

13. A method according to claim 1, further comprising determining one or more metrics based on the determined one or more approximated parameters, wherein if the one or more metrics satisfy one or more conditions then the future behaviour forecast of the system is determined, and wherein if the one or more metrics do not satisfy the one or more conditions a further plurality of scenarios is generated on which to determine the future behaviour forecast.

14. A method according to claim 1, the method further comprising determining whether a dimensionality of the generated plurality of scenarios is same as a plurality of dimensions of an input layer of the trained approximation architecture and, if not, then the method comprises applying the dimensionality-reducing rules to the generated scenarios to obtain modified scenarios to which the trained approximation architecture is applied.

15. A non-transitory, computer-readable medium comprising stored instructions thereon that, when executed by a processor, causes the processor to:

generate a plurality of scenarios indicative of potential future states of a system, each scenario including a value for each of a plurality of variables;

determine an approximated value of each of one or more parameters for each of the plurality of scenarios, wherein one or more functions relate variable values of scenarios to corresponding parameter values of the functions, and wherein the approximated values of the parameters are determined using a trained approximation architecture that receives the values of each generated scenario and approximates the one or more functions; and, determine a future behaviour forecast of the system based on the determined approximated parameter values for the plurality of scenarios, wherein instructions to train the approximation architecture comprises instructions to perform a pre-training stage further comprising instructions to:

obtain a plurality of training samples each including an input value for at least some of a first plurality of input variables and corresponding parameter values of the functions;

obtain one or more dependencies between different variables of the first plurality of input variables, wherein the one or more dependencies between different variables of the first plurality of input variables are obtained based on one or more dependencies in the plurality of scenarios, and wherein the plurality of scenarios includes one of (a) endogenous scenarios and wherein obtaining the one or more dependencies of the endogenous scenarios comprises obtaining the dependencies from a scenario generation module, of the forecasting system, that generates the scenarios, or (b) exogenous scenarios and wherein obtaining the one or more dependencies of the exogenous scenarios comprises determining the dependencies based on data used to generate the plurality of scenarios;

determine, based on the obtained dependencies, one or more dimensionality-reducing rules for determining a second plurality of input variables, wherein there are fewer degrees of freedom in the second plurality of input variables than in the first plurality of input variables; and, determine, by applying the dimensionality-reducing rules to the plurality of training samples, a plurality of modified training samples including input values for at least some of the second plurality of variables and corresponding parameter values approximating the functions; and, determine one or more training weights of the approximation architecture based on the plurality of modified training samples in order to train the approximation architecture to approximate the one or more functions.

16. A control system for configuring a system to accommodate a future state of the system or further events related to the system, the control system comprising:

a computer system including a computer processor, the computer processor structured to execute computer instructions to determine one or more future behaviour forecasts for the control system, instructions to determine further comprising instructions to structure the processor to:

generate a plurality of scenarios indicative of potential future states of a system, each scenario including a value for each of a plurality of variables;

determine an approximated value of each of one or more parameters for each of the plurality of scenarios, wherein one or more functions relate variable values of scenarios to corresponding parameter values of the functions, and wherein the approximated values of the parameters are determined using a trained approximation architecture that receives the values of each generated scenario and approximates the one or more functions; and, determine a future behaviour forecast of the system based on the determined approximated parameter values for the plurality of scenarios, wherein instructions to train the approximation architecture comprises instructions to perform a pre-training stage further comprising instructions to:

obtain a plurality of training samples each including an input value for at least some of a first plurality of input variables and corresponding parameter values of the functions;

obtain one or more dependencies between different variables of the first plurality of input variables, wherein the one or more dependencies between different variables of the first plurality of input variables are obtained based on one or more dependencies in the plurality of scenarios, and wherein the plurality of scenarios includes one of (a) endogenous scenarios and wherein obtaining the one or more dependencies of the endogenous scenarios comprises obtaining the dependencies from a scenario generation module, of the forecasting system, that generates the scenarios, or (b) exogenous scenarios and wherein obtaining the one or more dependencies of the exogenous scenarios comprises determining the dependencies based on data used to generate the plurality of scenarios;

determine, based on the obtained dependencies, one or more dimensionality-reducing rules for determining a second plurality of input variables, wherein there are fewer degrees of freedom in the second plurality of input variables than in the first plurality of input variables; and, determine, by applying the dimensionality-reducing rules to the plurality of training samples, a plurality of modified training samples including input values for at least some of the second plurality of variables and corresponding parameter values approximating the functions; and, determine one or more training weights of the approximation architecture based on the plurality of modified training samples in order to train the approximation architecture to approximate the one or more functions; and, a feedback controller for using the future behaviour forecasts determined by the computer system as feedback for the control system to configure the system.

* * * * *